US012094191B2

(12) United States Patent
Jin et al.

(10) Patent No.: US 12,094,191 B2
(45) Date of Patent: Sep. 17, 2024

(54) MONITORING SYSTEM AND METHOD BASED ON DIGITAL CONVERTER STATION

(71) Applicants: STATE GRID CORPORATION OF CHINA, Beijing (CN); STATE GRID ECONOMIC AND TECHNOLOGICAL RESEARCH INSTITUTE CO., LTD, Beijing (CN); NR ELECTRIC CO., LTD., Jiangsu (CN); XJ GROUP CORPORATION, Henan (CN); NARI TECHNOLOGY CO., LTD, Jiangsu (CN); BEIJING SGITG ACCENTURE INFORMATION TECHNOLOGY CENTER CO., LTD., Beijing (CN); HUAWEI TECHNOLOGY CO., LTD, Guangdong (CN)

(72) Inventors: Wei Jin, Beijing (CN); Qing Wang, Beijing (CN);

(Continued)

(73) Assignees: STATE GRID CORPORATION OF CHINA, Beijing (CN); STATE GRID ECONOMIC AND TECHNOLOGICAL RESEARCH INSTITUTE CO., LTD, Beijing (CN); NR ELECTRIC CO., LTD., Jiangsu (CN); XJ GROUP CORPORATION, Henan (CN); NARI TECHNOLOGY CO., LTD., Jiangsu (CN); BEIJING SGITG ACCENTURE INFORMATION TECHNOLOGY CENTER CO., LTD., Beijing (CN); HUAWEI TECHNOLOGY CO., LTD, Guangdong (CN)

(*) Notice: Subject to any disclaimer, the term of this patent is extended or adjusted under 35 U.S.C. 154(b) by 0 days.

(21) Appl. No.: 18/411,019

(22) Filed: Jan. 11, 2024

(65) Prior Publication Data

US 2024/0153257 A1 May 9, 2024

Related U.S. Application Data

(63) Continuation of application No. PCT/CN2023/113310, filed on Aug. 16, 2023.

(30) Foreign Application Priority Data

Sep. 14, 2022 (CN) .......................... 202211113105.9

(51) Int. Cl.
*G06V 10/80* (2022.01)
*G06V 20/52* (2022.01)
(Continued)

(52) U.S. Cl.
CPC ............ *G06V 10/803* (2022.01); *G06V 20/52* (2022.01); *H04L 43/0841* (2013.01); *H04L 43/0864* (2013.01)

(58) Field of Classification Search
CPC .................. G06V 10/803; G06V 20/52; H04L 43/0841; H04L 43/0864; H04L 65/80; H04N 7/181; H04N 5/265
See application file for complete search history.

(56) References Cited

U.S. PATENT DOCUMENTS 11,132,224 B2   9/2021  Zhu
2015/0355246 A1  12/2015  Choe
(Continued)

FOREIGN PATENT DOCUMENTS

CN          1881744 A    12/2006
CN        103647347 A     3/2014
(Continued)

OTHER PUBLICATIONS

Written opinion of the International Searching Authority in Application No. PCT/CN2023/113310 with allowable claims, mailed on Dec. 1, 2023.
(Continued)

*Primary Examiner* — Bobbak Safaipour
(74) *Attorney, Agent, or Firm* — Syncoda LLC; Feng Ma

(57) ABSTRACT

A monitoring system based on a digital converter station includes a first monitoring terminal deployed at a first-level
(Continued)

monitoring side, a second monitoring terminal deployed at a second-level monitoring side, and a third monitoring terminal deployed at a third-level monitoring side; the monitoring terminal at each level includes a communication module, a human-machine interaction module, a device status monitoring module, a device alarm management module, a video fusion processing module, and a data transmission adjustment and control module.

20 Claims, 3 Drawing Sheets

(72) Inventors: Xianshan Guo, Beijing (CN); Jun Lyu, Beijing (CN); Siyuan Liu, Beijing (CN); Xiang Zhang, Beijing (CN); Yanguo Wang, Nanjing (CN); Zhanguo Zhang, Xuchang (CN); Haifeng Wang, Nanjing (CN); Chong Tong, Beijing (CN); Ming Li, Beijing (CN); Wei Cheng, Beijing (CN); Ning Zhao, Beijing (CN); Zhou Chen, Nanjing (CN); Xiaojun Hou, Shenzhen (CN); Hanqing Zhao, Shenzhen (CN)

(51) Int. Cl.
*H04L 43/0829* (2022.01)
*H04L 43/0864* (2022.01)

(56) References Cited

U.S. PATENT DOCUMENTS

| | | | |
|---|---|---|---|
| 2021/0043059 A1* | 2/2021 | Chen | H04W 52/0206 |
| 2021/0096911 A1 | 4/2021 | Zhu | |
| 2024/0153257 A1* | 5/2024 | Jin | G06V 20/52 |

FOREIGN PATENT DOCUMENTS

| | | |
|---|---|---|
| CN | 104159086 A | 11/2014 |
| CN | 105187771 A | 12/2015 |
| CN | 105680466 A | 6/2016 |
| CN | 107368016 A | 11/2017 |
| CN | 109241060 A | 1/2019 |
| CN | 110460074 A | 11/2019 |
| CN | 110658760 A | 1/2020 |
| CN | 114157687 A | 3/2022 |
| CN | 114745428 A | 7/2022 |
| CN | 115190278 A | 10/2022 |
| WO | 2019233047 A1 | 12/2019 |

OTHER PUBLICATIONS

International Search Report (ISR) in Application No. PCT/CN2023/113310, mailed on Dec. 1, 2023.

Lin, Xinghua et al., "Discussion on power system regulation and control integration monitoring signal management", Electronics World, Dec. 31, 2019, DOI:10.19353/j.cnki.dzsj.2019.12.029, pp. 66-67. 3 pages with English abstract.

* cited by examiner

MONITORING SYSTEM AND METHOD BASED ON DIGITAL CONVERTER STATION

CROSS-REFERENCE TO RELATED APPLICATIONS

This is a continuation of International Patent Application No. PCT/CN2023/113310 filed on Aug. 16, 2023, which claims priority to Chinese Patent Application No. 202211113105.9 filed on Sep. 14, 2022. The disclosures of the above-referenced applications are hereby incorporated by reference in their entirety.

BACKGROUND

At present, a power system achieves remote management by using a "headquarter-province-station" three-level architecture, In the three-level architecture, "headquarter" may refer to headquarter of a grid system, "province" may refer to a provincial unit of the grid system, and "station" may refer to a converter station. With the diverse development of the power system, the three-level architecture is required to have multiple capabilities to achieve multiple functions, so that the power system may be managed comprehensively and efficiently, and diverse functional requirements of the power system are met. Taking a video fusion function as an example, in the three-level architecture, a user may flexibly retrieve video images at the headquarter of the grid system, the provincial unit of the grid system and the converter station, existing video fusion and remote calling technologies are applied to the three-level architecture, a three-level remote access mode is used, and specific implementation process is as follows.

(1) At a station side where the converter station in the "headquarter-province-station" three-level architecture is located, a video fusion rendering engine and hardware and software resources required for video fusion are deployed. The video fusion rendering engine has capabilities such as video processing, three-dimensional (3D) processing, video fusion, rendering and interaction, etc.

(2) At a position where the video fusion rendering engine needs to be used, a front end of a video fusion application is deployed, the video fusion rendering engine is accessed by way of remote interaction: when the user uses the video fusion application at a remote end (the headquarter of the grid system, or the provincial unit of the grid system), the user uses components relevant to video fusion to establish an exclusive session between the remote end and the station side, and remotely access the rendering engine deployed at the station side through the exclusive session; the rendering engine reads preset 3D model scene data such as 3D model, scene resources or the like, and retrieves real-time image/video data acquired by image/video acquisition devices at the station side such as a camera, patrol robot or the like, and dynamically collects service data of the power system such as measurement, ledger or the like, and uses computing resources such as Graphics Processing Unit (GPU), Central Processing Unit (CPU) or the like to fuse and render various data into images which may interact with the user; the rendering engine encodes interactive images, and pushes the interactive images to a remote user through a network in form of a data stream.

During the above implementations, maintenance of user session between the remote end and the station side requires occupying a lot of hardware and software resources and network bandwidth resources, while video fusion is totally completed at the station side, in which 3D video fusion rendering requires computing resources such as CPU, GPU or the like, various data and information resources are required during the video fusion, a process of acquiring information resources also proposes requirements on computing resources and network bandwidth resources, and the station side pushes interactive images of the video fusion to the remote end through the user session, which also requires occupying a lot of network bandwidth resources. However, computing resources and network bandwidth resources of the station side are limited, and may only support concurrent access of a certain number of users; computing resources and network bandwidth resources consumed by the video fusion application will increase with the increase of the number of users, thus a rendering speed of the rendering engine during the video fusion at the station side is seriously affected, resulting in occurrence of significant network delay when the remote end retrieves video images. Especially in case of an emergency failure, with the increase of requirements for the headquarter of the grid system and the provincial unit of the grid system to access the converter station to perform remote command and consultation, the headquarter of the grid system and the provincial unit of the grid system perform panoramic video fusion at the station side, which usually means that at the same station, videos acquired by its multiple front-end camera devices are fused, so that bandwidth requirements increase linearly with the number of users, and exceed an upper limit of station-province exit bandwidth quickly, which cannot meet requirements of remote multi-expert monitoring and difficulty consultation.

Furthermore, because there is usually a far distance between the remote end and the station side, the longest distance there-between may be thousands of kilometers, and multi-level network devices are also required there-between to transmit data. Therefore, network delay caused by factors such as data transmission delay, network device delay, network level complexity or the like to the remote end to retrieve video images cannot be ignored either. Furthermore, in the remote end and the station side, since source and sink ends have different positions, different paths and distances and different network bandwidth usages, transmission delay, sending delay and queuing delay are uncontrollable, so that the network delay is uncertain, especially there is also bandwidth contention on a path from the headquarter of the grid system to the converter station, and insufficient network bandwidth may induce the delay to increase. When video images are accessed, lag occurs and packets are lost, resulting in inconsistent user experience at three different positions, i.e., the headquarter of the grid system, the provincial unit of the grid system, and the converter station.

Based on the above analysis, it may be known that there is a large network delay when the existing three-level remote access mode is used to achieve the video fusion, and uncontrollability of the network delay also increases difficulty of solving the network delay problem, resulting in inability to meet requirements of the video fusion application on interaction delay, and real-time performance of displaying video images is poor, which affects usage effect and user experience of the video fusion application.

SUMMARY

The disclosure relates to the technical field of data processing, and in particular, to a monitoring system and method based on a digital converter station.

An embodiment of the disclosure provides a monitoring system based on a digital converter station, the monitoring system includes a first monitoring terminal deployed at a first-level monitoring side, a second monitoring terminal deployed at a second-level monitoring side, and a third monitoring terminal deployed at a third-level monitoring side; monitored objects of the monitoring system include the digital converter station deployed at the third-level monitoring side; each of the first monitoring terminal, the second monitoring terminal and the third monitoring terminal includes at least a communication module, a human-machine interaction module, a device status monitoring module, a device alarm management module, a video fusion processing module, and a data transmission adjustment and control module; the third monitoring terminal further includes a data storage module configured to store data of the digital converter station.

The communication module is configured to implement communication among the first monitoring terminal, the second monitoring terminal and the third monitoring terminal; the device status monitoring module is configured to monitor and manage ledger information, operation information and monitoring data of all devices of the digital converter station; the device alarm management module is configured to manage alarm information of all devices of the digital converter station; the human-machine interaction module is configured to receive a monitoring retrieval request of a user at a local monitoring side.

Each video fusion processing module is configured to: in response to the monitoring retrieval request of the user at the local monitoring side, perform video fusion processing by using video fusion raw data in the data of the digital converter station, to obtain video fusion images to be retrieved by the user at the local monitoring side.

Each data transmission adjustment and control module is configured to: in a process of transmitting service data from a local monitoring terminal to another monitoring terminal, when a preset rate adjustment condition of the service data is triggered, adjust a current data transmission rate of the service data according to an available network bandwidth and minimum delay time detected before the rate adjustment condition is triggered, a delay time detected when the rate adjustment condition is triggered, and a delay recovery time configured based on a data type of the service data, to continue to transmit the service data to another monitoring terminal in the adjusted data transmission rate.

An embodiment of the disclosure further provides a monitoring method based on a digital converter station, the method is applicable to the monitoring system based on a digital converter station of any one of the above paragraphs, the monitoring system includes a first monitoring terminal deployed at a first-level monitoring side, a second monitoring terminal deployed at a second-level monitoring side, and a third monitoring terminal deployed at a third-level monitoring side; monitored objects of the monitoring system include the digital converter station deployed at the third-level monitoring side; each of the first monitoring terminal, the second monitoring terminal and the third monitoring terminal includes at least a communication module, a human-machine interaction module, a device status monitoring module, a device alarm management module, a video fusion processing module, and a data transmission adjustment and control module; the third monitoring terminal further includes a data storage module configured to store data of the digital converter station. The method includes the following operations.

The communication module implements communication among the first monitoring terminal, the second monitoring terminal and the third monitoring terminal; the device status monitoring module monitors and manages ledger information, operation information and monitoring data of all devices of the digital converter station; the device alarm management module manages alarm information of all devices of the digital converter station; the human-machine interaction module receives a monitoring retrieval request of a user at a local monitoring side.

In response to the monitoring retrieval request of the user at the local monitoring side, each video fusion processing module performs video fusion processing by using video fusion raw data in the data of the digital converter station, to obtain video fusion images to be retrieved by the user at the local monitoring side.

In a process of transmitting service data from a local monitoring terminal to another monitoring terminal, when a preset rate adjustment condition of the service data is triggered, each data transmission adjustment and control module adjusts a current data transmission rate of the service data according to an available network bandwidth and minimum delay time detected before the rate adjustment condition is triggered, a delay time detected when the rate adjustment condition is triggered, and a delay recovery time configured based on a data type of the service data, to continue to transmit the service data to another monitoring terminal in the adjusted data transmission rate.

DETAILED DESCRIPTION

Technical solutions in the embodiments of the disclosure will be clearly and completely described below with reference to the drawings in the embodiments of the disclosure. It is apparent that the described embodiments are only part of the embodiments of the disclosure, rather than all of the embodiments. Based on the embodiments of the disclosure, all other embodiments obtained by those of ordinary skill in the art without paying any creative work should fall within the scope of protection of the disclosure.

Figure 1:
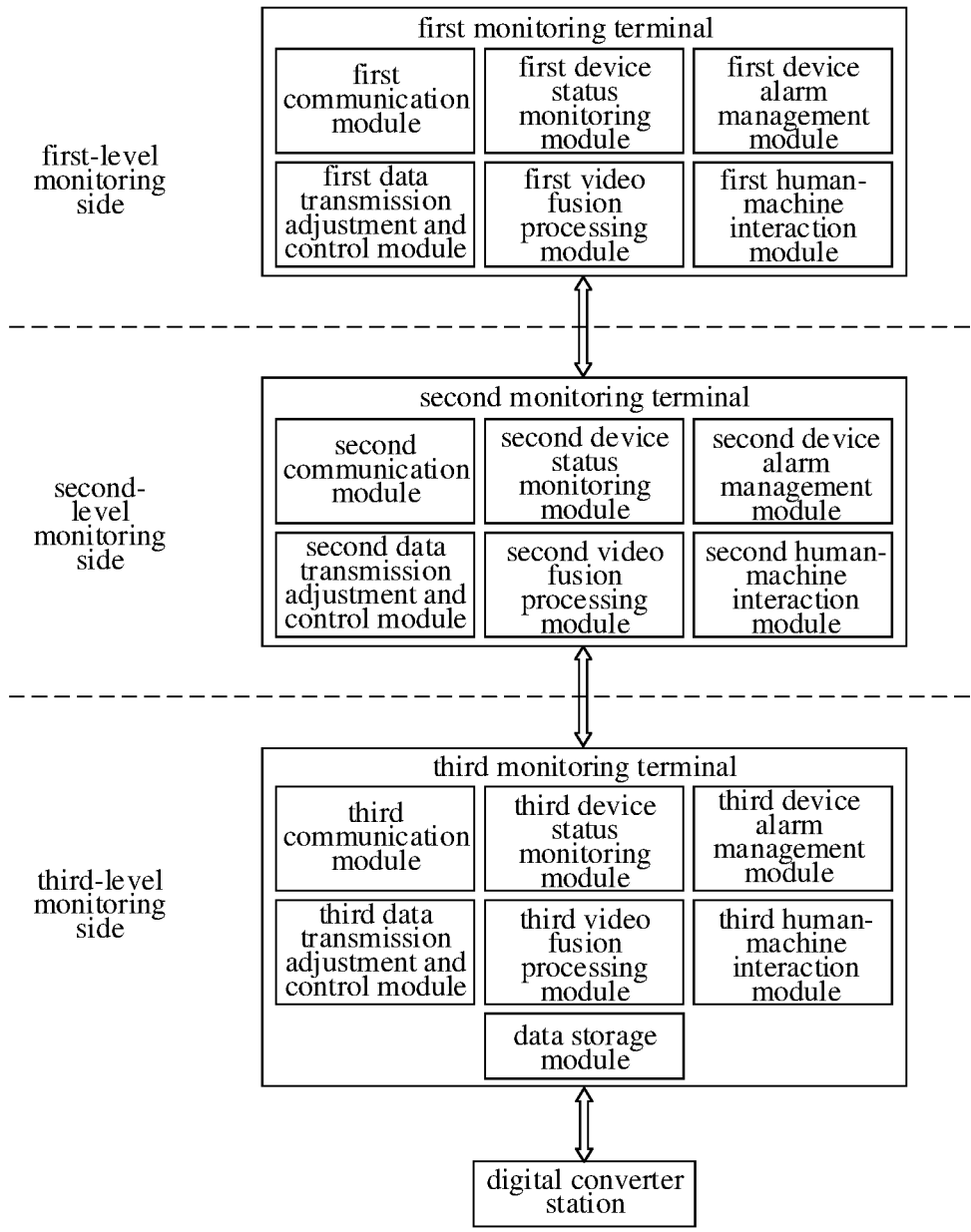
FIG. 1 is a structural block diagram of a preferred embodiment of a monitoring system based on a digital converter station provided in the disclosure.

An embodiment of the disclosure provides a monitoring system based on a digital converter station. With reference to FIG. 1, it is a structural block diagram of a preferred embodiment of a monitoring system based on a digital converter station provided in the disclosure. The monitoring system includes a first monitoring terminal deployed at a first-level monitoring side, a second monitoring terminal deployed at a second-level monitoring side, and a third monitoring terminal deployed at a third-level monitoring side; monitored objects of the monitoring system include the digital converter station deployed at the third-level monitoring side; each of the first monitoring terminal, the second monitoring terminal and the third monitoring terminal includes at least a communication module, a human-machine interaction module, a device status monitoring module, a device alarm management module, a video fusion processing module, and a data transmission adjustment and control module; the third monitoring terminal further includes a data storage module configured to store data of the digital converter station.

The communication module is configured to implement communication among the first monitoring terminal, the second monitoring terminal and the third monitoring terminal; the device status monitoring module is configured to monitor and manage ledger information, operation information and monitoring data of all devices of the digital converter station; the device alarm management module is configured to manage alarm information of all devices of the digital converter station; the human-machine interaction module is configured to receive a monitoring retrieval request of a user at a local monitoring side.

Each video fusion processing module is configured to: in response to the monitoring retrieval request of the user at the local monitoring side, perform video fusion processing by using video fusion raw data in the data of the digital converter station, to obtain video fusion images to be retrieved by the user at the local monitoring side.

Each data transmission adjustment and control module is configured to: in a process of transmitting service data from a local monitoring terminal to another monitoring terminal, when a preset rate adjustment condition of the service data is triggered, adjust a current data transmission rate of the service data according to an available network bandwidth and minimum delay time detected before the rate adjustment condition is triggered, a delay time detected when the rate adjustment condition is triggered, and a delay recovery time configured based on a data type of the service data, to continue to transmit the service data to another monitoring terminal in the adjusted data transmission rate.

Specifically, the monitoring system uses a three-level architecture which mainly consists of the first monitoring terminal deployed at the first-level monitoring side, the second monitoring terminal deployed at the second-level monitoring side, and the third monitoring terminal deployed at the third-level monitoring side. Exemplarily, the first-level monitoring side may be a monitoring side such as headquarter of a grid system or the like, the second-level monitoring side may be a monitoring side such as a provincial unit of the grid system or the like, and the third-level monitoring side may be a monitoring side such as a digital converter station or the like. The monitored objects of the monitoring system include at least the digital converter station deployed at the third-level monitoring side, and may further include other monitored objects. It may be understood that FIG. 1 only shows that the monitoring system includes a first monitoring terminal, a second monitoring terminal, a third monitoring terminal, and a monitored object, and a number of monitoring terminals at each level and a number of monitored objects may be deployed according to actual requirements, which are not specifically limited in the embodiments of the disclosure.

Each of the first monitoring terminal, the second monitoring terminal and the third monitoring terminal includes at least a communication module, a human-machine interaction module, a device status monitoring module, a device alarm management module, a video fusion processing module, and a data transmission adjustment and control module, and the third monitoring terminal further includes a data storage module. As shown in FIG. 1, the first monitoring terminal specifically includes a first communication module, a first human-machine interaction module, a first device status monitoring module, a first device alarm management module, a first video fusion processing module, and a first data transmission adjustment and control module; the second monitoring terminal specifically includes a second communication module, a second human-machine interaction module, a second device status monitoring module, a second device alarm management module, a second video fusion processing module, and a second data transmission adjustment and control module; the third monitoring terminal specifically includes a third communication module, a third human-machine interaction module, a third device status monitoring module, a third device alarm management module, a third video fusion processing module, a third data transmission adjustment and control module, and a data storage module.

It may be understood that in addition to the communication module, the human-machine interaction module, the device status monitoring module, the device alarm management module, the video fusion processing module and the data transmission adjustment and control module, each of the first monitoring terminal, the second monitoring terminal and the third monitoring terminal may also be deployed with other functional modules according to actual requirements respectively, which are not specifically limited in the embodiments of the disclosure.

The communication module is mainly configured to implement communication among the first monitoring terminal, the second monitoring terminal and the third monitoring terminal, that is, communication may be made among the first monitoring terminal, the second monitoring terminal and the third monitoring terminal through the first communication module, the second communication module and the third communication module. The data storage module is mainly configured to store all data of the digital converter station used as the monitored object, and all the data of the digital converter station include at least video fusion raw data of all monitored areas of the digital converter station. The device status monitoring module is mainly configured to monitor and manage ledger information, operation information and monitoring data of all devices of the digital converter station, that is, the first device status monitoring module is mainly configured to remotely monitor and manage ledger information, operation information and monitoring data of all devices of the digital converter station; the second device status monitoring module is mainly configured to remotely monitor and manage ledger information, operation information and monitoring data of all devices of the digital converter station; the third device status monitoring module is mainly configured to monitor and manage ledger information, operation information and monitoring data of all devices of the digital converter station locally. The device alarm management module is mainly configured to manage alarm information of all devices of the digital converter station, and implement an alarm statistic function, a system alarm query function and an application alarm query function, that is, the first device alarm management module is mainly configured to remotely manage alarm information of all devices of the digital converter station, and implement a remote alarm statistic function, a remote system alarm query function and a remote application alarm query function; the second device alarm management module is mainly configured to remotely manage alarm information of all devices of the digital converter station, and implement a remote alarm statistic function, a remote system alarm query function and a remote application alarm query function; the third device alarm management module is mainly configured to manage alarm information of all devices of the digital converter station locally, and implement a local alarm statistic function, a local system alarm query function and a local application alarm query function. The human-machine interaction module is mainly configured to receive an operation request of the user at the local monitoring side, and the operation request includes at least the monitoring retrieval request, that is, the first human-machine interaction module is mainly configured to receive a monitoring retrieval request of a first user at the first-level monitoring side; the second human-machine interaction module is mainly configured to receive a monitoring retrieval request of a second user at the second-level monitoring side; the third human-machine interaction module is mainly configured to receive a monitoring retrieval request of a third user at the third-level monitoring side.

Each video fusion processing module is mainly configured to: in response to the monitoring retrieval request of the user at the local monitoring side, perform video fusion processing by using video fusion raw data of all monitored areas in the data of the digital converter station stored in the data storage module of the third monitoring terminal, to obtain video fusion images to be retrieved by the user at the local monitoring side correspondingly. That is, when the first human-machine interaction module receives the monitoring retrieval request from the first user at the first-level monitoring side, the first video fusion processing module is mainly configured to: in response to the monitoring retrieval request of the first user, perform video fusion processing by using video fusion raw data of all monitored areas in the data of the digital converter station stored in the data storage module, to obtain video fusion images to be retrieved by the first user correspondingly; when the second human-machine interaction module receives the monitoring retrieval request from the second user at the second-level monitoring side, the second video fusion processing module is mainly configured to: in response to the monitoring retrieval request of the second user, perform video fusion processing by using video fusion raw data of all monitored areas in the data of the digital converter station stored in the data storage module, to obtain video fusion images to be retrieved by the second user correspondingly; when the third human-machine interaction module receives the monitoring retrieval request from the third user at the third-level monitoring side, the third video fusion processing module is mainly configured to: in response to the monitoring retrieval request of the third user, perform video fusion processing by using video fusion raw data of all monitored areas in the data of the digital converter station stored in the data storage module, to obtain video fusion images to be retrieved by the third user correspondingly.

Optionally, when the first human-machine interaction module receives a monitoring image adjustment request from the first user at the first-level monitoring side, the first video fusion processing module is further configured to: in response to the monitoring image adjustment request from the first user, adjust a currently displayed video fusion image correspondingly, to meet monitoring visual requirements of the first user such as visual angle control, camera switching or the like; similarly, when the second human-machine interaction module receives a monitoring image adjustment request from the second user at the second-level monitoring side, the second video fusion processing module is further configured to: in response to the monitoring image adjustment request from the second user, adjust a currently displayed video fusion image correspondingly, to meet monitoring visual requirements of the second user such as visual angle control, camera switching or the like; when the third human-machine interaction module receives a monitoring image adjustment request from the third user at the third-level monitoring side, the third video fusion processing module is further configured to: in response to the monitoring image adjustment request from the third user, adjust a currently displayed video fusion image correspondingly, to meet monitoring visual requirements of the third user such as visual angle control, camera switching or the like.

It should be noted that the video fusion raw data specifically refers to various raw data required by the video fusion processing module when it performs video fusion processing, which may include image/video data acquired by an image/video acquisition device deployed at the digital converter station such as a camera, a patrol robot or the like, measurement point data acquired by a sensor deployed at the digital converter station, model scene data corresponding to a three-dimensional (3D) model of the digital converter station and scene resources, measurement and status data acquired by a power measurement device, an environmental measurement device or the like deployed at the digital converter station, ledger data of related devices of the digital converter station, device topology relationship data, etc. A rendering engine reads various raw data required for video fusion from the data storage module, render and process data by using a 3D model, so that various raw data may be rendered and processed into video fusion images.

Each data transmission adjustment and control module is mainly configured to: in the process of transmitting service data from the local monitoring terminal to another monitoring terminal, when the preset rate adjustment condition of the service data is triggered, adjust the current data transmission rate of the service data according to the available network bandwidth detected before the rate adjustment condition is triggered, the minimum delay time detected before the rate adjustment condition is triggered, the delay time detected when the rate adjustment condition is triggered, and the delay recovery time configured based on the data type of the service data, to continue to transmit the service data to another monitoring terminal in the adjusted data transmission rate.

The available network bandwidth and the minimum delay time before the rate adjustment condition is triggered may be correspondingly obtained according to network bandwidth detection performed between the local monitoring terminal and another monitoring terminal before the rate adjustment condition is triggered. Operation process of the network bandwidth detection will be specifically introduced in operation process of a network detection module in the following embodiments, and are not elaborated here. The delay time detected when the rate adjustment condition is triggered may be obtained by monitoring a transmission process of the service data. For example, the service data is transmitted from the local monitoring terminal to another monitoring terminal in form of service packet, and each time when an acknowledgement (ACK) packet responded by another monitoring terminal is received, a Round-Trip Time (RTT) value corresponding to the service packet may be obtained, then a most recently obtained RTT value when the rate adjustment condition is triggered may be used as the delay time detected when the rate adjustment condition is triggered. The delay recovery time specifically refers to a time required for the delay time to be restored from a corresponding delay time when the rate adjustment condition is triggered, to a corresponding minimum delay time before the rate adjustment condition is triggered, that is, a time required for the RTT value to be restored from a corresponding RTT value when the rate adjustment condition is triggered, to a corresponding RTT value before the rate adjustment condition is triggered, that is, a time required to clear service packets in a buffer. The delay recovery time may be correspondingly configured according to the data type of the service data. For example, different data types may be correspondingly configured with different delay recovery times, which indicate different requirements of users on the delay recovery time during transmission of different data types of service data. Different delay recovery times are configured, so that rate adjustment values of different data types of service data may be determined correspondingly, thus network bandwidths occupied by different data types of service data during transmission may be configured accordingly, and the available network bandwidth may be configured to be used by service data with a higher priority, to achieve optimal configuration of resources.

It should be noted that since the service data is transmitted from the local monitoring terminal to another monitoring terminal in form of service packet, a variation trend of the RTT value corresponding to the service packet may be monitored. Therefore, the rate adjustment condition may be set as: it is determined that the RTT value increases to a preset delay time threshold for the first time, that is, when it is determined that the RTT value of the service packet increases to the preset delay time threshold for the first time, it is determined that the rate adjustment condition is triggered. Or, a packet loss situation of the service packet may be monitored. Then, the rate adjustment condition is set as: a packet loss report is received for the first time, that is, when the packet loss report is received for the first time, it is determined that the rate adjustment condition is triggered. It may be understood that the rate adjustment condition may also be set as other conditions according to actual requirements (for example, a relevant determination condition corresponding to network congestion), and the set rate adjustment condition may be applicable to various data types of service data, which are not specifically limited in the embodiments of the disclosure.

It should be noted that data types of the service data may be classified according to functions which may be implemented by the monitoring system. Based on various functions which may be implemented by the monitoring system, the service data transmitted from one monitoring terminal to another monitoring terminal may also include various data types, for example, the data types may include device status monitoring service data corresponding to implementation of functions of the device status monitoring module, device alarm service data corresponding to implementation of functions of the device alarm management module, video fusion service data corresponding to implementation of functions of the video fusion processing module, etc. During transmission of each data type of service data, the rate adjustment solution provided in the embodiments of the disclosure may be used to adjust the data transmission rate of the service data in real time, and for each data type of service data, specific rate adjustment solution is only performed during transmission of the same data type of service data. That is, when the data transmission rate needs to be adjusted during transmission of a certain data type of service data, only a current data transmission rate of this data type of service data is adjusted according to the rate adjustment solution provided in the embodiments of the disclosure, rather than adjusting data transmission rates of all data types of service data. Therefore, it does not affect data transmission processes of other data types of service data, and does not affect usage experience of other service functions, either.

Further, in the embodiment of the disclosure, adjustment of the data transmission rate of the service data starts only when the rate adjustment condition is determined to be triggered, rather than arbitrarily determining an adjustment time of the data transmission rate, nor continuously adjusting the data transmission rate. Therefore, it may reduce unnecessary resource occupation and save resources to a certain extent, and when the data transmission rate is adjusted actually, an adjustment value of the data transmission rate is determined according to the available network bandwidth and minimum delay time detected before the rate adjustment condition is triggered, the delay time detected when the rate adjustment condition is triggered, and the delay recovery time configured based on the data type of the service data, rather than arbitrarily adjusting size of the data transmission rate, nor presetting a fixed rate adjustment rate. With the rate adjustment solution provided in the embodiments of the disclosure, adaptability of the rate adjustment solution and accuracy of a rate adjustment size may be improved, so that the adjusted data transmission rate is more suitable for a current network status and user requirements; furthermore, when the data transmission rate is adjusted by using an inappropriate rate adjustment value, it also easily results in a network oscillation problem, however, the rate adjustment solution provided in the embodiments of the disclosure may avoid network oscillation.

Compared with some implementations, the monitoring system based on a digital converter station provided in the embodiment of the disclosure has the following advantageous effects.

(1) Functional modules such as the video fusion processing module, the device status monitoring module, the device alarm management module or the like are deployed at each of the first monitoring terminal, the second monitoring terminal and the third monitoring terminal respectively, so that each function of the monitoring system supports that the function is completed locally by the monitoring terminal at each level itself, and does not need to be completed by the station side completely, which greatly reduces occupation of resources of the station side.

(2) The video fusion processing module is deployed at each of the first monitoring terminal, the second monitoring terminal and the third monitoring terminal respectively, so that the first monitoring terminal, the second monitoring terminal and the third monitoring terminal may respond locally to the monitoring retrieval request of the user at the local monitoring side respectively, it is unnecessary for the station side to respond to the monitoring retrieval request of the user of the monitoring side at each level completely, the user may directly view video fusion images locally without retrieving the images from a remote end, which effectively relieves pressure of the station side responding to multi-user concurrent access, so that on the premise of limited network bandwidth and computing resources of the station side, network delay may be effectively reduced, real-time performance of displaying video images may be improved, and usage effect and user experience of the video fusion application may be improved. Therefore, there is consistent user experience at three different positions, i.e., the first-level monitoring side, the second-level monitoring side and the third-level monitoring side.

(3) The data transmission adjustment and control module is deployed at each of the first monitoring terminal, the second monitoring terminal and the third monitoring terminal respectively, so that during transmission of the service data among the first monitoring terminal, the second monitoring terminal and the third monitoring terminal, when the rate adjustment condition is triggered, the current data transmission rate of the service data may be adjusted according to the available network bandwidth and minimum delay time detected before the rate adjustment condition is triggered, the delay time detected when the rate adjustment condition is triggered, and the delay recovery time configured based on the data type of to-be-transmitted service data. Therefore, an appropriate data transmission rate may be configured for the service data before the service data is sent, which may effectively avoid the problem that network delay is difficult to be solved due to uncontrollability of the network delay during transmission after the service data is sent, and reduce difficulty of solving the network delay problem.

(4) When the rate adjustment condition is triggered, the data transmission adjustment and control module adjusts the current data transmission rate of the service data according to the available network bandwidth and minimum delay time detected before the rate adjustment condition is triggered, the delay time detected when the rate adjustment condition is triggered, and the delay recovery time configured based on the data type of to-be-transmitted service data. Therefore, an adjustment value of the data transmission rate may be accurately determined; furthermore, the available network bandwidth and minimum delay time detected before the rate adjustment condition is triggered, and the delay time detected when the rate adjustment condition is triggered, are parameter values complying with a real-time network status better, and the delay recovery time configured based on the data type of the service data is a parameter value complying with user requirements better. The adjustment value of the data transmission rate is determined in real time according to these parameters, so that the adjusted data transmission rate is more suitable for the current network status and user requirements, thereby improving accuracy of adjusting the data transmission rate, and improving adaptability of the rate adjustment solution.

(5) During transmission of different data types of service data, the rate adjustment solution provided in the embodiments of the disclosure may be used to adjust the data transmission rate of the service data in real time, and for each data type of service data, specific rate adjustment solution is only performed during transmission of the same data type of service data, rather than performing the same adjustment on data transmission rates of all data types of service data. Therefore, it does not affect data transmission processes of other data types of service data, and does not affect usage experience of other service functions, either.

(6) Service data may be correspondingly configured with different priorities (or importance levels) according to different data types. For example, the video fusion service data has a higher time requirement and is correspondingly configured with a higher priority, and other data types of service data have lower time requirements and are correspondingly configured with lower priorities. Different data types are configured with corresponding delay recovery times, so that the priority of the service data matches the delay recovery time, which may meet different delay recovery requirements of service data with different priorities; the available network bandwidth is configured to be used by service data with a higher priority, thereby achieving optimal configuration of network resources, and improving flexibility of the rate adjustment solution, too.

(7) The rate adjustment solution provided in the embodiments of the disclosure may achieve accurate adjustment of the data transmission rate without relying on intermediate devices, and the rate adjustment solution is simple, easy to be deployed and implemented, occupies few resources, and has high practicability.

In another preferred embodiment, the data transmission adjustment and control module configured to: in the process of transmitting the service data from the local monitoring terminal to another monitoring terminal, when the preset rate adjustment condition of the service data is triggered, adjust the current data transmission rate of the service data according to the available network bandwidth and minimum delay time detected before the rate adjustment condition is triggered, the delay time detected when the rate adjustment condition is triggered, and the delay recovery time configured based on the data type of the service data, to continue to transmit the service data to another monitoring terminal in the adjusted data transmission rate, specifically includes that:

in the process of transmitting the service data from the local monitoring terminal to another monitoring terminal, when the preset rate adjustment condition of the service data is triggered, the data transmission adjustment and control module acquires an available network bandwidth S0 and minimum delay time RTT0 detected before the rate adjustment condition is triggered, a delay time RTT2 detected when the rate adjustment condition is triggered, and a delay recovery time t configured based on the data type of the service data, the data transmission adjustment and control module calculates and obtains a current available network bandwidth estimation value S2 according to a formula S2=RTT0/RTT2*S0, the data transmission adjustment and control module calculates and obtains a service data volume n entering a buffer according to a formula n=(RTT2−RTT0)*S0, the data transmission adjustment and control module calculates and obtains a rate adjustment target value S2' of the service data according to a formula S2'=S2−n/t, the data transmission adjustment and control module adjusts the current data transmission rate of the service data according to the rate adjustment target value S2' to obtain an adjusted data transmission rate S0' which meets S0'≤S2', to continue to transmit the service data to another monitoring terminal in the adjusted data transmission rate S0'.

Specifically, with reference to the above embodiments, in the process of transmitting the service data from the local monitoring terminal to another monitoring terminal, when it is determined that the rate adjustment condition preset for the service data is triggered, the data transmission adjustment and control module may adjust the data transmission rate during continuous transmission of the service data. Specific implementation process of the rate adjustment solution is as follows. The data transmission adjustment and control module acquires the available network bandwidth and minimum delay time detected and obtained by performing network bandwidth detection before the rate adjustment condition is triggered, marks the available network bandwidth as S0, and marks the minimum delay time as RTT0; acquires the delay time detected and obtained by monitoring the RTT value of the service packet when the rate adjustment condition is triggered, and marks the delay time as RTT2;

acquires the delay recovery time configured based on the data type of the service data, and marks the delay recovery time as t. After obtaining these parameter values, the data transmission adjustment and control module may calculate and obtain the current available network bandwidth estimation value S2 according to the formula $S2=RTT0/RTT2*S0$; calculate and obtain the service data volume n entering the buffer from the service data sent, according to the formula $n=(RTT2-RTT0)*S0$; and then calculate and obtain the rate adjustment target value S2' for continuous transmission of the service data according to the formula $S2'=S2-n/t$. At this time, the data transmission adjustment and control module may adjust the current data transmission rate of the service data according to the rate adjustment target value S2' obtained by calculation, to obtain an adjusted data transmission rate correspondingly, to continue to transmit the service data to another monitoring terminal in the adjusted data transmission rate. The adjusted data transmission rate is marked as S0', then the adjusted data transmission rate S0' meets $S0' \leq S2'$.

Before the rate adjustment condition is triggered, the available network bandwidth S0 and the minimum delay time RTT0 have been determined according to the network bandwidth detection. When the rate adjustment condition is triggered, the current data transmission rate of the service data needs to be adjusted. However, when the data transmission rate is adjusted actually, since the available network bandwidth is not S0 any more, it is necessary to know what a current available network bandwidth is. When the current available network bandwidth is detected and obtained by performing the network bandwidth detection again, since it needs to take a certain time to complete an implementation process of the network bandwidth detection, the current available network bandwidth obtained by the detection has a certain lag, real-time performance thereof is not high, thereby affecting accuracy and real-time performance of subsequent rate adjustment. Furthermore, it may be understood that the rate adjustment solution itself requires service packets in the buffer to be cleared as soon as possible when the rate adjustment condition is triggered, and the delay time may be restored to normal as soon as possible. Therefore, after the rate adjustment condition is triggered, not many time is reserved to perform operations of the network bandwidth detection. Or, based on requirements of real-time performance, there is not enough time to detect and obtain the current available network bandwidth by performing the network bandwidth detection again. Therefore, in the embodiment of the disclosure, the current available network bandwidth estimation value S2 may be calculated and obtained according to the formula $S2=RTT0/RTT2*S0$, to reflect variation of the available network bandwidth through variation of the delay time, so that the current available network bandwidth estimation value S2 may be quickly estimated and obtained, improving real-time performance. $RTT0*S0$ represents a total service data volume sent by the local monitoring terminal in the RTT0 time, $RTT2*S0$ represents a total service data volume sent by the local monitoring terminal in the RTT2 time, that is, a data volume of in-transit packets. When the delay time increases from RTT0 to RTT2, it is considered that the service data volume sent by the local monitoring terminal in an increased (RTT2−RTT0) time may enter the buffer most likely. When the rate adjustment condition is triggered, service packets in the buffer need to be cleared by adjusting the data transmission rate of the service data, and the delay time is restored from RTT2 to RTT0. Therefore, in the embodiment of the disclosure, the service data volume n entering the buffer from the service data sent, may be calculated and obtained according to the formula $n=(RTT2-RTT0)*S0$; and then, the time required to clear service packets in the buffer is further determined based on the delay recovery time t, that is, the rate adjustment target value S2' required for continuous transmission of the service data may be calculated and obtained according to the formula $S2'=S2-n/t$.

Exemplarily, it is assumed that before the rate adjustment condition is triggered, the available network bandwidth S0 and the minimum delay time RTT0 have been determined according to the network bandwidth detection, and the service data is transmitted with S0 as the data transmission rate at the beginning. During transmission of the service data, it is determined that the rate adjustment condition is triggered at a time point T2, and it is monitored that the delay time increases from RTT0 to RTT2. At this time, there is not enough time to determine the current available network bandwidth by the network bandwidth detection. Then, the current available network bandwidth estimation value S2 may be directly calculated and obtained according to the formula $S2=RTT0/RTT2*S0$; the service data volume n entering the buffer from the service data sent, may be calculated and obtained according to the formula $n=(RTT2-RTT0)*S0$; and the rate adjustment target value S2' for continuous transmission of the service data may be calculated and obtained according to the formula $S2'=S2-n/t$, the data transmission rate may be directly reduced from S0 to S2' to continue to transmit the service data, thereby quickly determining the rate adjustment value.

It should be noted that when the data transmission adjustment and control module adjusts the current data transmission rate of the same data type of service data according to the rate adjustment target value S2' obtained by calculation, the obtained adjusted data transmission rate S0' should meet $S0' \leq S2'$, that is, the current data transmission rate may be directly reduced to S2', that is, the obtained adjusted data transmission rate S0' meets $S0'=S2'$; or, the current data transmission rate may be further reduced based on S2', that is, the obtained adjusted data transmission rate S0' meets $S0'<S2'$. It may be understood that the greater the reduction amplitude of S0' compared with S2', the smaller the obtained S0', and the faster the response speed of processing increase of delay, that is, service packets in the buffer may be cleared faster, so that the delay time may be restored to normal faster, and the problem of increase of delay may be solved more timely.

It may be understood that when the rate adjustment target value is calculated through the formula, it is necessary to acquire specific parameter values of parameters in the formula to perform the calculation, while the network status always changes dynamically in real time, a process of acquiring the parameter values itself has a certain lag. Therefore, fixedly set parameters of the formula are not suitable for the dynamically changing network status, and the more complex the calculation formula is, the less the delay effect caused by the lag of acquiring the parameter values is negligible, instead, the more inaccurate the calculation result is. The rate adjustment solution provided in the embodiments of the disclosure has simple operations and is easy to be deployed and implemented, and the available network bandwidth and minimum delay time detected before the rate adjustment condition is triggered, and the delay time detected when the rate adjustment condition is triggered, are parameter values complying with a real-time network status better, and the delay recovery time configured based on the data type of the service data is a parameter value complying with user requirements better. The adjustment value of the data transmission rate is determined in real time according to these parameters, so that the adjusted data transmission rate is more suitable for the current network status and user requirements, thereby improving accuracy of adjusting the data transmission rate, and improving adaptability of the rate adjustment solution.

As an improvement of the above solution, the delay recovery time is obtained by the data transmission adjustment and control module querying a preset delay recovery time table according to the data type of the service data, the delay recovery time table includes at least one data type and a delay recovery time configured corresponding to each data type, and the higher the priority of service data corresponding to each data type, the shorter the delay recovery time configured corresponding thereto.

Specifically, with reference to the above embodiments, a delay recovery time table is preset in the data transmission adjustment and control module, and the delay recovery time table includes at least one data type and a delay recovery time configured corresponding to each data type. That is, in the delay recovery time table, there are one-to-one correspondences between the delay recovery time and the data type, and the higher the priority of service data corresponding to the data type, the shorter the delay recovery time configured corresponding thereto, that is, it is required that service packets in the buffer may be cleared faster, so that the delay time may be restored to normal faster. Then, when the data transmission adjustment and control module acquires the delay recovery time configured based on the data type of to-be-transmitted service data, the data transmission adjustment and control module may query the delay recovery time table according to the data type of to-be-transmitted service data, find out a data type matching the data type of to-be-transmitted service data from all data types included in the delay recovery time table, and set a delay recovery time corresponding to the found data type in the delay recovery time table as the delay recovery time configured based on the data type of to-be-transmitted service data.

It should be noted that based on multiple functions which may be implemented by the monitoring system, the to-be-transmitted service data may also include multiple data types, and correspondingly, data types in the delay recovery time table may also include multiple data types, such as video fusion service data described in the above embodiments (with reference to the following embodiments, the video fusion service data may include video stream data corresponding to transmission of video fusion images, or service data corresponding to transmission of video fusion raw data of a designated monitored area), device status monitoring service data, device alarm service data, etc. Different data types may be correspondingly configured with different delay recovery times according to different priorities (or importance levels) of corresponding service data. The priority (or importance level) of service data may be configured according to actual requirements, and priorities (or importance levels) of service data corresponding to different data types may be configured to be the same or different. For example, it is assumed that the video fusion service data has a higher real-time requirement and correspondingly has a higher priority (or a higher importance level), and other data types of service data have lower real-time requirements and correspondingly have lower priorities (or lower importance levels). In the delay recovery time table, the data type corresponding to the video fusion service data may be configured with a shorter delay recovery time, and data types corresponding to other data types of service data may be configured with a greater delay recovery time; furthermore, the video fusion service data may be configured with a higher priority separately, and all other data types of service data may be configured with a lower priority in a unified manner, or may be configured with different lower priorities according to actual requirements of other data types of service data respectively, which are not specifically limited in the embodiments of the disclosure.

According to the monitoring system based on a digital converter station provided in the embodiments of the disclosure, different data types are configured with corresponding delay recovery times according to the priorities of service data, so that the priority of the service data matches the delay recovery time, which may meet different delay recovery requirements of service data with different priorities; in a process of adjusting the data transmission rate of service data, different rate adjustment values may be determined based on different delay recovery times configured corresponding to different priorities of service data, to determine occupancy of the available network bandwidth when service data with different priorities continue to transmit, the available network bandwidth may be configured to be used by service data with a higher priority, thereby achieving optimal configuration of network resources, while improving flexibility of the rate adjustment solution, too.

In yet another preferred embodiment, the third monitoring terminal further includes a fault recording management module, a data report management module, a digital station area management module, and a remote intelligent patrol module.

The fault recording management module is configured to manage a fault recording file of the digital converter station, and perform online parsing according to the fault recording file.

The data report management module is configured to perform statistics on the service data of the digital converter station, present historical data, statistical data and analysis data in different report forms according to operation and maintenance requirements of the digital converter station, and implement a report task formulation function, an automatic report generation function, a report exporting function and a report printing function.

The digital station area management module is configured to monitor and manage security, fire protection and power environment of the digital converter station with a station area of the digital converter station as a main body.

The remote intelligent patrol module is configured to control a monitoring device to perform joint patrol operations of indoor and outdoor devices, and analyze patrol data to form a patrol result and patrol report.

Specifically, with reference to the above embodiments, the third monitoring terminal further includes a fault recording management module, a data report management module, a digital station area management module, and a remote intelligent patrol module. The fault recording management module is mainly configured to manage the fault recording file of the digital converter station, and perform online parsing according to the fault recording file, to present waveform of each channel, configuration parameters, fault report information, etc. The data report management module is mainly configured to perform statistics on the service data of the digital converter station, present historical data, statistical data and analysis data in different report forms (for example, in form of daily report, weekly report, monthly report or other reports) according to operation and maintenance requirements of the digital converter station, and implement a report task formulation function, an automatic report generation function, a report exporting function, a report printing function, etc. The digital station area management module is mainly configured to monitor and manage assistant monitoring information such as security, fire protection and power environment of the digital converter station or the like in a unified manner, with the station area of the digital converter station as a main body, relying on a unified 3D base of the whole station. The remote intelligent patrol module is mainly configured to control the monitoring device (such as a camera, robot, drone, voiceprint monitoring device, etc.) to perform joint patrol operations of indoor and outdoor devices, receive the acquired patrol data, intelligently analyze the acquired patrol data to form the patrol result and patrol report, and send an alarm in time.

It should be noted that the fault recording management module, the data report management module, the digital station area management module and the remote intelligent patrol module are usually deployed at the third monitoring terminal, or may be deployed at three levels according to actual requirements, that is, at least one of the fault recording management module, the data report management module, the digital station area management module and the remote intelligent patrol module may also be deployed at the first monitoring terminal and the second monitoring terminal respectively, which are not specifically limited in the embodiments of the disclosure.

According to the monitoring system based on a digital converter station provided in the embodiments of the disclosure, in addition to three-level deployment of functional modules such as the video fusion processing module, the device status monitoring module, the device alarm management module or the like, the fault recording management module, the data report management module, the digital station area management module and the remote intelligent patrol module are also deployed at the third monitoring terminal, so that monitored objects may be monitored and managed diversely to meet diverse management requirements of users.

In yet another preferred embodiment, the digital converter station is provided with a unified common component, the common component includes a service component and a data component, and the service component and the data component are configured to provide a service function interface and basic data service based on a unified specification to each application system of the digital converter station, and formulate a unified data interaction protocol and data interaction format, to provide a unified data service interface to the third monitoring terminal.

Specifically, with reference to the above embodiments, the digital converter station used as the monitored object is provided with the unified common component, the common component mainly includes the service component and the data component, and the service component and the data component are configured to provide the service function interface and basic data service based on a unified specification to each application system of the digital converter station, and formulate the unified data interaction protocol and data interaction format, to provide the unified data service interface to the third monitoring terminal, so that the third monitoring terminal may acquire data from the digital converter station based on the unified data service interface, and store the data in the data storage module, thus the monitoring system may call required data from the data storage module.

It should be noted that existing converter stations do not use a unified model specification and data specification usually, and each application subsystem in the converter station is also built and managed independently, and when video fusion-related device model data, measurement point acquisition data, monitoring video stream data, or other data are accessed from each application subsystem, they need to cross border protection devices such as firewalls, security gateways or the like between various application subsystems, while corresponding model mapping, protocol development and data format conversion are required for a private model format, private interaction protocol and private data format for each application subsystem, which increases data interaction cost and time cost, and results in corresponding increase of docking complexity and network delay when the converter station interacts with the outside world. However, in the embodiment of the disclosure, the digital converter station is provided with the unified common component, and may provide the unified data service interface to the third monitoring terminal, so that when the monitoring system implements various functions, the problem of docking complexity and network delay when the converter station interacts with the outside world, may be effectively solved.

As an improvement of the above solution, the digital converter station is provided with a unified basic application, and the basic application is built by using a unified basic software and hardware facility, a unified data model, a unified data service specification and a unified application development specification.

Specifically, with reference to the above embodiments, in addition to the unified common component, the digital converter station is also provided with the unified basic application, and such basic application is built by using the unified basic software and hardware facility, the unified data model, the unified data service specification and the unified application development specification, so that when the monitoring system implements various functions, it may provide unified and standardized data services to the monitoring terminal at each level respectively.

It should be noted that a unified management device may be deployed at the station side of the digital converter station, to manage the digital converter station (docking with the third monitoring terminal). The management device may consist of one or more servers, to solve the problem of separate construction of software and hardware of each sub-application system in the station with inconsistent specifications. The management device includes a standardized basic platform, to provide a series of infrastructure services such as a virtual machine (VM), container, distributed storage, graphics acceleration, Artificial Intelligence (AI) inference or the like to the common component and service application of the digital converter station. The basic platform includes basic hardware and basic software. The basic hardware refers to a set of hardware which provides computing, storage and network resources to all software and services provided for the digital converter station and supports operation of each application. The basic hardware includes a storage and computing fusion node, graphics processing node, video access node, general-purpose computing node, AI computing node, graphics card, and node interconnect switch. The basic software refers to services and resources which rely on basic hardware to run, integrate and schedule hardware resources, and accept calling by or relying on the common component or application software. The basic software includes virtualization, container management, distributed storage, infrastructure management and operating system (OS), to provide elastic and heterogeneous computing resource pools and storage resource pools for the whole station.

An operation and maintenance management system based on the digital converter station may be further built on the standardized basic platform, to manage the digital converter station. The operation and maintenance management system mainly consists of a common component and basic application. The common component includes a service component and a data component, to solve problems of chimney construction of each sub-application system of the converter station, inconsistent specifications for data acquisition and data interaction, point-to-point private protocol interaction, etc. The service component and the data component provide a service function interface and basic data service based on a unified specification to each application system of the digital converter station, and formulate a unified data interaction protocol and data interaction format, to provide a unified platform for data interaction of multiple sub-application systems. The basic application is deployed by way of separating front-end and back-end, and the front-end of application is deployed at the monitoring terminal at each level respectively. Various functions of the monitoring system are implemented by calling data of the back-end of the basic application to perform corresponding processing.

Exemplarily, the basic application is deployed in a distributed manner by way of separating front-end and back-end, which may implement a platform system providing consistent service experience at the remote end and station side, and including a station-side data component, service component, basic application, corresponding Direct Current (DC) technology center at the headquarter, integrated application at a middle office side of a provincial unit, and related support components. The basic application is deployed at the converter station by way of separating front-end and back-end, while the front end of the application or browser is deployed at the provincial unit and the headquarter. Data, contents, pages, or the like of the back end of the basic application are called, to ensure consistency of user experience at different positions of the headquarter of the grid system, the provincial unit of the grid system, and the digital converter station.

Exemplarily, the digital converter station in the embodiments of the disclosure may provide a unified data model maintenance technology; perform device-oriented modeling based on the unified model specification, based on CIM and SG-CIM model architectures in combination with service application requirements; establish a regional model according to model hierarchy of the converter station, including a DC field, an Alternating Current (AC) field or the like; establish a device model in the regional model, including a converter transformer, converter valve, current transformer, DC arrester, or the like; continue to establish a measurement point model in the device model, including temperature, humidity, voltage, current, or the like; finally, establish a station-wide geographic area, primary and secondary devices, acquisition measurement points, and model association of each application subsystem, and provide a unique ID to the station-wide device and measurement point model, to achieve standardized integration of the station-wide model data, and achieve horizontal collaboration and vertical connection of service and information. When video fusion is performed, ledger information, operation data information and status information of a corresponding device may be presented by using 3D and videos according to the unified model. When an alarm is sent, position of a corresponding alarm device may be found by a corresponding model ID in the 3D and video model, to present alarm data information in real time, and facilitate an operation and maintenance personnel to locate the alarm.

Exemplarily, the digital converter station in the embodiments of the disclosure may also provide a unified data service technology based on operation data of the converter station, implement unified convergence and flexible sharing of different types and different maintenance data of the whole station, and solve point-to-point interaction and private protocol problems of multiple application systems. Main functions thereof include: a data cross-safe area convergence function, implementing a function of converging various types of master control systems and auxiliary control systems from safe areas I and II to safe area IV through a unified standard integration stipulation such as 104 or 61850 stipulation, and finally accessing to the station platform, to implement integrated access of data across areas by using a one-way data transmission function meeting safety specifications through a safety isolation device; an access and sharing function of real-time data and alarm data, accessing real-time acquired and alarm data through a bus in real time, and providing a real-time data query interface, data subscription interface and historical data query interface based on a station service interaction specification; a station-wide video data access and sharing service, accessing video data of cameras of the whole station through a unified standard stipulation, and providing a real-time video data stream interface and video playback interface based on the station service interaction specification; a station-wide file data access and sharing service, mainly related to convergence and sharing of a fault recording file, infrared image file or other file data, and providing file data upload, download and query interfaces based on the station service interaction specification.

Exemplarily, in the digital converter station in the embodiments of the disclosure, a digital converter station management device with a unified standard is formed by unifying devices of each application subsystem in the station, including unification of hardware resources. A unified hardware resource pool is formed by using domestic self-controllable hardware device, and a unified domestic self-controllable OS is used as a software operation environment. Furthermore, public software and middleware are settled in a unified manner to form a unified basic software layer, and a unified standard service is provided for a last application. The management device includes a server, network device, firewall, storage device and virtualization device. The management devices may be implemented by one or more servers. The management device standardizes and serializes computing power of the servers to form four types of edge computing power serialization specifications (integrated cabinet, superfusion device, edge computing device, industry-adapted device), while standardizes an edge computing VM, container or other basic OSs. The standardization and serialization of edge computing power improve standardization of edge applications and effective usage of ICT capabilities. Computing power of CPU is standardized by way of allocating time slices, so that basic units of computing power provided for different applications are consistent, thereby improving deployment efficiency of edge hardware and applications, and providing a basis for efficient operation and maintenance; a unified collaboration module is also provided as a general-purpose data component in the architecture, deployed at three levels, communicates with each other synchronously, provides full and incremental data synchronization, real-time and timing data synchronization to all applications, and schedules tasks according to Application Programming Interface (API), message mode based on task triggering rules such as time, data volume or the like, to achieve cross-station, cross-cloud and cross-network data collaboration, while support standardization of components and application interfaces in the station. 1. External oriented interfaces of the station are unified to facilitate seamless expansion of applications inside and outside the station; 2. Registration and management are unified to facilitate globalization management, control and standardized construction; 3. Interaction relationships of components in the station are unified, and division of labor between components is standardized, to facilitate building a basic core system as a whole. The digital converter station management device with unified standard provides an in-station operation environment basis to cloud-edge collaboration of the three-level deployment architecture of video fusion, and provides a unified service interface to video stream synchronization, model, data and alarm synchronization, it is a premise of multi-station promotion of cloud-edge collaboration functions of video fusion.

As an improvement of the above solution, the basic application includes a station-wide video management and control application, a station-wide 3D presentation application, a device status overview application, a device alarm overview application, a fault recording management application, an intelligent report management application, a digital station area management application, and a remote intelligent patrol application. The station-wide video management and control application and the station-wide 3D presentation application are configured to provide services to the video fusion processing module, the device status overview application is configured to provide services to the device status monitoring module, the device alarm overview application is configured to provide services to the device alarm management module, the fault recording management application is configured to provide services to the fault recording management module, the intelligent report management application is configured to provide services to the data report management module, the digital station area management application is configured to provide services to the digital station area management module, and the remote intelligent patrol application is configured to provide services to the remote intelligent patrol module.

Specifically, with reference to the above embodiments, the basic application of the digital converter station mainly includes the station-wide video management and control application, the station-wide 3D presentation application, the device status overview application, the device alarm overview application, the fault recording management application, the intelligent report management application, the digital station area management application, and the remote intelligent patrol application.

The station-wide video management and control application is mainly configured to provide services to the video fusion processing module of the monitoring terminal at each level. The station-wide video management and control application builds a station-wide video management and control function based on a 3D Geographic Information System (GIS); implements association between camera images and geographic information data by way of combining geographic information, 3D model and real-time videos; may access station-wide video resources through a camera area list, 3D model visualization point selection, a small map navigation and positioning area, or other manners; and provides interactive interfaces meeting relevant standards to other applications of the digital converter station. Basic functional requirements of the station-wide video management and control application mainly include 1) support real latitude, longitude, or other geographic information coordinate systems, built-in WGS84 coordinate system (EPSG: 4326), and have ability to support conversion of various geographic coordinates; 2) carry image maps, digital elevation, vector data, digital line drawings or other GIS data; 3) have ability to build models by laser scanning, manual modeling or other manners, have a function of importing various model formats such as OBJ, 3DS, FBX, OSG or the like, and have ability of real-time rendering of a large scene and dynamic memory scheduling; 4) have a function of directly importing oblique photography models and osgb models, and have a function of reading and hierarchical rendering of osgb data of a sub-plot Level of Detail (LOD) architecture. Functions; 5) have a layer management function, the layer may be divided into a device model layer, video fusion layer or the like, and the layer may be displayed and hidden; 6) support multi-level mixed precision of 3D geographic data with support of a 3D digital earth, may load geographic information data, 3D building models and two-dimensional (2D) vector electronic maps; 7) should have ability to load satellite images and digital elevation within a range of 10 square kilometers around the station area; 8) should have a function of customizing video patrol and inspection routes in the station, should implement patrol plan setting, patrol point configuration, patrol task query, patrol result statistics, key production data pop-up presentation, data early warning; and may use immediate execution, periodic execution, regular execution or other manners; may automatically generate patrol and inspection logs. Requirements of a video centralized management function of the station-wide video management and control application mainly include: 1) integrate video resources in the station, including industrial videos, full-automatic patrol and inspection, infrared, drone, robot or other system video data, and complete acquisition and calibration of spatial coordinate of each camera in the 3D GIS system; 2) support a 1/4/9 grid playback format of a traditional monitor, and may customize and adjust playback number and positions of videos; 3) support quick access to video by way of clicking and selecting visual icons in a 3D scene, position and size of a retrieved pop-up window of video may be dynamically adjusted with movement of 3D icons; 4) support quick access to video resources according to the camera area list, the small map navigation and positioning area, or other manners; 5) have conventional video operation functions such as pan & tilt control, video playback, etc.

Requirements of a higher-level remote operation and control function of the station-wide video management and control application mainly include: 1) support a higher-level unit to remotely access real-time video monitoring image at the station side; support the higher-level unit to remotely operate and control the camera at the station side; support the higher-level unit to remotely access the 3D GIS system and operate 3D scene images; 2) should have a mutual exclusion mechanism for authorization allocation and operation, to ensure that the same instance may be operated, controlled and applied by only one party simultaneously; when multiple instances operate the same camera simultaneously, control of the camera may be locked and unlocked according to authorization; 3) support a Person Computer (PC) and large screen of a central control room to execute the station-wide video management and control application, upload high-definition image quality, and images are clear. Functional requirements of an advanced application expansion interface of the station-wide video management and control application mainly include: 1) should have an expansion ability to implement a panoramic video fusion function, implementation of the video fusion is video 3D mapping, adjacent video splicing, collecting and fusing multi-channel discrete video streams at different positions together, and projecting video images on the 3D model; 2) should have an expansion ability to access to recognition results of AI and image recognition algorithm, may access various kinds of alarm data, and make alarm in the application; 3) should have an expansion ability to build a multi-terminal collaboration plotting function; 4) should have an expansion ability to integrate with a resource deployment editor, implement a visual editing collaboration plan and deduction function; 5) should have an expansion ability to implement a collaboration tracking function driven by a local area or event target. Performance requirements of the station-wide video management and control application mainly include: 1) support synchronous access to any number of multi-channel high-definition videos; 2) a response time after clicking user interfaces of various functions is ≤1 second; 3) a response time after calling the external oriented interface is ≤1 second; 4) an average 3D rendering frame rate is ≥30 frames/second.

The station-wide 3D presentation application is mainly configured to provide services to the video fusion processing module of the monitoring terminal at each level; the station-wide 3D presentation application performs 3D refined modeling based on point cloud data, presents scene-wide information in the station with multi-dimension, truly reflects device status and its surrounding environment, fuses with real-time information such as alarm prompt, monitoring data, video images or the like as well as data profile such as operation record, one-time wiring diagram or the like, supports highlighting of areas, devices, systems, buildings or the like in the station, and provides interactive interfaces meeting relevant standards to other applications of the digital converter station. Requirements of a basic model of the station-wide 3D presentation application mainly include: 1) has ability to perform color laser point cloud scanning and source material acquisition functions on station-wide devices, auxiliary facilities, buildings, roads, security facilities or the like, point cloud has a density ≥100 points/square meter and an accuracy of 1 mm-10 mm, and ghost of point cloud files does not exceed 2 cm; 2) in terms of point cloud scanning range, indoor should include but is not limited to a comprehensive building, main control building, protection device room, air-conditioning device room, water pump room, station auxiliary devices, spare parts warehouse, guard room or the like, outdoor should include but is not limited to a main transformer, station transformer, high resistance, lightning rod tower, steel constructed bracket, lightning protection network, all wiring in the station, fire protection facilities, roads, walls, pools, outdoor units of air conditioners, other facilities in the station, or the like; 3) has a function of acquiring station-wide high-definition images in sub-areas, to ensure clear shooting of device meters and brand names, and output 360° panoramic images; 4) has a function of processing raw data of point cloud scanning las, cutting in equal proportion according to area, and cutting a key device separately, and size of a cut individual file is ≤4G; model production should be made based on point cloud scanning in contrast to on-site acquired pictures; 5) has a function of outputting las and max models for production of a refined model. Requirements of the refined model of the station-wide 3D presentation application mainly include: 1) has ability to perform refined 3D modeling based on a station-wide point cloud data model; 2) has ability to model the 3D scene according to a real environment in the station, textures are processed in live-action, and color matching is consistent with the scene, the device and its surrounding environment should be truly restored, including other devices, facilities, surrounding buildings or the like related to the device; 3) supports highlighting of various areas, devices, systems, buildings or the like in 3D model of the whole station, and supports a function of positioning the primary device of the whole station; 4) should have ability to accurately set geographic coordinate data of the 3D scene according to GIS map, the 3D model should support access to Internet of Things (IoT) types of data, such as on-site measurement point data, camera (infrared) or the like; 5) has ability to accurately measure point-to-point distance and area in 3D space; 6) supports presentation of area-wise level information: should implement linkage of multiple systems and 3D scene, and view operation status at different levels and dimensions such as the whole station, area, sub-area, etc.

Multi-dimensional information presentation of the station-wide 3D presentation application mainly includes: 1) has a linkage function of system alarm information, navigation tree, system integration framework and 3D scene, may be quickly positioned and presented in a unit of the whole station, area, device, system or the like, and may complete operations such as zoom-in, zoom-out, rotation or the like; 2) supports positioning and presentation of various types of information which should include ledger information, operation parameter information, status information, real-time operation data, online monitoring data, overhaul records, defect records or the like of the device; 3) should have a function of intuitively presenting real operation status of the device, such as running, switch opening and closing status or the like, and presenting rendering effects in different statuses, such as action animation of the device or the like; when a certain device in the station-wide 3D model is clicked and selected, colors are used to distinguish device statuses, for example, normal is green, abnormal is orange, fault is red, uncharged is gray, or the like; 4) has a function of visualizing measurement point data of the primary device, should display real-time measurement point value of the device and present threshold information of an upper limit, upper and upper limit, lower limit, and lower and lower limit corresponding to the measurement point simultaneously, and supports viewing a historical trend graph of the measurement point data. In an abnormal case where the measurement point exceeds the threshold, the measurement point value is highlighted in yellow or red; 5) has a function of receiving and reading device alarm information in the platform, while automatically rendering devices with abnormal alarm into yellow or red alarm mode according to alarm levels, and positioning them in the 3D scene, to continuously prompt operators to pay attention to faults, and alarm statuses of the devices do not flash any more after confirmation. Performance requirements of the station-wide 3D presentation application mainly include: 1) completion time of first loading of the 3D scene of the whole station is ≤4 seconds; 2) response time of the user switching area scenes in the 3D scene is ≤1 second; 3) response time of loading an interactive interface in the 3D scene is ≤1 second; 4) data display delay in the 3D scene is ≤1 second; 5) frame rate of interactive real-time rendering of the 3D scene is ≥30 frames/second.

The device status overview application is mainly configured to provide services to the device status monitoring module of the monitoring terminal at each level; the device status overview application is based on convergence of station-wide data of the digital converter station, including ledger, operation information, monitoring data or the like of the device, centered on the device, aggregates key indicators of the device in levels, makes a comprehensive presentation, and supports comparison and analysis of data of the key device in a day, week, month and customized time range, one-click export of raw data, and annotation and prompt of abnormal information. Functional requirements of the device status overview application mainly include: 1) should have an overview image for monitoring statuses of devices of the whole station, monitor operation statuses of devices of the whole station, and support presentation of data information of the key device according to device classification; 2) has a function of setting a threshold of variation amplitudes of key parameters of the device in a specified time range, and should give a prompt message when a monitored key parameter exceeds a range of the threshold; 3) supports information presentation of key measurement points of the converter transformer (transformer), including winding temperature, oil surface temperature, SF6 pressure of sleeve, an air content in body oil, a ground current of iron core, a ground current of clamper, an oil level of body oil tank, an oil level of on-load tap switch, body oil pressure, or the like; 4) supports information presentation of key measurement points of the station transformer, including oil temperature, winding temperature, an air content in body oil, a ground current of iron core, a ground current of clamper, an oil level of body oil tank, or the like; 5) supports information presentation of key measurement points of GIS, including SF6 pressure in GIS, pressure of wall-penetration sleeve, oil pressure, temperature of conductive rod, loop current of motor, or the like; 6) should support multiple manners of selection comparison objects, including: support fuzzy query, input keywords to match corresponding measurement point objects in model; support device query, provide a tree structure of all devices and measurement points, select by hierarchy, and support multiple selections; 7) should support multiple manners of time selection, including: select to query by day, week, month, and may query with customized start and end times; 8) after query, should display a curve graph of the selected measurement point object, support comparison and analysis of the selected curve in the same time period, and identify a maximum value, minimum value, average value or the like in a query period of each object; 9) supports presentation of historical data curves of a single measurement point in different time periods, may select a single measurement point object according to conditions, and add selecting multiple time periods to query data curves; 10) when data of the queried measurement point object is abnormal, should give corresponding text prompt information, record information such as the abnormal object, time of occurrence, or the like; 11) has a function of exporting raw data of the selected measurement point object, and an export format is csv. Performance requirements of the device status overview application mainly include: 1) completion time of loading the measurement point tree is ≤2 seconds; 2) a number of multi-selected measurement points is ≥5; 3) loading time of the daily curve and data table is ≤3 seconds; 4) loading time of the weekly curve and data table is ≤7 seconds; 5) loading time of the monthly curve and data table is ≤30 seconds; 6) export time of the raw data is ≤5 seconds.

The device alarm overview application is mainly configured to provide services to the device alarm management module of the monitoring terminal at each level; the device alarm overview application is based on convergence of station-wide data of the digital converter station, implements device alarm overview, supports statistics and information presentation of alarm information in dimensions such as device, level, time or the like, and supports real-time refresh and filter retrieval function of the alarm information. When alarm is pushed, linkage functions of a device to which the alarm belongs may be manually triggered, to present data information related to the device. Requirements of the alarm statistics function of the device alarm overview application mainly include: 1) has a function of making statistics according to alarm sources including various system and application alarms, supports viewing a proportion and number of three types of alarms according to day, week, month and year; 2) has a function of making statistics according to alarm levels, and makes statistics of a proportion and number of alarms of each level according to day, week, month and year; 3) has a function of making statistics according to time periods, supports making statistics of a number of alarms in each time period according to day, week, month and year, and presenting distribution of alarms according to time. Requirements of the system alarm query function of the device alarm overview application mainly include: 1) supports filtering non-confirmed alarm information; 2) has a function of filtering and retrieving alarm information according to level, system and device; 3) has a function of filtering and retrieving alarm information according to alarm description keywords; 4) in case of a non-processed alarm, has an alarm confirmation function and supports entering confirmation information; 5) supports distinguishing alarm levels of alarm information according to colors. Requirements of the application alarm query function of the device alarm overview application mainly include: 1) supports filtering non-confirmed alarm information; 2) has a function of filtering and retrieving alarm information according to level, device, application and type; 3) has a function of filtering and retrieving alarm information according to alarm description keywords; 4) in case of a non-processed alarm, has an alarm confirmation function and supports entering confirmation information; 5) supports distinguishing alarm levels of alarm information according to colors; 6) in case of an application alarm accompanied with fault brief report, has a function of viewing the fault brief report. Performance requirements of the device alarm overview application mainly include: 1) completion time of loading statistical data is ≤1 second; 2) alarm query time of that day is ≤1 second; 3) alarm query time of that month is ≤5 seconds; 4) alarm query time of that year is ≤10 seconds; 5) response time of alarm confirmation is ≤1 second.

The fault recording management applications is mainly configured to provide services to the fault recording management module of the third monitoring terminal. The fault recording management applications is based on convergence of station-wide data of the digital converter station, implements fault recording management, may query and retrieve the fault recording file accessed to the platform in a unified manner, and performs online parsing of the file to present waveforms, configuration parameters and fault report information of each channel. Functional requirements of the fault recording management application mainly include: 1) has a function of retrieving all recording files of the digital converter station according to device, file name and time; 2) presents retrieval results in a list, and a presented column includes information such as the file name, time, size, or the like; 3) has a function of packing and downloading waveform files as a whole; 4) has a function of viewing waveforms online, supports customized rendering of waveform curves of multiple channels where all waveforms have the same time axis, and supports a unified cursor and waveform zooming; 5) has a function of viewing recording data online, supports presentation of data points of all channels, including channel name, unit and data of each sampling point; 6) has a function of viewing recording parameters online, supports presentation of basic parameter information of waveforms in CFG file, including basic information of waveform files, parameter information of analog channel and parameter information of status channel; 7) has a function of viewing recording brief report online, and supports parsing HDR file; 8) has a function of opening online waveform parsing to a third-party application, and provides online analysis services to waveform files; 9) has a function of exporting and printing waveforms (PNG, PDG, Jpeg, Comtrade, or other formats). Performance requirements of the fault recording management application mainly include: 1) completion time of loading waveforms is ≤10 seconds; 2) loading time of configuration parameters ≤5 seconds; 3) loading time of fault report is ≤5 seconds.

The intelligent report management application is mainly configured to provide services to the data report management module of the third monitoring terminal. The intelligent report management application implements statistics of relevant service data in the digital station, presents historical data, statistical data and analysis data through daily report, weekly report and monthly report according to operation and maintenance requirements, implements functions such as report task formulation, automatic report generation, report export and printing function, etc. Functional requirements of the intelligent report management application mainly include: 1) supports important report items required by the operation and maintenance personnel to make daily statistics: including daily, weekly and monthly reports such as line load of incoming and outgoing lines, system load, temperature of oil-immersed transformer, unbalanced current, oil chromatography statistics, SF6 meter reading, or the like; 2) has a function of customizing a report generation task, the system may automatically generate and export reports according to tasks, support daily report, monthly report, quarterly report, annual report, or the like; 3) has a function of data statistics and analysis, including a maximum value, minimum value, average value, load rate, or the like; 4) has a function of exporting report data to a file, and the file type should be compatible with EXCEL; 5) has a function of printing reports, provides a common printing button, and supports one-click printing; 6) should has a function of generating daily report on production and operation in the station according to templates. Performance requirements of the intelligent report management application mainly include: 1) loading time of table data of a single-day measurement point report is ≤3 seconds; 2) loading time of table of a single-day alarm data report is ≤3 seconds; 3) loading time of table of a monthly statistical and analysis data report is ≤30 seconds; 4) loading time of table of an annual statistical and analysis data report is ≤300 seconds; 5) response time of a report export action is ≤3 seconds.

The digital station area management application is mainly configured to provide services to the digital station area management module of the third monitoring terminal. The digital station area management application is based on convergence of station-wide data of the digital converter station, takes the station area as a main body and relies on a unified 3D base of the whole station, to complete unified monitoring and management of security, fire protection, power environment, other auxiliary monitoring information, etc. Requirements of a security monitoring function of the digital station area management application mainly include: 1) has a function of accessing videos in real time, retrieving and accessing historical video information or the like, has a function of patrolling positions such as entrance and exit of the main control building, secondary device room, guard room, entrance and exit of perimeter, entrance and exit of production area, the perimeter, window connected to the outside world, vent, pipeline (ditch, canal) or the like in turn; 2) has a function of arranging patrol of key sites, such as the key device, perimeter, main control room, secondary device room, high-voltage room, or the like; 3) supports presentation of alarm information of the entrance and exit, window and vent, and implements functions such as entrance management, video linkage, remote control, or the like; 4) supports linkage of security alarm information with on-site sound and light alarms, security lighting control system and video monitoring system; 5) supports presentation of information such as alarm source, alarm event, level, time of occurrence, confirmation person, confirmation time, or the like, and may correlate to a linkage behavior generated by alarm query; 6) supports one-key playback of alarm linkage videos; 7) supports recording service logs of functional modules such as electronic patrol or the like, and may query and export reports by personnel, type, date and other conditions. Requirements of a fire protection monitoring function of the digital station area management application mainly include: 1) has a function of accessing videos in real time, retrieving and accessing historical video information or the like, and presents fire protection devices and real-time video information of an area; 2) supports presentation of operation statuses of fire alarm host, fire detection device and fixed fire extinguishing device; 3) supports presentation of original geographic positions of the fixed fire extinguishing device, fire detection device, and mobile and hand-held fire extinguishing devices through the 3D base; 4) supports linkage of fire protection alarm information with monitoring videos, pushes image of position of an alarm point, and contents of the image include status information of fire protection devices, materials, channels or the like near to the alarm point. Requirements of a power environment monitoring function of the digital station area management application mainly include: 1) monitors information presenting status of the station area such as light, air conditioner, water pump, access controller, water supply and drainage, or the like in a unified manner; 2) has a function of controlling devices such as light, air conditioner, access controller, water supply and drainage, etc. Performance requirements of the digital station area management application mainly include: 1) completion time of loading real-time data is ≤1 second; 2) alarm query time is ≤1 second; 3) query time of management and control records is ≤5 seconds; 4) triggering time of comprehensive early warning is ≤10 seconds.

The remote intelligent patrol application is mainly configured to provide services to the remote intelligent patrol module of the third monitoring terminal. The remote intelligent patrol application implements unified access to camera, robot, drone and voiceprint monitoring device, issues control thereto and processes patrol results; controls the robot and camera to perform joint patrol operations of indoor and outdoor devices, receives patrol data, acquires files, performs intelligent analysis on the acquired data, forms a patrol result and patrol report, and sends alarm in time; furthermore, has functions such as real-time monitoring, intelligent linkage with monitoring systems of primary and secondary devices, and should provide interactive interfaces meeting relevant standards to other applications of the digital converter station.

It should be noted that based on functions of basic applications such as the station-wide video management and control application, the station-wide 3D presentation application, the device status overview application, the device alarm overview application, the fault recording management application, the intelligent report management application, the digital station area management application, the remote intelligent patrol application, or the like of the digital converter station, functional modules such as the video fusion processing module, the device status monitoring module, the device alarm management module, the fault recording management module, the data report management module, the digital station area management module, the remote intelligent patrol module, or the like deployed in the monitoring terminal at each level may also implement the functions of basic applications correspondingly.

Exemplarily, the digital converter station in the embodiments of the disclosure may also provide a panoramic 3D digital twin technology and a panoramic video fusion technology. The panoramic 3D digital twin technology implements fusion of device asset data and 3D system, implements a visual management function of device asset information by way of 3D space perspective, provides basic functions of 3D presentation: moving, zooming, rotation and hierarchical browsing of 3D model, provides presentation of real-time data: 3D panoramic system of the converter station is fused with device data, which may view status of the primary device in real time, telemeter real-time data, analog historical data and other functions; provides 3D linkage: implements fusion of device alarm information and 3D components, and 3D image may display alarm information of the converter station system in real time and mark position corresponding to the alarm information. The panoramic video fusion technology is based on a virtual reality (VR) fusion technology, performs video fusion of discrete traditional monitoring videos and the panoramic 3D model, forms spatial correlation among different video images in the scene, and establishes an Augmented Reality (AR) video monitoring system; splices and fuses monitoring videos discretely distributed in key prevention and control areas of the station area into a VR scene model, establishes perception and application capabilities of videos in VR space, provides continuous and intuitive monitoring of multiple areas, facilitates personnel to have an overview of the overall situation, and implements panoramic video fused presentation which may span areas and perspectives; provides an automatic video patrol and inspection function of key overhaul paths, may automatically perform patrol and inspection according to daily patrol angles and speeds of patrol and overhaul personnel, presents resource information associated with a set route as needed without manual switching, and ensures 24-hour uninterrupted monitoring of a key area by combining automatic patrol and inspection of the platform with personnel's patrol; provides synchronous correlation function of 2D and 3D information, and displays 3D panoramic video, 2D global map and split-shot videos with synchronous linkage; displays coverage areas and positions of all cameras in the key area and position of the user's visual angle at a current observation point in 2D planar map. According to setting of the visual angle in the 3D scene, the platform displays split-shot monitoring videos of the area with automatic linkage, to allow the monitoring personnel to choose a best video visual angle.

According to the monitoring system based on a digital converter station provided in the embodiments of the disclosure, compared with a traditional converter station, the digital converter station used as the monitored object is provided with the unified common component and basic application, enables consistent management and control of the technical architecture (standardization, serialization, and pre-integration of devices and OSs at edge station side), provides a unified data integration and data service bus, provides a unified basic application framework, and ensures implementation of a standard system of the digital converter station, thereby providing basic guarantee for digital transformation of the traditional converter station; furthermore, may provide unified and standardized data services to the monitoring terminal at each level when the monitoring system implements various functions, which greatly reduces external-oriented interaction cost and time cost of the digital converter station, and effectively reduces network latency.

In yet another preferred embodiment, a user at the first-level monitoring side is used as a first user, and the video fusion processing module of the first monitoring terminal is used as a first video fusion processing module.

The first video fusion processing module is further configured to perform user authorization management on the first user, to configure the first user as a first ordinary user or a first Very Important Person (VIP) user, the first ordinary user is configured to have authorization to view video fusion images of a designated monitored area of the digital converter station, and the first VIP user is configured to have authorization to view video fusion images of all monitored areas of the digital converter station.

Then, in response to the monitoring retrieval request of the user at the local monitoring side, the first video fusion processing module performing video fusion processing by using video fusion raw data in the data of the digital converter station, to obtain video fusion images to be retrieved by the user at the local monitoring side, specifically includes that:

when the first user is the first ordinary user, in response to a monitoring retrieval request of the first ordinary user, the first video fusion processing module acquires video fusion raw data of a to-be-viewed area from video fusion raw data of the designated monitored area in the data of the digital converter station, and performs video fusion processing on the video fusion raw data of the to-be-viewed area by using computing resources of the first monitoring terminal, to obtain video fusion images to be retrieved by the first ordinary user.

Specifically, with reference to the above embodiments, the first video fusion processing module may perform user authorization management on the first user at the first-level monitoring side, and configure the first user as the first ordinary user or the first VIP user; the first user may be a decision-making management user or other users at the headquarter of the grid system, user authorization of the first ordinary user is: has authorization to view video fusion images of the designated monitored area of the digital converter station, but does not have authorization to view video fusion images of other monitored areas except the designated monitored area of the digital converter station; user authorization of the first VIP user is: has authorization to view video fusion images of all monitored areas of the digital converter station.

Exemplarily, at the first-level monitoring side, a certain number of user accounts may be opened according to different functions and operation requirements and based on limitation of computing resources and network bandwidth, to be used by the first user to log in, and the first video fusion processing module may implement management of user authorization of the first user, by dividing and managing authorizations of the user accounts.

In the embodiment of the disclosure, when the first human-machine interaction module receives the monitoring retrieval request of the first ordinary user at the first-level monitoring side, the first video fusion processing module is mainly configured to: in response to the monitoring retrieval request of the first ordinary user, acquire video fusion raw data of the to-be-viewed area from video fusion raw data of the designated monitored area in the data of the digital converter station stored in the data storage module of the third monitoring terminal, and then perform video fusion processing on the acquired video fusion raw data of the to-be-viewed area by using local computing resources of the first monitoring terminal, to obtain video fusion images correspondingly, and the video fusion images are available to be retrieved by the first ordinary user.

It may be understood that the designated monitored area may be selected according to user requirements of the first ordinary user, and the designated monitored area includes at least one monitored area of the digital converter station. Since the first ordinary user only has authorization to view video fusion images of the designated monitored area of the digital converter station, the to-be-viewed area in the embodiment of the disclosure may only be selected from the designated monitored area, that is, at least one monitored area in the designated monitored area may be selected as the to-be-viewed area, and the first ordinary user may specify the to-be-viewed area while he/she initiates the monitoring retrieval request, so that the first video fusion processing module may determine video fusion raw data of which one or several monitored areas actually need to be remotely called from the third monitoring terminal, according to the monitoring retrieval request of the first ordinary user.

According to the monitoring system based on a digital converter station provided in the embodiments of the disclosure, user authorization management is performed on the first user at the first-level monitoring side, different user authorization levels correspond to different capabilities of scheduling and retrieving video fusion images, and a certain limit is added to the authorization of the first ordinary user scheduling and retrieving video fusion images, so that the first ordinary user may only schedule and retrieve video fusion images of the designated monitored area, which may save wide-area export bandwidth. Further, in case of the monitoring retrieval request of the first ordinary user, the first video fusion processing module directly and remotely calls required video fusion raw data, and performs rendering processes on the obtained video fusion raw data according to a rendering engine deployed locally in the first monitoring terminal, so that the first monitoring terminal completes a video fusion task locally, and the first ordinary user may directly access the obtained video fusion images at a local position, without requiring the third monitoring terminal to complete video fusion, and without remotely retrieving video fusion images from the third monitoring terminal, which may effectively avoid the network delay problem caused by remotely retrieving video fusion images.

As an improvement of the above solution, the video fusion processing module of the third monitoring terminal is used as a third video fusion processing module.

Then, in response to the monitoring retrieval request of the user at the local monitoring side, the first video fusion processing module performing video fusion processing by using video fusion raw data in the data of the digital converter station, to obtain video fusion images to be retrieved by the user at the local monitoring side, further includes that:

when the first user is the first VIP user, in response to a monitoring retrieval request of the first VIP user, the first video fusion processing module sends a first video fusion request to the third video fusion processing module, the first video fusion request includes an identifier (ID) of the to-be-viewed area, the third video fusion processing module acquires video fusion raw data of the to-be-viewed area from video fusion raw data of all monitored areas in the data of the digital converter station according to the ID of the to-be-viewed area in the first video fusion request, and performs video fusion processing on the video fusion raw data of the to-be-viewed area by using computing resources of the third monitoring terminal, to obtain video fusion images to be retrieved by the first VIP user and send the video fusion images to the first video fusion processing module, the first video fusion processing module receives and obtains the video fusion images to be retrieved by the first VIP user.

Specifically, with reference to the above embodiments, when the first human-machine interaction module receives the monitoring retrieval request of the first VIP user at the first-level monitoring side, the first video fusion processing module is mainly configured to: in response to the monitoring retrieval request of the first VIP user, send the first video fusion request to the third video fusion processing module of the third monitoring terminal, the first video fusion request includes ID of the to-be-viewed area; after receiving the first video fusion request, the third video fusion processing module acquires video fusion raw data of the to-be-viewed area from video fusion raw data of all monitored areas in the data of the digital converter station stored in the data storage module according to the ID of the to-be-viewed area included in the first video fusion request, and then performs video fusion processing on the acquired video fusion raw data of the to-be-viewed area by using local computing resources of the third monitoring terminal, to correspondingly obtain video fusion images to be retrieved by the first VIP user, and feeds the obtained video fusion images to be retrieved by the first VIP user back to the first video fusion processing module; the first video fusion processing module receives the video fusion images in real time, and the video fusion images are available to be retrieved by the first VIP user.

It may be understood that since the first VIP user has authorization to view video fusion images of all monitored areas of the digital converter station, the to-be-viewed area in the embodiment of the disclosure may be selected from all monitored areas of the digital converter station, that is, at least one monitored area in all the monitored areas may be selected as the to-be-viewed area, and the first VIP user may specify the to-be-viewed area while he/she initiates the monitoring retrieval request. Exemplarily, different monitored areas may be distinguished by setting an area ID to each of the monitored areas. Correspondingly, the first VIP user may specify the to-be-viewed area by the area ID.

According to the monitoring system based on a digital converter station provided in the embodiments of the disclosure, in case of the monitoring retrieval request of the first VIP user, the first video fusion processing module sends the video fusion request to the third video fusion processing module, and the third video fusion processing module performs rendering processes on the obtained video fusion raw data according to a rendering engine deployed locally in the third monitoring terminal, so that the third monitoring terminal completes a video fusion task locally, and the first VIP user may remotely retrieve video fusion images from the third monitoring terminal, which may meet requirements of the first VIP user viewing any monitored area.

It should be noted that in the embodiment of the disclosure, the first video fusion processing module selects and performs different video fusion processing solutions according to different user authorizations, which may ensure that video fusion tasks of users with high computing power and response requirements may be locally performed nearby, to effectively solve the network delay problem; furthermore, when the video fusion processing task is completed locally, the first video fusion processing module may only call the video fusion raw data of the designated monitored area of the digital converter station stored in the data storage module, all the first ordinary users share the video fusion raw data of the designated monitored area of the digital converter station, which may reduce occupation of network bandwidth resources and further reduce network delay.

In yet another preferred embodiment, a user at the second-level monitoring side is used as a second user, and the video fusion processing module of the second monitoring terminal is used as a second video fusion processing module.

The second video fusion processing module is further configured to perform user authorization management on the second user, to configure the second user as a second ordinary user or a second VIP user, the second ordinary user is configured to have authorization to view video fusion images of a designated monitored area of the digital converter station, and the second VIP user is configured to have authorization to view video fusion images of all monitored areas of the digital converter station.

Then, in response to the monitoring retrieval request of the user at the local monitoring side, the second video fusion processing module performing video fusion processing by using video fusion raw data in the data of the digital converter station, to obtain video fusion images to be retrieved by the user at the local monitoring side, specifically includes that:

when the second user is the second ordinary user, in response to a monitoring retrieval request of the second ordinary user, the second video fusion processing module acquires video fusion raw data of a to-be-viewed area from video fusion raw data of the designated monitored area in the data of the digital converter station, and performs video fusion processing on the video fusion raw data of the to-be-viewed area by using computing resources of the second monitoring terminal, to obtain video fusion images to be retrieved by the second ordinary user.

Specifically, with reference to the above embodiments, the second video fusion processing module may perform user authorization management on the second user at the second-level monitoring side, and configure the second user as the second ordinary user or the second VIP user; the second user may be an operation and maintenance management and control user or other users at the provincial unit of the grid system, user authorization of the second ordinary user is: has authorization to view video fusion images of the designated monitored area of the digital converter station, but does not have authorization to view video fusion images of other monitored areas except the designated monitored area of the digital converter station; user authorization of the second VIP user is: has authorization to view video fusion images of all monitored areas of the digital converter station.

Exemplarily, at the second-level monitoring side, a certain number of user accounts may be opened according to different functions and operation requirements and based on limitation of computing resources and network bandwidth, to be used by the second user to log in, and the second video fusion processing module may implement management of user authorization of the second user, by dividing and managing authorizations of the user accounts.

In the embodiment of the disclosure, when the second human-machine interaction module receives the monitoring retrieval request of the second ordinary user at the second-level monitoring side, the second video fusion processing module is mainly configured to: in response to the monitoring retrieval request of the second ordinary user, acquire video fusion raw data of the to-be-viewed area from video fusion raw data of the designated monitored area in the data of the digital converter station stored in the data storage module of the third monitoring terminal, and then perform video fusion processing on the acquired video fusion raw data of the to-be-viewed area by using local computing resources of the second monitoring terminal, to obtain video fusion images correspondingly, and the video fusion images are available to be retrieved by the second ordinary user.

It may be understood that the designated monitored area may be selected according to user requirements of the second ordinary user, and the designated monitored area includes at least one monitored area of the digital converter station. Since the second ordinary user only has authorization to view video fusion images of the designated monitored area of the digital converter station, the to-be-viewed area in the embodiment of the disclosure may only be selected from the designated monitored area, that is, at least one monitored area in the designated monitored area may be selected as the to-be-viewed area, and the second ordinary user may specify the to-be-viewed area while he/she initiates the monitoring retrieval request, so that the second video fusion processing module may determine video fusion raw data of which one or several monitored areas actually need to be remotely called from the third monitoring terminal, according to the monitoring retrieval request of the second ordinary user.

According to the monitoring system based on a digital converter station provided in the embodiments of the disclosure, user authorization management is performed on the second user at the second-level monitoring side, different user authorization levels correspond to different capabilities of scheduling and retrieving video fusion images, and a certain limit is added to the authorization of the second ordinary user scheduling and retrieving video fusion images, so that the second ordinary user may only schedule and retrieve video fusion images of the designated monitored area, which may save wide-area export bandwidth. Further, in case of the monitoring retrieval request of the second ordinary user, the second video fusion processing module directly and remotely calls video fusion raw data, and performs rendering processes on the obtained video fusion raw data according to a rendering engine deployed locally in the second monitoring terminal, so that the second monitoring terminal completes a video fusion task locally, and the second ordinary user may directly access the obtained video fusion images at a local position, without requiring the third monitoring terminal to complete video fusion, and without remotely retrieving video fusion images from the third monitoring terminal, which may effectively avoid the network delay problem caused by remotely retrieving video fusion images.

As an improvement of the above solution, the video fusion processing module of the third monitoring terminal is used as a third video fusion processing module.

Then, in response to the monitoring retrieval request of the user at the local monitoring side, the second video fusion processing module performing video fusion processing by using video fusion raw data in the data of the digital converter station, to obtain video fusion images to be retrieved by the user at the local monitoring side, further includes that:

when the second user is the second VIP user, in response to a monitoring retrieval request of the second VIP user, the second video fusion processing module sends a second video fusion request to the third video fusion processing module, the second video fusion request includes ID of the to-be-viewed area, the third video fusion processing module acquires video fusion raw data of the to-be-viewed area from video fusion raw data of all monitored areas in the data of the digital converter station according to the ID of the to-be-viewed area in the second video fusion request, and performs video fusion processing on the video fusion raw data of the to-be-viewed area by using computing resources of the third monitoring terminal, to obtain video fusion images to be retrieved by the second VIP user and send the video fusion images to the second video fusion processing module, the second video fusion processing module receives and obtains the video fusion images to be retrieved by the second VIP user.

Specifically, with reference to the above embodiments, when the second human-machine interaction module receives the monitoring retrieval request of the second VIP user at the second-level monitoring side, the second video fusion processing module is mainly configured to: in response to the monitoring retrieval request of the second VIP user, send the second video fusion request to the third video fusion processing module of the third monitoring terminal, the second video fusion request includes ID of the to-be-viewed area; after receiving the second video fusion request, the third video fusion processing module acquires video fusion raw data of the to-be-viewed area from video fusion raw data of all monitored areas in the data of the digital converter station stored in the data storage module according to the ID of the to-be-viewed area included in the second video fusion request, and then performs video fusion processing on the acquired video fusion raw data of the to-be-viewed area by using local computing resources of the third monitoring terminal, to correspondingly obtain video fusion images to be retrieved by the second VIP user, and feeds the obtained video fusion images to be retrieved by the second VIP user back to the second video fusion processing module; the second video fusion processing module receives the video fusion images in real time, and the video fusion images are available to be retrieved by the second VIP user.

It may be understood that since the second VIP user has authorization to view video fusion images of all monitored areas of the digital converter station, the to-be-viewed area in the embodiment of the disclosure may be selected from all monitored areas of the digital converter station, at least one monitored area in all the monitored areas may be selected as the to-be-viewed area, and the second VIP user may specify the to-be-viewed area while he/she initiates the monitoring retrieval request. Exemplarily, different monitored areas may be distinguished by setting an area ID to each of the monitored areas. Correspondingly, the second VIP user may specify the to-be-viewed area by the area ID.

According to the monitoring system based on a digital converter station provided in the embodiments of the disclosure, in case of the monitoring retrieval request of the second VIP user, the second video fusion processing module sends the video fusion request to the third video fusion processing module, and the third video fusion processing module performs rendering processes on the obtained video fusion raw data according to the rendering engine deployed locally in the third monitoring terminal, so that the third monitoring terminal completes a video fusion task locally, and the second VIP user may remotely retrieve video fusion images from the third monitoring terminal, which may meet requirements of the second VIP user viewing any monitored area.

It should be noted that in the embodiment of the disclosure, the second video fusion processing module selects and performs different video fusion processing solutions according to different user authorizations, which may ensure that video fusion tasks of users with high computing power and response requirements may be locally performed nearby, to effectively solve the network delay problem; furthermore, when the video fusion processing task is completed locally, the second video fusion processing module may only call the video fusion raw data of the designated monitored area of the digital converter station stored in the data storage module, all the second ordinary users share the video fusion raw data of the designated monitored area of the digital converter station, which may reduce occupation of network bandwidth resources and further reduce network delay.

Further, on the premise that the first video fusion processing module may only remotely call the video fusion raw data of the designated monitored area of the digital converter station from the data storage module, the first ordinary user is limited to only schedule and retrieve video fusion images of the designated monitored area, the second video fusion processing module may only remotely call the video fusion raw data of the designated monitored area of the digital converter station from the data storage module, and the second ordinary user is limited to only schedule and retrieve video fusion images of the designated monitored area: in order to further save bandwidth, the designated monitored area for which the first ordinary user and the second ordinary user have authorization to view may be a monitored area in the same range, that is, all the first ordinary users and the second ordinary users (or, the first video fusion processing module and the second video fusion processing module) may share the video fusion raw data of the designated monitored area of the digital converter station, and when the video fusion raw data of the designated monitored area is remotely called from the data storage module, it only needs to occupy the same part of network bandwidth resources.

In yet another preferred embodiment, a user at the third-level monitoring side is used as a third user, and the video fusion processing module of the third monitoring terminal is used as a third video fusion processing module.

The third video fusion processing module is further configured to perform user authorization management on the third user, to configure the third user as a third VIP user, the third VIP user is configured to have authorization to view video fusion images of all monitored areas of the digital converter station.

Then, in response to the monitoring retrieval request of the user at the local monitoring side, the third video fusion processing module performing video fusion processing by using video fusion raw data in the data of the digital converter station, to obtain video fusion images to be retrieved by the user at the local monitoring side, specifically includes that:

when the third user is the third VIP user, in response to a monitoring retrieval request of the third VIP user, the third video fusion processing module acquires video fusion raw data of a to-be-viewed area from video fusion raw data of all monitored areas in the data of the digital converter station, and performs video fusion processing on the video fusion raw data of the to-be-viewed area by using computing resources of the third monitoring terminal, to obtain video fusion images to be retrieved by the third VIP user.

Specifically, with reference to the above embodiments, the third video fusion processing module may perform user authorization management on the third user at the third-level monitoring side, and configure all the third users as third VIP users; the third user may be an monitoring operation and maintenance user or other users of the digital converter station, user authorization of the third VIP user is: has authorization to view video fusion images of all monitored areas of the digital converter station.

Exemplarily, at the third-level monitoring side, a certain number of user accounts may be opened according to different functions and operation requirements and based on limitation of computing resources and network bandwidth, to be used by the third user to log in, and the third video fusion processing module may implement management of user authorization of the third user, by dividing and managing authorizations of the user accounts. Furthermore, since the third user itself is at the third-level monitoring side, it is unnecessary to use the remote function, and it does not occupy network bandwidth resources between the third-level monitoring side and the second-level monitoring side, the first-level monitoring side. Therefore, all the third users may be configured as third VIP users.

In the embodiment of the disclosure, when the third human-machine interaction module receives the monitoring retrieval request of the third VIP user at the third-level monitoring side, the third video fusion processing module is mainly configured to: in response to the monitoring retrieval request of the third VIP user, acquire video fusion raw data of the to-be-viewed area from video fusion raw data of all monitored areas in the data of the digital converter station stored in the data storage module, and then perform video fusion processing on the acquired video fusion raw data of the to-be-viewed area by using local computing resources of the third monitoring terminal, to obtain video fusion images correspondingly, and the video fusion images are available to be retrieved by the third VIP user.

It may be understood that since the third VIP user has authorization to view video fusion images of all monitored areas of the digital converter station, the to-be-viewed area in the embodiment of the disclosure may be selected from all monitored areas of the digital converter station, at least one monitored area in all the monitored areas may be selected as the to-be-viewed area, and the third VIP user may specify the to-be-viewed area while he/she initiates the monitoring retrieval request. Exemplarily, different monitored areas may be distinguished by setting an area ID to each of the monitored areas. Correspondingly, the third VIP user may specify the to-be-viewed area by the area ID.

According to the monitoring system based on a digital converter station provided in the embodiments of the disclosure, in case of the monitoring retrieval request of the third VIP user, the third video fusion processing module performs rendering processes on the obtained video fusion raw data according to the rendering engine deployed locally in the third monitoring terminal, so that the third monitoring terminal completes a video fusion task locally, and the third VIP user may directly retrieve video fusion images at a local position, which may avoid the network delay problem caused by remote retrieval, and meet requirements of the second VIP user viewing any monitored area.

In yet another preferred embodiment, the second monitoring terminal is used as a data sending end, and the first monitoring terminal is used as a data receiving end; or, the third monitoring terminal is used as a data sending end, and the second monitoring terminal is used as a data receiving end.

Then, the data sending end further includes a network detection module, the network detection module is configured to periodically perform network bandwidth detection to detect an available network bandwidth and minimum delay time between the data sending end and a corresponding data receiving end, and record only the available network bandwidth and minimum delay time detected for the last time when each detection is completed, so that when video fusion service data needs to be transmitted to the corresponding data receiving end, an initial data transmission rate of the video fusion service data is determined according to a currently recorded available network bandwidth.

It should be noted that the video fusion processing solution is taken as an example, upon responding to the monitoring retrieval request of the first VIP user, the first video fusion processing module needs to remotely retrieve video fusion images generated by the third video fusion processing module from the third monitoring terminal through the second monitoring terminal; upon responding to the monitoring retrieval request of the first ordinary user, the first video fusion processing module needs to remotely call video fusion raw data of the designated monitored area from the data storage module of the third monitoring terminal through the second monitoring terminal; upon responding to the monitoring retrieval request of the second VIP user, the second video fusion processing module needs to remotely retrieve video fusion images generated by the third video fusion processing module from the third monitoring terminal; upon responding to the monitoring retrieval request of the second ordinary user, the second video fusion processing module needs to remotely call video fusion raw data of the designated monitored area from the data storage module of the third monitoring terminal. It may be seen that when data transmission is performed between the first monitoring terminal and the second monitoring terminal, the second monitoring terminal is used as a data sending end, and the first monitoring terminal is used as a data receiving end; when data transmission is performed between the second monitoring terminal and the third monitoring terminal, the third monitoring terminal is used as a data sending end, and the second monitoring terminal is used as a data receiving end.

Specifically, with reference to the above embodiments, the data sending end (i.e., the second monitoring terminal and the third monitoring terminal) further includes the network detection module, and the network detection module is mainly configured to periodically perform network bandwidth detection between each pair of data sending end and data receiving end, to detect the available network bandwidth and minimum delay time between each pair of data sending end and corresponding data receiving end in real time, and record only the available network bandwidth and minimum delay time obtained by the last detection when each detection is completed, so that when the data sending end needs to transmit video fusion service data to the corresponding data receiving end, the initial data transmission rate of the video fusion service data may be determined according to the currently recorded available network bandwidth.

It should be noted that in addition to the video fusion service data (the video fusion service data may include video stream data corresponding to transmission of video fusion images, or transmission of video fusion raw data of the designated monitored area), the service data transmitted between the sending end and the data receiving end may also include other types of service data, for example, related service data required by each functional module of the monitoring terminal at each level (such as the device status monitoring service data and device alarm service data described in the above embodiments) or the like may also be transmitted. Correspondingly, when the data sending end needs to transmit other data types of service data to the corresponding data receiving end, the data sending end may also determine initial data transmission rates of other data types of service data according to the currently recorded available network bandwidth.

Further, when it is unnecessary for the data sending end to transmit service data to the corresponding data receiving end, the network detection module may periodically perform network bandwidth detection to detect and record the available network bandwidth and minimum delay time between each pair of data sending end and corresponding data receiving end in real time; furthermore, in order to reduce resource occupation, when the data sending end needs to transmit service data to the corresponding data receiving end, the network detection module may not perform network bandwidth detection periodically, the service data may be transmitted in form of service packet at this time, and the network status may still be detected and sensed by monitoring the transmitted service packet.

Exemplarily, the network detection module may perform network bandwidth detection in real time according to a preset time period. It is assumed that when a first detection is completed, what obtained correspondingly is that the available network bandwidth between the data sending end and the corresponding data receiving end is A1, the minimum delay time is B1, and since the first detection is completed at this time, the last detection is the first detection, and A1 and B1 are recorded; when a second detection is completed, what obtained correspondingly is that the available network bandwidth between the data sending end and the corresponding data receiving end is A2, the minimum delay time is B2, and since the second detection is completed at this time, the last detection is the second detection, and only A2 and B2 are recorded, that is, A1 and B1 are not recorded any more, for example, the recorded A1 and B1 may be directly deleted, or A1 is replaced by A2 and B1 is replaced by B2; and so on. It is assumed that when a fifth detection is completed, what obtained correspondingly is that the available network bandwidth between the data sending end and the corresponding data receiving end is A5, the minimum delay time is B5, and only A5 and B5 are recorded; after the fifth detection is completed and before the sixth detection is completed, the data sending end needs to transmit data to the corresponding data receiving end, then the data transmission rate may be determined according to the currently recorded available network bandwidth, that is, according to the recorded A5.

It should be noted that since networks between the second monitoring terminal and the first monitoring terminal and between the third monitoring terminal and the second monitoring terminal are shared by multiple services, the available network bandwidth is in uncertainty and varies over time. Furthermore, an end-to-end network consists of multiple devices and links between devices. Therefore, based on consideration of end-to-end data transmission delay, a detected minimum value of available bandwidth of each end-to-end link is usually used as end-to-end available network bandwidth.

It may be understood that since the network detection module detects the available network bandwidth and minimum delay time between the data sending end and the data receiving end, the network detection module may be deployed at the data sending end, or may be deployed at the data receiving end, or may be deployed at the data sending end and the data receiving end simultaneously, specific deployment position thereof may be set according to actual requirements, which is not specifically limited in the embodiments of the disclosure.

According to the monitoring system based on a digital converter station provided in the embodiments of the disclosure, network bandwidth detection is periodically performed to detect and obtain the available network bandwidth and minimum delay time between the data sending end and the data receiving end in real time, so that when data needs to be transmitted between the data sending end and the data receiving end, an appropriate data transmission rate may be determined according to the available network bandwidth detected in real time, to ensure that an optimal data transmission rate may be maintained even in case of limited bandwidth resources, the data transmission process may be completed as quickly as possible, and network bandwidth resources may also be reasonably utilized to avoid network bandwidth resources from being idle, thereby improving resource utilization.

As an improvement of the above solution, the network detection module periodically performing network bandwidth detection to detect the available network bandwidth and minimum delay time between the data sending end and the corresponding data receiving end, specifically includes that:

each time when the network detection module performs network bandwidth detection, the network detection module sequentially sends detection packets to the corresponding data receiving end in an incremental packet sending rate, and records a RTT value and a packet sending rate corresponding to the detection packet sent each time, when the network detection module determines that the RTT value increases for the first time, the network detection module marks a time point when the RTT value increases as T1, marks a last time point when the RTT value is unchanged before T1 as T0, determines the minimum delay time according to a RTT value corresponding to T0, and determines the available network bandwidth between the data sending end and the corresponding data receiving end according to a last packet sending rate before T1.

Specifically, with reference to the above embodiments, each time when the network detection module performs network bandwidth detection, operation principles are the same. In any single network bandwidth detection, specific operation process of the network detection module is as follows.

The network detection module in the data sending end continues to send detection packets to the corresponding data receiving end according to a law that the packet sending rate gradually increases, records the packet sending rate corresponding to the detection packet sent each time, and records the RTT value each time when the ACK packet responded by the corresponding data receiving end is received. It may be understood that in a process of gradually increasing the packet sending rate, as long as the packet sending rate does not exceed the available network bandwidth, the RTT value corresponding to the detection packet may remain unchanged, and as the packet sending rate gradually increases, after a new flow rate fills the available network bandwidth, excess detection packets will enter the buffer, which may cause increase of the RTT value, until when it is determined that the RTT value increases for the first time, sending the detection packets may be stopped.

The network detection module may determine a variation trend of the RTT value according to the recorded RTT value. When the network detection module determines that the RTT value increases for the first time, the network detection module marks the time point when the RTT value increases as T1, that is, all RTT values recorded before the time point T1 remain unchanged; the network detection module marks the last time point when the RTT value is unchanged before the time point T1 as T0, that is, the RTT value starts to increase after the time point T0, that is to say, after the time point T0, the packet sending rate starts to exceed the available network bandwidth, the packets enter the buffer, and the delay increases. Therefore, the network detection module may determine the minimum delay time according to the RTT value corresponding to the time point T0, and may determine a variation trend of the available network bandwidth according to the variation trend of the RTT value. Correspondingly, the available network bandwidth between the data sending end and the corresponding data receiving end may be determined according to the last packet sending rate before the time point T1.

According to the monitoring system based on a digital converter station provided in the embodiments of the disclosure, detection packets are continuously sent according to the law that the packet sending rate gradually increases, and the variation trend of the available network bandwidth is determined according to the variation trend of the recorded RTT value, thereby determining the available network bandwidth and minimum delay time between the data sending end and the corresponding data receiving end; the network bandwidth detection may be implemented simply, conveniently and quickly without occupying too much network bandwidth resources, and the network status may be reflected in time according to the variation trend of the RTT value, thereby improving accuracy of the detection result.

As an improvement of the above solution, each time when the network detection module performs network bandwidth detection, the network detection module sequentially sending detection packets to the corresponding data receiving end in the incremental packet sending rate, specifically includes that:

the network detection module performs network bandwidth detection, the network detection module acquires an available bandwidth upper limit according to a maximum export bandwidth of a local data sending end and a bandwidth occupancy experience value of the local data sending end, the network detection module sets a rate adjustment threshold according to the available bandwidth upper limit, and in a process of sequentially sending detection packets to the corresponding data receiving end in the incremental packet sending rate, when the packet sending rate is less than the rate adjustment threshold, the network detection module sequentially sends detection packets to the corresponding data receiving end in the incremental packet sending rate based on a first increase amplitude, and when the packet sending rate is not less than the rate adjustment threshold, the network detection module sequentially sends detection packets to the corresponding data receiving end in the incremental packet sending rate based on a second increase amplitude, the first increase amplitude is greater than the second increase amplitude.

Specifically, with reference to the above embodiments, when the network detection module sequentially sends detection packets to the corresponding data receiving end in the incremental packet sending rate, the network detection module may determine the available bandwidth upper limit between the data sending end and the corresponding data receiving end in advance according to the maximum export bandwidth of the local data sending end (that is, a data sending end where the network detection module is located) and the bandwidth occupancy experience value of the local data sending end (the bandwidth occupancy experience value may be evaluated and determined according to historical bandwidth occupancy data in the data sending end), and set the rate adjustment threshold according to the available bandwidth upper limit. Based on the set rate adjustment threshold, in the process of sequentially sending detection packets to the corresponding data receiving end in the incremental packet sending rate, when the packet sending rate does not reach the set rate adjustment threshold, the network detection module may gradually increase the packet sending rate according to the first increase amplitude, and sequentially send detection packets to the corresponding data receiving end, until when the packet sending rate increases to reach the set rate adjustment threshold, the network detection module may continue to gradually increase the packet sending rate according to the second increase amplitude, and sequentially send detection packets to the corresponding data receiving end, the first increase amplitude is greater than the second increase amplitude.

It should be noted that an initial packet sending rate of the detection packets may be set according to actual requirements. For example, a small initial packet sending rate may be set, to start to send the detection packets to the corresponding data receiving end at the initial packet sending rate, the packet sending rate gradually increases according to the first increase amplitude, and the detection packets are sequentially sent to the corresponding data receiving end, until when the packet sending rate increases to reach the set rate adjustment threshold, the packet sending rate continues to gradually increase according to the second increase amplitude, and detection packets are sequentially sent to the corresponding data receiving end, until when it is determined that the RTT value increases for the first time, sending the detection packets may be stopped.

It may be understood that the packet sending rate increases gradually from low to high. At the beginning of the increase, there is a large adjustable space, and impact on the detection result is small. Therefore, a large increase amplitude may be used to gradually increase the packet sending rate. However, after the packet sending rate increases to a certain level, there is a small adjustable space, and impact on the detection result is large. Therefore, a small increase amplitude may be used to continue to gradually increase the packet sending rate, to improve accuracy of the detection result.

Exemplarily, the rate adjustment threshold is set to be 50% of the available bandwidth upper limit, the packet sending rate increases with a large percentage of the available bandwidth upper limit at the beginning, and when the packet sending rate reaches 50% of the available bandwidth upper limit, the packet sending rate increases with a small percentage of the available bandwidth upper limit, and specific increase amplitude may be set according to actual requirements, which is not specifically limited in the embodiments of the disclosure.

In yet another preferred embodiment, the data transmission adjustment and control module is further configured to sequentially enter a first transmission stage, a second transmission stage and a third transmission stage of a data transmission process when the local monitoring terminal needs to transmit the video fusion service data to another monitoring terminal, until when data transmission is completed, the data transmission process ends.

In the first transmission stage, an available network bandwidth and minimum delay time currently recorded by a local network detection module are acquired, and the initial data transmission rate of the video fusion service data is determined according to the acquired available network bandwidth, to start to transmit the video fusion service data to another monitoring terminal according to the initial data transmission rate, until when it is determined that the preset rate adjustment condition is triggered, the second transmission stage is entered, the rate adjustment condition is that it is determined that a RTT value increases to a preset delay time threshold for the first time, or that a packet loss report is received for the first time.

In the second transmission stage, a current data transmission rate of the video fusion service data is adjusted according to the acquired available network bandwidth and minimum delay time, a delay time detected when the rate adjustment condition is triggered, and a target delay recovery time configured based on a data type of the video fusion service data and a user type of the user of the monitoring retrieval request, to continue to transmit the video fusion service data to another monitoring terminal in the adjusted data transmission rate, until when it is determined that the delay time detected when the rate adjustment condition is triggered is restored to the acquired minimum delay time, the third transmission stage is entered.

In the third transmission stage, the local network detection module is triggered to perform network bandwidth detection while continuing to transmit the video fusion service data to another monitoring terminal in the adjusted data transmission rate, to detect and record an available network bandwidth and minimum delay time between the local monitoring terminal and another monitoring terminal, acquire the available network bandwidth and minimum delay time currently recorded by the local network detection module, and determine the data transmission rate of the video fusion service data according to the acquired available network bandwidth, to continue to transmit the video fusion service data to another monitoring terminal according to the determined data transmission rate, until when it is determined that the rate adjustment condition is triggered, the second transmission stage is returned to.

Specifically, with reference to the above embodiments, the data transmission adjustment and control module is mainly configured to divide the data transmission process of the whole video fusion service data into three stages when the local monitoring terminal needs to transmit the video fusion service data to another monitoring terminal, that is, three stages include the first transmission stage, the second transmission stage and the third transmission stage, the data transmission adjustment and control module sequentially enters the first transmission stage, the second transmission stage and the third transmission stage, until when transmission of all to-be-transmitted video fusion service data are completed, the whole data transmission process ends, and specific data transmission process is as follows.

In the first transmission stage, the data transmission adjustment and control module acquires the available network bandwidth and minimum delay time currently recorded by the local network detection module (that is, before starting to transmit the video fusion service data, the available network bandwidth and minimum delay time obtained by the latest detection by the local network detection module), determines the initial data transmission rate of the video fusion service data according to the acquired available network bandwidth, and starts to transmit the video fusion service data to another monitoring terminal according to the determined initial data transmission rate, until when it is determined that the preset rate adjustment condition is triggered, the second transmission stage is entered.

It should be noted that since the video fusion service data may be transmitted in form of service packet, the RTT value corresponding to the service packet sent each time may also be acquired and recorded. Therefore, the rate adjustment condition may be set as: it is determined that the RTT value increases to the preset delay time threshold for the first time; or, a packet loss situation of the service packet may be monitored, the rate adjustment condition is set as: the packet loss report is received for the first time. That is, in the first transmission stage, when it is determined that the RTT value increases to the preset delay time threshold for the first time, the second transmission stage is entered; or, when the packet loss report is received for the first time, the second transmission stage is entered.

In the second transmission stage, the data transmission adjustment and control module adjusts the current data transmission rate of the video fusion service data according to the available network bandwidth and minimum delay time currently recorded by the local network detection module and acquired in the first transmission stage, the delay time detected when the rate adjustment condition is triggered in the first transmission stage, and the target delay recovery time configured based on the data type of the video fusion service data and the user type of the user of the monitoring retrieval request (the user of the monitoring retrieval request specifically refers to a user who requests to acquire the video fusion service data, that is, a user who issues the monitoring retrieval request), (at this time, the initial data transmission rate in the first transmission stage is adjusted, and is subjected to adjustment of reduction), obtains the adjusted data transmission rate correspondingly, and continues to transmit the video fusion service data to another monitoring terminal in the adjusted data transmission rate, until when it is determined that the RTT value is restored from the delay time detected when the rate adjustment condition is triggered to the acquired minimum delay time currently recorded by the local network detection module (that is, the RTT value is restored from the delay time when the rate adjustment condition is triggered to a value before the RTT value increases), the third transmission stage is entered.

In the third transmission stage, the data transmission adjustment and control module triggers the local network detection module to perform network bandwidth detection while continuing to transmit the video fusion service data to another monitoring terminal in the adjusted data transmission rate determined in the second transmission stage (specific operation process of the network bandwidth detection is described in the above embodiments, and is not elaborated here), to detect and record the available network bandwidth and minimum delay time between the local monitoring terminal and another monitoring terminal, similarly acquire the available network bandwidth and minimum delay time currently recorded by the local network detection module, determine the data transmission rate of the video fusion service data according to the acquired available network bandwidth, continue to adjust the adjusted data transmission rate determined in the second transmission stage to the data transmission rate determined in the third transmission stage, to continue to transmit the video fusion service data to another monitoring terminal according to the data transmission rate determined in the third transmission stage, until when it is determined that the rate adjustment condition is triggered, the second transmission stage is returned to.

In the second transmission stage, the data transmission adjustment and control module continues to adjust the current data transmission rate of the video fusion service data according to the available network bandwidth and minimum delay time currently recorded by the local network detection module and acquired in the third transmission stage, the delay time detected when the rate adjustment condition is triggered in the third transmission stage, and the target delay recovery time configured based on the data type of the video fusion service data and the user type of the user of the monitoring retrieval request (at this time, the data transmission rate determined in the third transmission stage is adjusted), obtains the adjusted data transmission rate correspondingly, and continues to transmit the video fusion service data to another monitoring terminal in the adjusted data transmission rate, until when it is determined that the RTT value is restored from the delay time when the rate adjustment condition is triggered to the value before the RTT value increases, the third transmission stage is returned to; and so on, until when transmission of all to-be-transmitted video fusion service data are completed, the whole data transmission process ends.

Exemplarily, it is assumed that in the first transmission stage, the available network bandwidth currently recorded by the local network detection module is acquired by the data transmission adjustment and control module, the initial data transmission rate determined according to the acquired available network bandwidth is X1, that is, the local monitoring terminal starts to transmit the video fusion service data to another monitoring terminal according to the initial data transmission rate X1, until when it is determined that the rate adjustment condition is triggered, the second transmission stage is entered; in the second transmission stage, the data transmission adjustment and control module reduces the data transmission rate from X1 to X2, the local monitoring terminal continues to transmit the video fusion service data to another monitoring terminal according to the data transmission rate X2, until when it is determined that the network delay returns to normal, the third transmission stage is entered; in the third transmission stage, the data transmission adjustment and control module triggers the local network detection module to perform network bandwidth detection while keeping the data transmission rate X2 unchanged, and re-detect and record the available network bandwidth, and the data transmission rate determined according to the available network bandwidth obtained by re-detection is X3, then the data transmission adjustment and control module adjusts the data transmission rate from X2 to X3, the local monitoring terminal continues to transmit the video fusion service data to another monitoring terminal according to the data transmission rate X3, until when it is determined that the rate adjustment condition is triggered again, the second transmission stage is returned to, to perform corresponding processing; and so on, the data transmission process passes through the first transmission stage, and then circulates between the second transmission stage and the third transmission stage, until when transmission of all to-be-transmitted video fusion service data are completed, the whole data transmission process ends.

It should be noted that in the second transmission stage, the current data transmission rate of the video fusion service data may be adjusted, which may be implemented by using the rate adjustment solution provided in the above embodiments, and specific implementation process is as follows. In the second transmission stage, the data transmission adjustment and control module acquires the available network bandwidth S0 and minimum delay time RTT0 detected and obtained by performing the network bandwidth detection (that is, the available network bandwidth S0 and minimum delay time RTT0 currently recorded by the local network detection module and acquired in the first transmission stage) before the rate adjustment condition is triggered; marks the time point when it is determined that the rate adjustment condition is met as T2 (that is, the time point when it is determined that the RTT value increases to the preset delay time threshold for the first time is marked as T2, or, the time point when the packet loss report is received for the first time is marked as T2); obtains the delay time RTT2 corresponding to the time point T2 by monitoring the RTT value corresponding to the service packet of the video fusion service data; acquires the target delay recovery time t configured based on the data type of the video fusion service data and the user type of the user of the monitoring retrieval request; calculates and obtains the current available network bandwidth estimation value S2 according to the formula S2=RTT0/RTT2*S0; uses the time point T2 as a time point for determining size of the buffer on the way and a total number of in-transit packets; calculates and obtains the service data volume n entering the buffer from the video fusion service data sent, according to the formula n=(RTT2−RTT0)*S0; and then calculates and obtains the rate adjustment target value S2' for continuous transmission of the video fusion service data according to the formula S2'=S2−n/t. At this time, the data transmission adjustment and control module may adjust the current data transmission rate of the video fusion service data according to the rate adjustment target value S2' obtained by calculation, to obtain the adjusted data transmission rate S0' which meets S0'≤S2' correspondingly, to continue to transmit the video fusion service data to another monitoring terminal in the adjusted data transmission rate S0'. Exemplarily, the current data transmission rate of the video fusion service data may be directly reduced to S2', that is, the obtained adjusted data transmission rate S0' meets S0'=S2'; or, the current data transmission rate of the video fusion service data may be further reduced based on S2', that is, the obtained adjusted data transmission rate S0' meets S0'<S2'.

Exemplarily, it is assumed that t=2 seconds, it is required to reduce the current data transmission rate when it is determined that the rate adjustment condition is met, so that service packets of the video fusion service data in the buffer may be cleared within 2 seconds (no more than 2 seconds) to ensure that the delay returns to normal.

It should be noted that in the third transmission stage, when it is determined that the RTT value is restored from the delay time when the rate adjustment condition is triggered to the value before the RTT value increases, the local network detection module may be directly triggered to start to perform network bandwidth detection. At this time, the initial packet sending rate of the detection packet may not select to use the initial packet sending rate set when the network bandwidth detection is performed periodically in the above embodiments, instead, may be directly determined according to the available network bandwidth estimation value S2 obtained by calculation in the second transmission stage. The initial packet sending rate determined according to the available network bandwidth estimation value S2 complies with the current network status better, and the packet sending rate gradually increases based on the initial packet sending rate, which may save time taken by a process of an earlier packet sending rate starting to increase from a small value, to detect and obtain the available network bandwidth and minimum delay time between the local monitoring terminal and another monitoring terminal more quickly; furthermore, detection packets and service packets of the video fusion service data do not affect each other, and the service and bandwidth may be used to the maximum extent.

According to the monitoring system based on a digital converter station provided in the embodiments of the disclosure, in the process of data transmission between the local monitoring terminal and another monitoring terminal, real-time detection and perception of the available network bandwidth and network delay may be used, and the data transmission rate is adaptively adjusted according to the detection result to avoid occurrence of network jitter, which may improve stability of the monitoring system, and may re-adjust the available network bandwidth downwards even in case of network packet loss, reasonably reduce the data transmission rate, restore the buffer and link to normal, thereby improving utilization of network bandwidth resources.

As an improvement of the above solution, the target delay recovery time is obtained by the data transmission adjustment and control module querying a preset delay recovery time table according to the data type of the video fusion service data and the user type of the user of the monitoring retrieval request, the delay recovery time table includes at least one data type, a user type corresponding to each data type, and a delay recovery time configured corresponding to each user type, the data type includes the video fusion service data, the user type includes an ordinary user and a VIP user; the higher the priority of service data corresponding to each data type, the shorter the delay recovery time configured corresponding thereto, and in the user type corresponding to the same data type, the delay recovery time configured corresponding to the ordinary user is greater than the delay recovery time configured corresponding to the VIP user.

Specifically, with reference to the above embodiments, the delay recovery time table is preset in the data transmission adjustment and control module, and the delay recovery time table includes at least one data type, the user type corresponding to each data type, and the delay recovery time configured corresponding to each user type. That is, in the delay recovery time table, there are one-to-one correspondences among the delay recovery time, the data type and the user type, the data type includes at least the data type corresponding to the video fusion service data; correspondingly, in combination with the user authorization management of the user on the monitoring side at each level in the above embodiments, the user may be configured as the ordinary user and the VIP user, and the user type corresponding to the data type of the video fusion service data in the delay recovery time table includes the ordinary user and the VIP user (the user type may also be set correspondingly according to actual requirements), the higher the priority of service data corresponding to the data type, the shorter the delay recovery time configured corresponding thereto, and in the same data type, the higher the priority corresponding to the user type, the shorter the delay recovery time configured corresponding thereto, that is, it is required that the service packets in the buffer may be cleared faster, so that the delay time may be restored to normal faster.

Exemplarily, the video fusion service data is taken as an example, it is assumed that in the delay recovery time table, when the user type is not considered, while only the data type is considered, the delay recovery time configured corresponding to the data type of the video fusion service data is t; when both the data type and the user type are considered, the user type configured corresponding to the data type of the video fusion service data includes the ordinary user and the VIP user, and priority of the VIP user is higher than that of the ordinary user, then the delay recovery time configured corresponding to the ordinary user may be t1 which meets t1≤t, and the delay recovery time configured corresponding to the VIP user may be t2 which meets t2<t1.

When the data transmission adjustment and control module acquires the target delay recovery time configured based on the data type of the video fusion service data and the user type of the user of the monitoring retrieval request, the data transmission adjustment and control module may query the delay recovery time table according to the data type of the video fusion service data and the user type of the user of the monitoring retrieval request; find out a data type matching the data type of the video fusion service data from all data types included in the delay recovery time table according to the data type of the video fusion service data, and then find out a user type matching the data type of the user of the monitoring retrieval request from user types corresponding to the matched data type found in the delay recovery time table according to the data type of the user of the monitoring retrieval request; and use the delay recovery time corresponding to the matched data type and user type in the delay recovery time table as the target delay recovery time configured based on the data type of the video fusion service data and the user type of the user of the monitoring retrieval request.

It should be noted that after the delay recovery time table is set initially, relevant information in the delay recovery time table is not fixed and unchanged, and may be updated according to user requirements during usage. For example, a delay recovery time corresponding to a certain data type may be modified; or, a new data type, its corresponding user type and delay recovery time may be added.

As an improvement of the above solution, the delay time threshold is set according to the currently recorded minimum delay time.

Specifically, with reference to the above embodiments, the data transmission adjustment and control module needs to determine whether the RTT value increases to the preset delay time threshold, the used delay time threshold may be set in real time according to the currently recorded minimum delay time. It may be understood that it may be set according to the minimum delay time detected in real time, and the delay time threshold set at this time complies with the current actual network status better, which may improve adaptability and flexibility of the solution of setting the delay time threshold.

It should be noted that the delay time threshold may also be preset as a fixed value according to user requirements, which is suitable for data transmission application scenarios which do not require high network delay.

Exemplarily, the delay time threshold may be set to 1.3 times the currently recorded minimum delay time, that is, when the data transmission adjustment and control module determines that the RTT value increases by 30% compared to the currently recorded minimum delay time for the first time, the data transmission adjustment and control module determines that the rate adjustment condition is met.

Generally speaking, the time point when the RTT value increases to the preset delay time threshold is present before the time point when the packet loss report is received for the first time. Therefore, when the rate adjustment condition is set as receiving the packet loss report for the first time, then the data transmission adjustment and control module may only start to reduce the data transmission rate after the buffer overflows and packets are lost. However, when the rate adjustment condition is set as determining that the RTT value increases to the preset delay time threshold for the first time, the data transmission adjustment and control module may reduce the data transmission rate before the buffer overflows and packets are lost, which may effectively avoid packet loss from occurring at this time.

In yet another preferred embodiment, a user at the first-level monitoring side is used as a first user, a user at the second-level monitoring side is used as a second user, a user at the third-level monitoring side is used as a third user, the video fusion processing module of the first monitoring terminal is used as a first video fusion processing module, the video fusion processing module of the second monitoring terminal is used as a second video fusion processing module, the video fusion processing module of the third monitoring terminal is used as a third video fusion processing module; the second monitoring terminal further includes a second network detection module, and the third monitoring terminal further includes a third network detection module.

The first video fusion processing module is further configured to perform user authorization management on the first user, to configure the first user as a first ordinary user or a first VIP user.

The second video fusion processing module is further configured to perform user authorization management on the second user, to configure the second user as a second ordinary user or a second VIP user.

The third video fusion processing module is further configured to perform user authorization management on the third user, to configure the third user as a third VIP user.

The second network detection module is configured to periodically perform network bandwidth detection to detect an available network bandwidth between the second monitoring terminal and the first monitoring terminal, and send a currently detected first available network bandwidth to the first video fusion processing module.

The third network detection module is configured to periodically perform network bandwidth detection to detect an available network bandwidth between the third monitoring terminal and the second monitoring terminal, and send a currently detected second available network bandwidth to the first video fusion processing module.

The first video fusion processing module is further configured to adjust at least one of a number of first VIP users or a number of second VIP users according to the first available network bandwidth and the second available network bandwidth.

Each of the first ordinary user and the second ordinary user is configured to have authorization to view video fusion images of a designated monitored area of the digital converter station, and each of the first VIP user, the second VIP user and the third VIP user is configured to have authorization to view video fusion images of all monitored areas of the digital converter station.

Specifically, with reference to the above embodiments, the first video fusion processing module may perform user authorization management on the first user at the first-level monitoring side, to configure the first user as the first ordinary user or the first VIP user; the second video fusion processing module may perform user authorization management on the second user at the second-level monitoring side, to configure the second user as the second ordinary user or the second VIP user; the third video fusion processing module may perform user authorization management on the third user at the third-level monitoring side, to configure the third user as the third VIP user. User authorization of each of the first ordinary user and the second ordinary user is: has authorization to view video fusion images of the designated monitored area of the digital converter station, and each of the first VIP user, but does not have authorization to view video fusion images of other monitored areas except the designated monitored area of the digital converter station, and the first ordinary user has the same user authorization as the second ordinary user; user authorization of each of the first VIP user, the second VIP user and the third VIP user is: has authorization to view video fusion images of all monitored areas of the digital converter station.

Based on that user authorizations may be managed, the second monitoring terminal further includes the second network detection module, and the second network detection module is mainly configured to periodically perform network bandwidth detection between the second monitoring terminal and the first monitoring terminal (specific operation process of the second network detection module has the same principle as that of the network detection module in the above embodiments, and is not elaborated here), to detect the first available network bandwidth between the second monitoring terminal and the first monitoring terminal in real time, and send the first available network bandwidth obtained by the current detection to the first video fusion processing module; similarly, the third monitoring terminal further includes the third network detection module, and the third network detection module is mainly configured to periodically perform network bandwidth detection between the third monitoring terminal and the second monitoring terminal (specific operation process of the third network detection module has the same principle as that of the network detection module in the above embodiments, and is not elaborated here), to detect the second available network bandwidth between the third monitoring terminal and the second monitoring terminal in real time, and send the second available network bandwidth obtained by the current detection to the first video fusion processing module; then, after receiving the first available network bandwidth detected by the second network detection module in real time, and receiving the second available network bandwidth detected by the third network detection module in real time, the first video fusion processing module may adjust the number of first VIP users at the first-level monitoring side and/or the number of second VIP users at the second-level monitoring side according to the received first available network bandwidth and second available network bandwidth.

It should be noted that both the number of first VIP users at the first-level monitoring side and the number of second VIP users at the second-level monitoring side may be adjusted according to network bandwidth detected in real time, and adjustment of the number of VIP users may be achieved by configuring corresponding user authorizations. Furthermore, in actual adjustment, only the number of first VIP users at the first-level monitoring side may be adjusted, or only the number of second VIP users at the second-level monitoring side may be adjusted, or the number of first VIP users at the first-level monitoring side and the number of second VIP users at the second-level monitoring side may be adjusted simultaneously. Specific adjustment solution may be flexibly set according to actual requirements, which is not specifically limited in the embodiments of the disclosure.

It may be understood that since the first ordinary user and the second ordinary user have the same user authorization and share video fusion raw data of the same designated monitored area of the digital converter station, the first ordinary user and the second ordinary user only occupy a part of network bandwidth together, increase of the number of first ordinary users and the number of second ordinary users may not increase occupation of the bandwidth, and the first ordinary user and the second ordinary user directly complete the video fusion task locally, which may not increase wide-area bandwidth resources. Therefore, theoretically, the number of first ordinary users and the number of second ordinary users may be increased arbitrarily, and the number of first ordinary users and the number of second ordinary users are only limited by video fusion computing resources which may be provided locally, and may continuously increase until reaching an upper limit of the video fusion computing resources which may be provided locally. However, when there is a requirement of basic number locally in view of the number of VIP users, it also needs to consider whether the network bandwidth resources may meet bandwidth requirements of the basic number of VIP users; when the detected network bandwidth resources are not enough to meet requirements of the basic number of first VIP users and second VIP users, data upload bandwidth resources in the designated monitored area occupied by the first ordinary user and the second ordinary user may be released. At this time, user authorizations of all ordinary users cannot be used. By using bandwidth resources released by ordinary users, VIP users are activated and pulled up synchronously to perform corresponding processing. When the VIP users release this part of bandwidth resources, and it is detected that network bandwidth resources are sufficient, the ordinary users may still be scheduled and pulled up again.

According to the monitoring system based on a digital converter station provided in the embodiments of the disclosure, the available network bandwidth between the second monitoring terminal and the first monitoring terminal and the available network bandwidth between the third monitoring terminal and the second monitoring terminal are detected in real time by performing the network bandwidth detection periodically, and uniformly reported to the first video fusion processing module; the first video fusion processing module centrally adjusts and allocates the number of first VIP users at the first-level monitoring side and the number of second VIP users at the second-level monitoring side, so that the user authorization may be adjusted in time according to the network bandwidth status. Based on the user authorization management, it may avoid a large network delay caused by insufficient available network bandwidth from occurring, to achieve effective matching between user experience and available network bandwidth resources, which may fully ensure requirements of Service Level Agreement (SLA) of user services and ensure full utilization of network bandwidth resources.

In yet another preferred embodiment, the first video fusion processing module adjusting at least one of the number of first VIP users or the number of second VIP users according to the first available network bandwidth and the second available network bandwidth, specifically includes that:

when the first video fusion processing module only needs to adjust the number of first VIP users, and the number of second VIP users needs to maintain a basic number without change, the first video fusion processing module acquires a first remaining network bandwidth according to the first available network bandwidth, the second available network bandwidth, a network bandwidth occupied by the first ordinary user, and a network bandwidth occupied by a basic number of second VIP users, and adjusts the number of first VIP users according to the first remaining network bandwidth, when the first video fusion processing module only needs to adjust the number of second VIP users, and the number of first VIP users needs to maintain a basic number without change, the first video fusion processing module acquires a second remaining network bandwidth according to the first available network bandwidth, the second available network bandwidth, the network bandwidth occupied by the first ordinary user, and a network bandwidth occupied by a basic number of first VIP users, and adjusts the number of second VIP users according to the second remaining network bandwidth, when the first video fusion processing module needs to adjust the number of first VIP users and the number of second VIP users simultaneously, the first video fusion processing module acquires a third remaining network bandwidth according to the first available network bandwidth, the second available network bandwidth, and the network bandwidth occupied by the first ordinary user, and adjusts the number of first VIP users and the number of second VIP users according to the third remaining network bandwidth.

Specifically, with reference to the above embodiments, when the first video fusion processing module adjusts the number of first VIP users at the first-level monitoring side and/or the number of second VIP users at the second-level monitoring side according to the first available network bandwidth and the second available network bandwidth received in real time, the following adjustment solution may be used.

When only the number of first VIP users at the first-level monitoring side needs to be adjusted, and the number of second VIP users at the second-level monitoring side needs to maintain a certain basic number without change, the first video fusion processing module determines the current first remaining network bandwidth according to the first available network bandwidth received in real time, the second available network bandwidth received in real time, the network bandwidth fixedly occupied by the first ordinary user at the first-level monitoring side (i.e., the network bandwidth fixedly occupied by the second ordinary user at the second-level monitoring side), and the network bandwidth occupied by the basic number of second VIP users, and then correspondingly adjusts the number of first VIP users at the first-level monitoring side according to the first remaining network bandwidth.

When only the number of second VIP users at the second-level monitoring side needs to be adjusted, and the number of first VIP users at the first-level monitoring side needs to maintain a certain basic number without change, the first video fusion processing module determines the current second remaining network bandwidth according to the first available network bandwidth received in real time, the second available network bandwidth received in real time, the network bandwidth fixedly occupied by the first ordinary user at the first-level monitoring side (i.e., the network bandwidth fixedly occupied by the second ordinary user at the second-level monitoring side), and the network bandwidth occupied by the basic number of first VIP users, and then correspondingly adjusts the number of second VIP users at the second-level monitoring side according to the second remaining network bandwidth.

When the number of first VIP users at the first-level monitoring side and the number of second VIP users at the second-level monitoring side need to be adjusted simultaneously, the first video fusion processing module determines the current third remaining network bandwidth according to the first available network bandwidth received in real time, the second available network bandwidth received in real time, and the network bandwidth fixedly occupied by the first ordinary user at the first-level monitoring side (i.e., the network bandwidth fixedly occupied by the second ordinary user at the second-level monitoring side), and then correspondingly adjusts the number of first VIP users at the first-level monitoring side and the number of second VIP users at the second-level monitoring side according to the third remaining network bandwidth.

It should be noted that in an actual adjustment process, requirements of the first-level monitoring side on the basic number of first VIP users and requirements of the second-level monitoring side on the basic number of second VIP users may be considered. When the number of first VIP users at the first-level monitoring side and/or the number of second VIP users at the second-level monitoring side are configured based on the currently detected available network bandwidth, it ensures that at least the basic number of VIP users may be used normally, and the remaining number of users is configured based on the remaining network bandwidth, to ensure that the total bandwidth occupied by all users at the first-level monitoring side and the second-level monitoring side does not exceed the currently detected available network bandwidth.

According to the monitoring system based on a digital converter station provided in the embodiments of the disclosure, adjustment of the number of first VIP users at the first-level monitoring side and the number of second VIP users at the second-level monitoring side may be supported based on the detected available network bandwidth. According to user requirements, adjustment of only the number of first VIP users at the first-level monitoring side may be selected, or adjustment of only the number of second VIP users at the second-level monitoring side may be selected, or simultaneous adjustment of the number of first VIP users at the first-level monitoring side and the number of second VIP users at the second-level monitoring side may be selected, thereby improving flexibility of user authorization adjustment.

As an improvement of the above solution, the first video fusion processing module adjusting the number of first VIP users according to the first remaining network bandwidth, specifically includes that:

the first video fusion processing module determines whether the first remaining network bandwidth is greater than a preset first bandwidth threshold, and if yes, the first video fusion processing module configures at least M first users as first VIP users; if no, the first video fusion processing module releases the network bandwidth occupied by the first ordinary user, and configures at least M first users as first VIP users according to the first remaining network bandwidth and the network bandwidth occupied by the first ordinary user.

M represents a basic number of first VIP users required to be maintained, M≥1, and the first bandwidth threshold is set according to a network bandwidth occupied by the M first VIP users.

Specifically, with reference to the above embodiments, when requirements of the first-level monitoring side on the basic number of first VIP users are considered, it needs to ensure that the first-level monitoring side must maintain the basic number of first VIP users, i.e., M (M≥1) first VIP users.

Then, when the first video fusion processing module adjusts the number of first VIP users at the first-level monitoring side according to the first remaining network bandwidth, the first video fusion processing module may compare the first remaining network bandwidth with the preset first bandwidth threshold, to determine whether the first remaining network bandwidth is greater than the preset first bandwidth threshold, and if yes, the first video fusion processing module configures at least M first users as first VIP users according to the first remaining network bandwidth; if no, the first video fusion processing module releases the network bandwidth fixedly occupied by the first ordinary user at the first-level monitoring side (i.e., the network bandwidth fixedly occupied by the second ordinary user at the second-level monitoring side) by disabling user authorizations of the first ordinary user and the second ordinary user, and configures at least M first users as first VIP users according to the first remaining network bandwidth and the released network bandwidth fixedly occupied by the first ordinary user.

The first bandwidth threshold may be set according to the network bandwidth occupied by the M first VIP users, and on this basis, when the first remaining network bandwidth is compared with the first bandwidth threshold, it may be determined whether the first remaining network bandwidth meets bandwidth requirements of the M first VIP users, and if yes, at least M first users are configured as first VIP users; if no, data upload bandwidth resources of the designated monitored area are released. At this time, user authorizations of all ordinary users cannot be used. By using bandwidth resources released by ordinary users and resources of the first remaining network bandwidth, at least M first users are configured as first VIP users, to ensure that at least M first VIP users may be used normally, thereby ensuring that requirements of the first-level monitoring side on the basic number of first VIP users may be met.

It should be noted that in addition to the M first VIP users which need to be maintained, the number of remaining first VIP users may be configured according to actual requirements, or may be configured according to limitation of network bandwidth, which are not specifically limited in the embodiments of the disclosure.

As an improvement of the above solution, the first video fusion processing module adjusting the number of first VIP users according to the first remaining network bandwidth, specifically includes that:

the first video fusion processing module determines whether the first remaining network bandwidth is greater than a network bandwidth occupied by one of the first VIP users, and if yes, the first video fusion processing module configures at least one of the first users as the first VIP user; if no, the first video fusion processing module configures all the first users as first ordinary users.

Specifically, with reference to the above embodiments, when requirements of the first-level monitoring side on the basic number of first VIP users are not considered, and it is unnecessary to ensure that the first-level monitoring side must maintain the basic number of first VIP users (for example, in an extreme case, the number of first VIP users at the first-level monitoring side may be 0), then when the first video fusion processing module adjusts the number of first VIP users at the first-level monitoring side according to the first remaining network bandwidth, the first video fusion processing module may directly compare the first remaining network bandwidth with the network bandwidth occupied by one of the first VIP users, to determine whether the first remaining network bandwidth is greater than the network bandwidth occupied by one of the first VIP users, and if yes, the first video fusion processing module configures at least one of the first users as the first VIP user; if no, the first video fusion processing module configures all the first users as first ordinary users, and the number of first VIP users is 0 at this time.

It should be noted that when the first video fusion processing module configures at least one of the first users as the first VIP user, a specific number of first VIP users may be configured according to actual requirements, or may be configured according to limitation of network bandwidth, which are not specifically limited in the embodiments of the disclosure.

As an improvement of the above solution, the first video fusion processing module adjusting the number of second VIP users according to the second remaining network bandwidth, specifically includes that:

the first video fusion processing module determines whether the second remaining network bandwidth is greater than a preset second bandwidth threshold, and if yes, the first video fusion processing module sends a VIP user increase instruction to the second video fusion processing module; if no, the first video fusion processing module sends an ordinary user disabling instruction to the second video fusion processing module, the second video fusion processing module configures at least N second users as second VIP users according to the VIP user increase instruction, or releases a network bandwidth occupied by the second ordinary user according to the ordinary user disabling instruction, and configures at least N second users as second VIP users according to the second remaining network bandwidth and the network bandwidth occupied by the second ordinary user.

N represents a basic number of second VIP users required to be maintained, N≥1, and the second bandwidth threshold is set according to a network bandwidth occupied by the N second VIP users.

Specifically, with reference to the above embodiments, when requirements of the second-level monitoring side on the basic number of second VIP users are considered, it needs to ensure that the second-level monitoring side must maintain the basic number of second VIP users, i.e., N (N≥1) second VIP users. Then, when the first video fusion processing module adjusts the number of second VIP users at the second-level monitoring side according to the second remaining network bandwidth, the first video fusion processing module may compare the second remaining network bandwidth with the preset second bandwidth threshold, to determine whether the second remaining network bandwidth is greater than the preset second bandwidth threshold, and if yes, the first video fusion processing module generates a corresponding VIP user increase instruction and sends the instruction to the second video fusion processing module, the second video fusion processing module responds to the received VIP user increase instruction and configures at least N second users as second VIP users according to the received VIP user increase instruction; if no, the first video fusion processing module generates the ordinary user disabling instruction and sends the instruction to the second video fusion processing module, the second video fusion processing module responds to the received ordinary user disabling instruction, disables the user authorization of the second ordinary user at the second-level monitoring side according to the received ordinary user disabling instruction, releases the network bandwidth fixedly occupied by the second ordinary user (i.e., the network bandwidth fixedly occupied by the first ordinary user at the first-level monitoring side, the first video fusion processing module may also disable the user authorization of the first ordinary user), and configures at least N second users as second VIP users according to the second remaining network bandwidth and the released network bandwidth fixedly occupied by the second ordinary user.

The second bandwidth threshold may be set according to the network bandwidth occupied by the N second VIP users, and on this basis, when the second remaining network bandwidth is compared with the second bandwidth threshold, it may be determined whether the second remaining network bandwidth meets bandwidth requirements of the N second VIP users, and if yes, at least N second users are configured as second VIP users; if no, data upload bandwidth resources of the designated monitored area are released. At this time, user authorizations of all ordinary users cannot be used. By using bandwidth resources released by ordinary users and resources of the second remaining network bandwidth, at least N second users are configured as second VIP users, to ensure that at least N second VIP users may be used normally, thereby ensuring that requirements of the second-level monitoring side on the basic number of second VIP users may be met.

It should be noted that in addition to the N second VIP users which need to be maintained, the number of remaining second VIP users may be configured according to actual requirements, or may be configured according to limitation of network bandwidth, which are not specifically limited in the embodiments of the disclosure.

As an improvement of the above solution, the first video fusion processing module adjusting the number of second VIP users according to the second remaining network bandwidth, specifically includes that:

the first video fusion processing module determines whether the second remaining network bandwidth is greater than a network bandwidth occupied by one of the second VIP users, and if yes, the first video fusion processing module sends a VIP user increase instruction to the second video fusion processing module; if no, the first video fusion processing module sends a VIP user decrease instruction to the second video fusion processing module, the second video fusion processing module configures at least one second user as the second VIP user according to the VIP user increase instruction, or configures all second users as second ordinary users according to the VIP user decrease instruction.

Specifically, with reference to the above embodiments, when requirements of the second-level monitoring side on the basic number of second VIP users are not considered, and it is unnecessary to ensure that the second-level monitoring side must maintain the basic number of second VIP users (for example, in an extreme case, the number of second VIP users at the second-level monitoring side may be 0), then when the first video fusion processing module adjusts the number of second VIP users at the second-level monitoring side according to the second remaining network bandwidth, the first video fusion processing module may directly compare the second remaining network bandwidth with the network bandwidth occupied by one of the second VIP users, to determine whether the second remaining network bandwidth is greater than the network bandwidth occupied by one of the second VIP users, and if yes, the first video fusion processing module generates a corresponding VIP user increase instruction and sends the instruction to the second video fusion processing module, the second video fusion processing module responds to the received VIP user increase instruction and configures at least one of the second users as the second VIP user according to the received VIP user increase instruction; if no, the first video fusion processing module generates a corresponding VIP user decrease instruction and sends the instruction to the second video fusion processing module, the second video fusion processing module responds to the received VIP user decrease instruction, configures all the second users as second ordinary users according to the received VIP user decrease instruction, and the number of second VIP users is 0 at this time.

It should be noted that when the first video fusion processing module controls the second video fusion processing module to configure at least one of the second users as the second VIP user, a specific number of second VIP users may be configured according to actual requirements, or may be configured according to limitation of network bandwidth, which are not specifically limited in the embodiments of the disclosure.

As an improvement of the above solution, the first video fusion processing module adjusting the number of first VIP users and the number of second VIP users according to the third remaining network bandwidth, specifically includes that:

the first video fusion processing module determines whether the third remaining network bandwidth is greater than a preset third bandwidth threshold, and if yes, the first video fusion processing module configures at least M first users as first VIP users, and sends a VIP user increase instruction to the second video fusion processing module; if no, the first video fusion processing module releases the network bandwidth occupied by the first ordinary user, configures at least M first users as first VIP users according to the third remaining network bandwidth and the network bandwidth occupied by the first ordinary user, and sends an ordinary user disabling instruction to the second video fusion processing module, the second video fusion processing module configures at least N second users as second VIP users according to the VIP user increase instruction, or releases a network bandwidth occupied by the second ordinary user according to the ordinary user disabling instruction, and configures at least N second users as second VIP users according to the third remaining network bandwidth and the network bandwidth occupied by the second ordinary user.

M represents a basic number of first VIP users required to be maintained, M≥1, N represents a basic number of second VIP users required to be maintained, N≥1, and the third bandwidth threshold is set according to a network bandwidth occupied by the M first VIP users and a network bandwidth occupied by the N second VIP users.

Specifically, with reference to the above embodiments, when requirements of the first-level monitoring side on the basic number of first VIP users are considered, it needs to ensure that the first-level monitoring side must maintain the basic number of first VIP users, i.e., M (M≥1) first VIP users; and when requirements of the second-level monitoring side on the basic number of second VIP users are considered, it needs to ensure that the second-level monitoring side must maintain the basic number of second VIP users, i.e., N (N≥1) second VIP users. Then, when the first video fusion processing module adjusts the number of first VIP users at the first-level monitoring side and the number of second VIP users at the second-level monitoring side according to the third remaining network bandwidth, the first video fusion processing module may compare the third remaining network bandwidth with the preset third bandwidth threshold, to determine whether the third remaining network bandwidth is greater than the preset third bandwidth threshold:

if yes, the first video fusion processing module configures at least M first users as first VIP users according to the third remaining network bandwidth, generates a corresponding VIP user increase instruction and sends the instruction to the second video fusion processing module, the second video fusion processing module responds to the received VIP user increase instruction and configures at least N second users as second VIP users according to the received VIP user increase instruction;

if no, the first video fusion processing module disables the user authorization of the first ordinary user, generates the ordinary user disabling instruction and sends the instruction to the second video fusion processing module, the second video fusion processing module responds to the received ordinary user disabling instruction, and disables the user authorization of the second ordinary user according to the received ordinary user disabling instruction, to release the network bandwidth fixedly occupied by the first ordinary user (i.e., the network bandwidth fixedly occupied by the second ordinary user), and then the first video fusion processing module configures at least M first users as first VIP users according to the third remaining network bandwidth and the released network bandwidth fixedly occupied by the ordinary user, the second video fusion processing module configures at least N second users as second VIP users according to the third remaining network bandwidth and the released network bandwidth fixedly occupied by the ordinary user.

The third bandwidth threshold may be set according to the network bandwidth occupied by the M first VIP users and the network bandwidth occupied by the N second VIP users, and on this basis, when the third remaining network bandwidth is compared with the third bandwidth threshold, it may be determined whether the third remaining network bandwidth meets bandwidth requirements of the M first VIP users and the N second VIP users, and if yes, at least M first users are configured as first VIP users, and at least N second users are configured as second VIP users; if no, data upload bandwidth resources of the designated monitored area are released. At this time, user authorizations of all ordinary users cannot be used. By using bandwidth resources released by ordinary users and resources of the third remaining network bandwidth, at least M first users are configured as first VIP users, and at least N second users are configured as second VIP users, to ensure that at least M first VIP users and N VIP second users may be used normally, thereby ensuring that requirements of the first-level monitoring side on the basic number of first VIP users and requirements of the second-level monitoring side on the basic number of second VIP users may be met.

It should be noted that in addition to the M first VIP users and the N second VIP users which need to be maintained, both the number of remaining first VIP users and the number of remaining second VIP users may be configured according to actual requirements, or may be configured according to limitation of network bandwidth, which are not specifically limited in the embodiments of the disclosure.

As an improvement of the above solution, after the number of first VIP users reaches M and the number of second VIP users reaches N, an increased number of first VIP users is not less than an increased number of the second VIP users.

Specifically, with reference to the above embodiments, in a process of the first video fusion processing module adjusting the number of first VIP users at the first-level monitoring side and the number of second VIP users at the second-level monitoring side according to the third remaining network bandwidth, after the number of first VIP users reaches M and the number of second VIP users reaches N, that is, after requirements of the basic number of VIP users are met, the number of first VIP users additionally increased at the first-level monitoring side is equal to or greater than the number of the second VIP users additionally increased at the second-level monitoring side. In this case, it may ensure that in addition to meeting requirements of the basic number of VIP users, the additionally increased VIP users are preferentially allocated to be used by the first-level monitoring side.

Exemplarily, it is assumed that a ratio of the number of first VIP users, second VIP users and third VIP users initially configured at the first-level monitoring side, the second-level monitoring side and the third-level monitoring side is 2:2:1, for example, there are 2 first VIP users, 2 second VIP users and 1 third VIP user respectively. The number of third VIP users at the third-level monitoring side may be kept in the initial configuration, without increasing additionally. When the network bandwidth resources are sufficient, in addition to meeting requirements of the basic number where the first-level monitoring side has 2 first VIP users and the second-level monitoring side has 2 second VIP users, it needs to preferentially ensure that the additionally increased VIP users are allocated to be used by the first-level monitoring side and the second-level monitoring side. Further, the additionally increased VIP users may be evenly allocated to the first-level monitoring side and the second-level monitoring side according to a ratio of 1:1. In actual allocation, 1 first VIP user may be allocated to the first-level monitoring side, and then 1 second VIP user may be allocated to the second-level monitoring side. VIP users increase alternately between the first-level monitoring side and the second-level monitoring side, and each time VIP users increase by 1. Then, after adjustment is completed, the number of first VIP users additionally increased at the first-level monitoring side should be equal to or greater than the number of second VIP users additionally increased at the second-level monitoring side.

Figure 2:
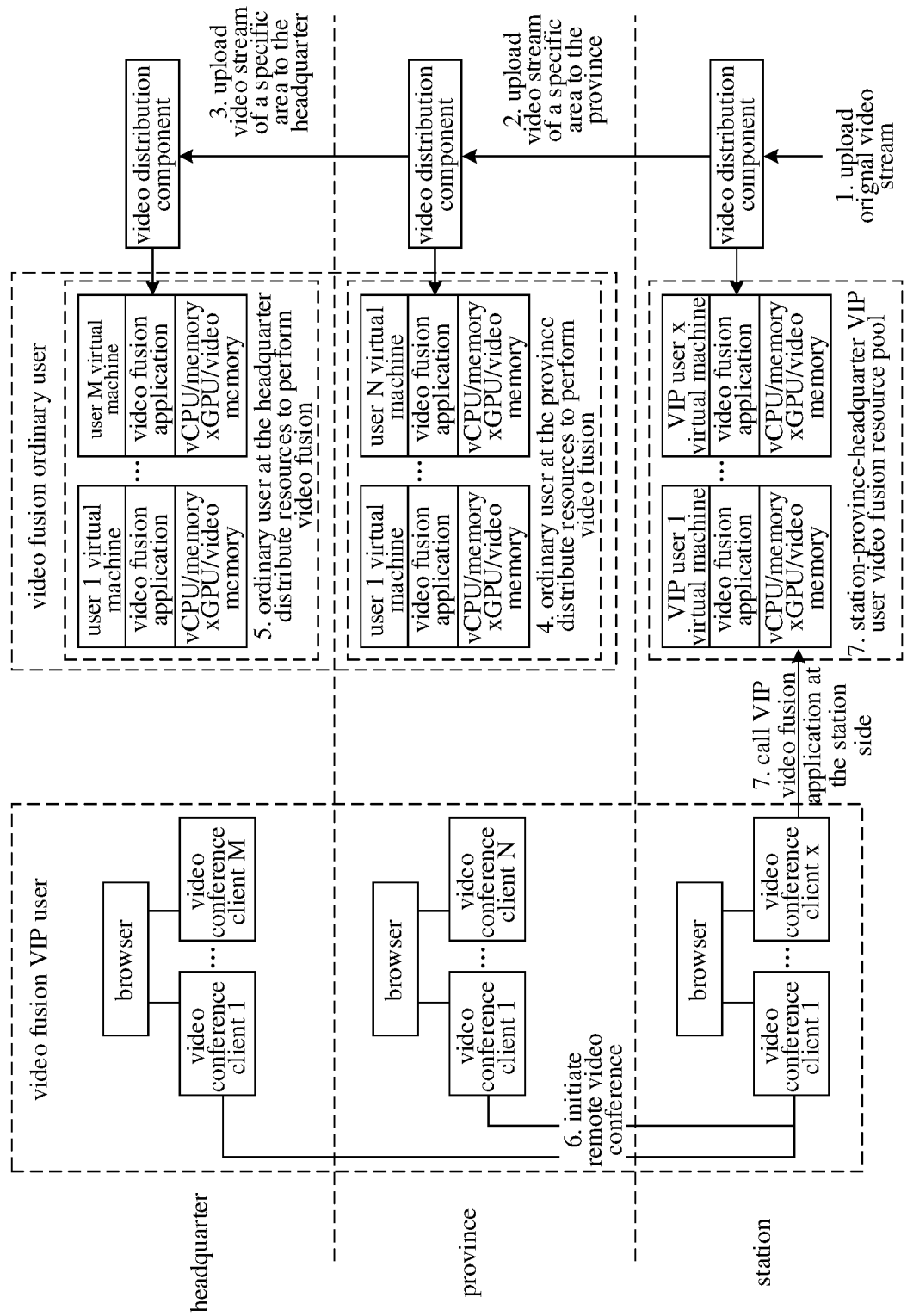
FIG. 2 is a schematic diagram of an application scenario of a monitoring system based on a digital converter station provided in an embodiment of the disclosure.

With reference to FIG. 2, it is a schematic diagram of an application scenario of a monitoring system based on a digital converter station provided in an embodiment of the disclosure. With reference to all the above embodiments, the monitoring system is applied to a "headquarter-province-station" three-level architecture. Based on distributed computing resources deployed at three levels, and according to the user authorization of the user at each level, video fusion resources of all VIP users at the headquarter, provincial side and station are deployed at the station side, and video fusion resources of all ordinary users at the headquarter and provincial side are deployed locally at the headquarter and the provincial side respectively.

User characteristics: VIP users need to see video fusion images of any monitored area in the station in real time, and each VIP user may control visual angles of video fusion images or switch videos captured by any camera in the station by himself/herself, to perform video fusion processing again. It is necessary to allocate graphics resources in the station to each online VIP user at the headquarter, provincial side and station, to perform video fusion processing; ordinary users need to see video fusion images of a specific area in the station, and each ordinary user may control visual angles of video fusion images by himself/herself. It is necessary to allocate graphics resources locally at the headquarter and provincial side to online ordinary users at the headquarter and provincial side correspondingly, to perform video fusion processing. As shown in FIG. 2, a video fusion resource pool for VIP users at the station side, provincial side and headquarter are arranged at the station side, to allocate resources to all VIP users at the station side, provincial side and headquarter, to perform video fusion processing; furthermore, resources are allocated to provincial ordinary users at the provincial side locally, to perform video fusion processing, and resources are allocated to headquarter ordinary users at the headquarter locally, to perform video fusion processing.

It should be noted that in FIG. 2, the video fusion application of the headquarter is an application implementation of the first video fusion processing module in the above embodiments, the video fusion application at the provincial side is an application implementation of the second video fusion processing module in the above embodiments, and the video fusion application of the station is an application implementation of the third video fusion processing module in the above embodiments. Based on the application scenario shown in FIG. 2, a specific implementation process of the video fusion processing is as follows.

1. After an original video stream in the station is accessed, a video distribution component of the station distributes and processes it in a unified manner.
2. A video stream of a specific area designated by a higher-level (such as valve cooling, converter transformer, etc.) is uploaded by the video distribution component to the provincial side.
3. The provincial side uses the video distribution component to upload the video stream of the specific area to the headquarter, and forward it to video fusion resources of the province locally, for maintenance.
4. After the ordinary user at the provincial side is activated, when the monitoring retrieval request of the ordinary user at the provincial side is received, resources are allocated to the ordinary user at the provincial side, to perform video fusion processing. Specifically, VM resources (including vCPU, memory, vGPU, video memory, etc.) are allocated, the video fusion application (i.e., the second video fusion processing module in the above embodiments) is pulled up, and the video fusion application performs video fusion processing on the received video stream of the specific area, and correspondingly obtains and displays video fusion images; furthermore, operation instructions such as visual angle control of the ordinary user at the provincial side or the like are also received, the video fusion application responds to operation instructions of the ordinary user at the provincial side, and performs corresponding operation and control on the currently displayed video fusion images.
5. After the ordinary user at the headquarter is activated, when the monitoring retrieval request of the ordinary user at the headquarter is received, resources are allocated to the ordinary user at the headquarter, to perform video fusion processing. Specifically, VM resources (including vCPU, memory, vGPU, video memory, etc.) are allocated, the video fusion application (i.e., the first video fusion processing module in the above embodiments) is pulled up, and the video fusion application performs video fusion processing on the received video stream of the specific area, and correspondingly obtains and displays video fusion images; furthermore, operation instructions such as visual angle control of the ordinary user at the headquarter or the like are also received, the video fusion application responds to operation instructions of the ordinary user at the headquarter, and performs corresponding operation and control on the currently displayed video fusion images.

6. After VIP users at the provincial side and the headquarter are activated, when monitoring retrieval requests of the VIP user at the headquarter and the VIP user at the provincial side are received, a remote video conference is pulled up through the browser and video conference client, a video conference session is established with the station side, both the headquarter and the provincial side may be access the station side remotely through the video conference client.

7. Video conference systems from the provincial side to the station side and from the headquarter to the station side call VIP video fusion application at the station side (i.e., the third video fusion processing module in the above embodiments), the video fusion application at the station side completes video fusion processing for VIP users at the headquarter and the provincial side, and the headquarter and the provincial side may retrieve video fusion images fused for the VIP users at the station side; furthermore, the headquarter and the provincial side may also issue control instructions to the VIP video fusion application at the station side, to control visual angles or switch videos captured by any camera in the station, to perform video fusion processing again.

For the VIP users at the headquarter and the provincial side: the VIP users at the headquarter and the provincial side are configured with video conference client resources, and arbitrarily retrieve videos in the station through the remote video conference, the station prepares video fusion resources for the VIP users at the headquarter and the provincial side in advance, and the VIP users may switch to video streams of ordinary users. For ordinary users at the headquarter and the provincial side: the ordinary users at the headquarter and the provincial side share video stream of a specific area, and may switch as required, wide-area network bandwidth consumed when ordinary users increase is unchanged, multi-level retrieval and distribution are used, the same-channel video stream is uploaded for multiple ordinary users to access, and multi-channel video streams implement video fusion locally at the headquarter and the provincial side.

It should be noted that the video fusion application may divide user authorizations into different levels according to different functions and operation requirements, including ordinary users and VIP users, the ordinary users may only be deployed at provincial side and the headquarter, and the VIP users are distributed at three levels, i.e., station, province, headquarter; video fusion of all the VIP users are performed at the station side, the VIP user may retrieve videos after fusion at the station side, and may view any desired area arbitrarily; furthermore, after the station side uploads multi-channel video streams of a specific area to the provincial side and the headquarter, the provincial side and the headquarter fuse the video streams with measurement points or other data to obtain video fusion images for the ordinary users at the provincial side and the headquarter to retrieve, and the ordinary users may use virtualized video fusion computing power to have a unique visual angle on video fusion images of the same specific area and operate the video fusion images. Video fusion of the ordinary user at the provincial side may only be performed at the provincial side, and fused video fusion images may be directly retrieved from the provincial side; video fusion of the ordinary user at the headquarter may be directly performed at the headquarter, and fused video fusion images may be directly retrieved from the headquarter.

Figure 3:
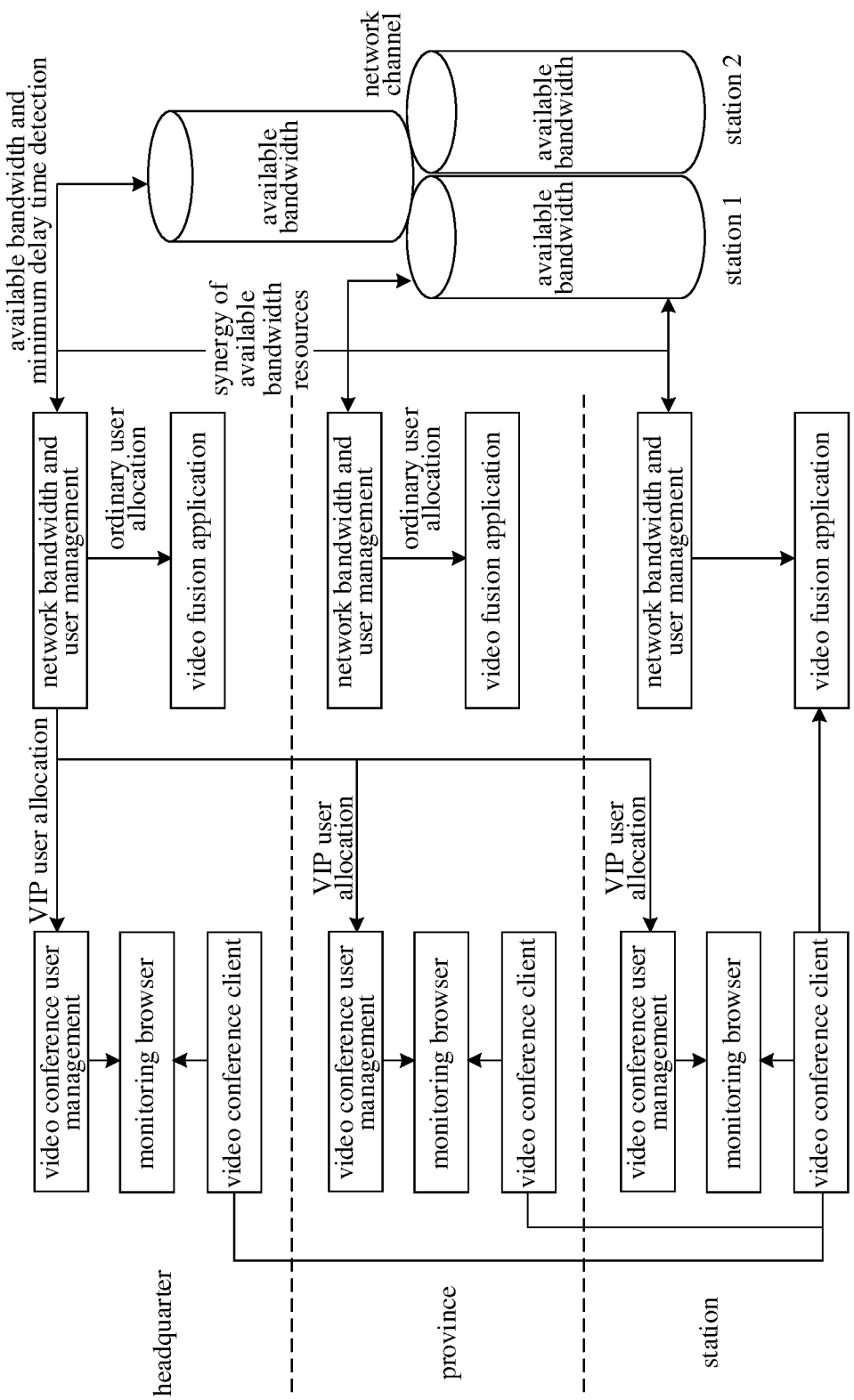
FIG. 3 is a schematic diagram of another application scenario of a monitoring system based on a digital converter station provided in an embodiment of the disclosure.

With reference to FIG. 3, it is a schematic diagram of another application scenario of a monitoring system based on a digital converter station provided in an embodiment of the disclosure. With reference to all the above embodiments, the monitoring system is applied to a "headquarter-province-station" three-level architecture. Network bandwidth detection is performed on network pipes between the headquarter and the province and between the province and the station, so that the available network bandwidth and minimum delay time may be detected in real time, an available bandwidth diagram of headquarter-province-station may be generated (As shown at the right side of FIG. 3, three cylinders represent the available bandwidth between the headquarter and the provincial side, the available bandwidth between the provincial side and the station 1, and the available bandwidth between the provincial side and the station 2 respectively), and the detected available network bandwidth may be used for allocation of user authorizations.

Theoretical basis of the network bandwidth detection is: the wide-area network is shared by multiple services and users, the remaining available bandwidth and link delay vary continuously and are difficult to be perceived at the data sending end; however, available network resources consist of the remaining available bandwidth and buffer, delay may be perceived by in-transit packets, and the time point when the packet sending rate exceeds an available bottleneck bandwidth and enters the buffer may be perceived through variation of the delay. The bottleneck bandwidth may be inferred based on the packet sending rate at this time point, and the time point when the buffer is full and overflows may be perceived through packet loss, so that size of the buffer may be calculated.

It should be noted that in FIG. 3, functions achievable by the network bandwidth and user management application are integrated implementations of the network bandwidth detection function achievable by the network detection module and the user authorization management function achievable by the video fusion processing module in the above embodiments. The network bandwidth detection is scheduled in unit of user bandwidth requirements, and has the following characteristics. 1. Based on the available network bandwidth and the network bandwidth and user management application, VIP users and ordinary users may be intelligently allocated and switched there-between. 2. When network bandwidth resources are sufficient, all users may be configured as VIP users with VIP user authorization. 3. When network bandwidth resources are insufficient, user authorizations of part of unimportant video services may be switched to ordinary user authorizations as required. Best balance may be achieved between user experience and utilization of network resources, through this scheduling solution.

Based on the application scenario shown in FIG. 3, achievable functions are as follows specifically.

1. Real-time detection: the network bandwidth and user management application deployed at each level detects the available network bandwidth, minimum delay or the like between the headquarter and the provincial side and between the provincial side and the station in real time by performing network bandwidth detection, to determine a maximum packet sending rate, track the network status in real time, and adjust and refresh the network status in time.

2. Generate a network-wide status view: the network bandwidth and user management applications at three levels of station-provincial side-headquarter perform collaboration of available bandwidth resources, aggregate exit of the wide-area network in the station, the available bandwidth/minimum delay between the provincial side and the station, and the available bandwidth/minimum delay data between the provincial side and the headquarter, and report them to the headquarter. The headquarter generates a network-wide status view to visualize a view of the real-time network bandwidth and flow rate, to uniformly adjust and allocate VIP users and ordinary users based on this network-wide status view.

3. Generate a user authorizations adjustment plan and manage users: based on utilization of network resources of VIP users and ordinary users, a dynamic adjustment plan of an allocation ratio of ordinary users and VIP users at each level is made, and adjustment and allocation are controlled centrally at the headquarter:
   (1) Initial allocation: when ordinary users and VIP users are configured for the first time, they may be preset based on experience. In subsequent adjustment, information such as overhaul plan, weekly production report, fault alarm information or the like may be referred as trigger conditions, self-learning setting is performed in combination with historical usage data (allocation), and a recent usage scenario is predicted, to adjust proportion of the users in a targeted manner.
   (2) Dynamic adjustment: after generating a corresponding adjustment suggestion of user authorization based on the detection result of network bandwidth detection, the network bandwidth and user management application calls the video conference user management application at each level to allocate VIP users, starts the user client as required at each level according to the number of allocated VIP users, and allocates VM resources to access video fusion images after fusion at the station side; after allocating ordinary users, the network bandwidth and user management application calls the video fusion application, allocates VM and graphics resources according to the number of ordinary users, pulls up corresponding ordinary user clients, performs video fusion processing on the video stream of the specific area forwarded by the video distribution component, and presents video fusion images in real time after the user logs in.
   (3) User switching: according to the network bandwidth and instructions of the user management application, user authorizations applicable to the video fusion application may be enabled and closed as required, and video conferences of ordinary users and VIPs may be switched as required.

It should be noted that in the application scenario shown in FIG. 3, specific implementation process of the network bandwidth detection and specific implementation solution of the user authorization management are described in the above embodiments, and are not elaborated here.

Effective matching of user authorizations and network resources may be achieved through user authorization management, which not only fully ensures SLA of the service, but also ensures full utilization of network resources. User characteristics are that: VIP users remotely call video fusion images after fusion processing at station side from the provincial side and the headquarter; ordinary users share the uploaded video stream of the specific area, and ordinary users call graphics resources locally to perform video fusion processing separately. Characteristics of network resource requirements are that: for VIP users at the provincial side and the headquarter, each VIP user needs to occupy a part of bandwidth exclusively; ordinary users at the provincial side and the headquarter share the uploaded video stream of the specific area, and all ordinary users only occupy a part of bandwidth. Characteristics of the application component are that: the network bandwidth and user management application may detect variation of the available bandwidth in real time, generate a diagram of available network bandwidth resources between the station side and the provincial side and between the provincial side and the headquarter, and adjust the number of VIP users and the number of ordinary users based on this diagram, to ensure that a total bandwidth occupation between the station side and the provincial side and between the provincial side and the headquarter does not exceed the currently available network bandwidth.

Exemplarily, the video fusion processing solution implemented by the monitoring system is taken as an example; in an actual application, technical indicators of video fusion require: 1) in the same monitoring field of view, a single monitoring terminal supports real-time fusion, splicing and presentation of no less than 8-channel 1080P high-definition videos; 2) supports a synchronous playback function of no less than 8-channel 1080P spliced videos; 3) an average 3D rendering frame rate is not less than 25 frames per second.

However, it may be known with reference to the above analysis that in the traditional video fusion processing solution, the station side pulls stream from the video component, performs video fusion operations on VM at the station side, and performs frame integration by way of desktop plug stream. A plug stream bandwidth consumed when each channel video stream is fused is about 20~25M. When the original video stream is uploaded to the headquarter, it will also consume the communication bandwidth between the station side and the headquarter. When services are busy, a problem of insufficient bandwidth and lagging video fusion images and operations may occur. Frame rate of the image is usually reduced to 5~10 frames per second.

However, with the video fusion processing solution provided in the embodiments of the disclosure, the video fusion processing module is deployed in the monitoring terminal at each level respectively, and pulls stream from the video component at the station-side, so that video fusion services of ordinary users may be completed locally by using local computing resources, distributed deployment of computing power resources is implemented, and multi-user concurrency is implemented based on video distribution capability of the video component. Network bandwidth occupied by a single-channel video stream is about 4M. According to requirements of technical indicators, when an extreme case where 8-channel video streams are fused is considered, a total bandwidth occupied by uploading the video streams is about 32M. In the embodiments of the disclosure, focuses of all ordinary users is in the same designated monitored area, which may be uploaded through fixed 8-channel video streams, to achieve concurrent capacity of infinite user instances, video occupation shared equally per instance is 32M/N (a total number of concurrent). For video fusion services of VIP users, the upload bandwidth may be reduced to 7~10M with the embodiments of the disclosure, and operation experience and image frame rate at the remote end are the same as those at the station side, and are maintained at more than 25 frames per second. When hardware configuration of the server at the remote end is high, the frame rate of refreshing images will be increased to more than 30 frames per second.

Further, with the video fusion processing solution provided in the embodiments of the disclosure, the hierarchical deployment solution greatly reduces bandwidth requirements for long-distance network transmission and communication, and users hardly feel the delay. It will implement better smoothness and definition and better user experience for a 3D digital twin application requiring high-frequency interaction and operation. It will implement that a real-time rendering frame rate is ≥30 frames/second, completion time of loading the scene for the first time is ≤4 seconds, response time of switching scenes is ≤2 seconds, and response time of loading the interactive interface is ≤2 seconds.

An embodiment of the disclosure further provides a monitoring method based on a digital converter station, the method is applicable to the monitoring system based on a digital converter station of any one of the above embodiments, the monitoring system includes a first monitoring terminal deployed at a first-level monitoring side, a second monitoring terminal deployed at a second-level monitoring side, and a third monitoring terminal deployed at a third-level monitoring side; monitored objects of the monitoring system include the digital converter station deployed at the third-level monitoring side; each of the first monitoring terminal, the second monitoring terminal and the third monitoring terminal includes at least a communication module, a human-machine interaction module, a device status monitoring module, a device alarm management module, a video fusion processing module, and a data transmission adjustment and control module; the third monitoring terminal further includes a data storage module configured to store data of the digital converter station. The method includes the following operations.

The communication module implements communication among the first monitoring terminal, the second monitoring terminal and the third monitoring terminal; the device status monitoring module monitors and manages ledger information, operation information and monitoring data of all devices of the digital converter station; the device alarm management module manages alarm information of all devices of the digital converter station; the human-machine interaction module receives a monitoring retrieval request of a user at a local monitoring side.

In response to the monitoring retrieval request of the user at the local monitoring side, each video fusion processing module performs video fusion processing by using video fusion raw data in the data of the digital converter station, to obtain video fusion images to be retrieved by the user at the local monitoring side.

In a process of transmitting service data from a local monitoring terminal to another monitoring terminal, when a preset rate adjustment condition of the service data is triggered, each data transmission adjustment and control module adjusts a current data transmission rate of the service data according to an available network bandwidth and minimum delay time detected before the rate adjustment condition is triggered, a delay time detected when the rate adjustment condition is triggered, and a delay recovery time configured based on a data type of the service data, to continue to transmit the service data to another monitoring terminal in the adjusted data transmission rate.

Preferably, the operation of in the process of transmitting the service data from the local monitoring terminal to another monitoring terminal, when the preset rate adjustment condition of the service data is triggered, adjusting, by the data transmission adjustment and control module, the current data transmission rate of the service data according to the available network bandwidth and minimum delay time detected before the rate adjustment condition is triggered, the delay time detected when the rate adjustment condition is triggered, and the delay recovery time configured based on the data type of the service data, to continue to transmit the service data to another monitoring terminal in the adjusted data transmission rate, specifically includes the following operations.

In the process of transmitting the service data from the local monitoring terminal to another monitoring terminal, when the preset rate adjustment condition of the service data is triggered, the data transmission adjustment and control module acquires an available network bandwidth S0 and minimum delay time RTT0 detected before the rate adjustment condition is triggered, a delay time RTT2 detected when the rate adjustment condition is triggered, and a delay recovery time t configured based on the data type of the service data.

The data transmission adjustment and control module calculates and obtains a current available network bandwidth estimation value S2 according to a formula S2=RTT0/RTT2*S0.

The data transmission adjustment and control module calculates and obtains a service data volume n entering a buffer according to a formula n=(RTT2−RTT0)*S0.

The data transmission adjustment and control module calculates and obtains a rate adjustment target value S2' of the service data according to a formula S2'=S2−n/t.

The data transmission adjustment and control module adjusts the current data transmission rate of the service data according to the rate adjustment target value S2' to obtain an adjusted data transmission rate S0' which meets S0'≤S2', to continue to transmit the service data to another monitoring terminal in the adjusted data transmission rate S0'.

Preferably, the delay recovery time is obtained by the data transmission adjustment and control module querying a preset delay recovery time table according to the data type of the service data, the delay recovery time table includes at least one data type and a delay recovery time configured corresponding to each data type, and the higher the priority of service data corresponding to each data type, the shorter the delay recovery time configured corresponding thereto.

Preferably, the third monitoring terminal further includes a fault recording management module, a data report management module, a digital station area management module, and a remote intelligent patrol module.

The fault recording management module is configured to manage a fault recording file of the digital converter station, and perform online parsing according to the fault recording file.

The data report management module is configured to perform statistics on the service data of the digital converter station, present historical data, statistical data and analysis data in different report forms according to operation and maintenance requirements of the digital converter station, and implement a report task formulation function, an automatic report generation function, a report exporting function and a report printing function.

The digital station area management module is configured to monitor and manage security, fire protection and power environment of the digital converter station with a station area of the digital converter station as a main body.

The remote intelligent patrol module is configured to control a monitoring device to perform joint patrol operations of indoor and outdoor devices, and analyze patrol data to form a patrol result and patrol report.

Preferably, the digital converter station is provided with a unified common component, the common component includes a service component and a data component, and the service component and the data component are configured to provide a service function interface and basic data service based on a unified specification to each application system of the digital converter station, and formulate a unified data interaction protocol and data interaction format, to provide a unified data service interface to the third monitoring terminal.

Preferably, the digital converter station is provided with a unified basic application, and the basic application is built by using a unified basic software and hardware facility, a unified data model, a unified data service specification and a unified application development specification.

Preferably, the basic application includes a station-wide video management and control application, a station-wide 3D presentation application, a device status overview application, a device alarm overview application, a fault recording management application, an intelligent report management application, a digital station area management application, and a remote intelligent patrol application. The station-wide video management and control application and the station-wide 3D presentation application are configured to provide services to the video fusion processing module, the device status overview application is configured to provide services to the device status monitoring module, the device alarm overview application is configured to provide services to the device alarm management module, the fault recording management application is configured to provide services to the fault recording management module, the intelligent report management application is configured to provide services to the data report management module, the digital station area management application is configured to provide services to the digital station area management module, and the remote intelligent patrol application is configured to provide services to the remote intelligent patrol module.

Preferably, a user at the first-level monitoring side is used as a first user, and the video fusion processing module of the first monitoring terminal is used as a first video fusion processing module. The method further includes the following operations.

The first video fusion processing module performs user authorization management on the first user, to configure the first user as a first ordinary user or a first VIP user, the first ordinary user is configured to have authorization to view video fusion images of a designated monitored area of the digital converter station, and the first VIP user is configured to have authorization to view video fusion images of all monitored areas of the digital converter station.

Then, the operation of in response to the monitoring retrieval request of the user at the local monitoring side, performing, by the first video fusion processing module, video fusion processing by using video fusion raw data in the data of the digital converter station, to obtain video fusion images configured to be retrieved by the user at the local monitoring side, specifically includes the following operations.

When the first user is the first ordinary user, in response to a monitoring retrieval request of the first ordinary user, the first video fusion processing module acquires video fusion raw data of a to-be-viewed area from video fusion raw data of the designated monitored area in the data of the digital converter station, and the first video fusion processing module performs video fusion processing on the video fusion raw data of the to-be-viewed area by using computing resources of the first monitoring terminal, to obtain video fusion images configured to be retrieved by the first ordinary user.

Preferably, the video fusion processing module of the third monitoring terminal is used as a third video fusion processing module.

Then, the operation of in response to the monitoring retrieval request of the user at the local monitoring side, performing, by the first video fusion processing module, video fusion processing by using video fusion raw data in the data of the digital converter station, to obtain video fusion images to be retrieved by the user at the local monitoring side, further includes the following operations.

When the first user is the first VIP user, in response to a monitoring retrieval request of the first VIP user, the first video fusion processing module sends a first video fusion request to the third video fusion processing module, the first video fusion request includes ID of the to-be-viewed area.

The third video fusion processing module acquires video fusion raw data of the to-be-viewed area from video fusion raw data of all monitored areas in the data of the digital converter station according to the ID of the to-be-viewed area in the first video fusion request, and the third video fusion processing module performs video fusion processing on the video fusion raw data of the to-be-viewed area by using computing resources of the third monitoring terminal, to obtain video fusion images to be retrieved by the first VIP user and send the video fusion images to the first video fusion processing module.

The first video fusion processing module receives and obtains the video fusion images to be retrieved by the first VIP user.

Preferably, a user at the second-level monitoring side is used as a second user, and the video fusion processing module of the second monitoring terminal is used as a second video fusion processing module. The method further includes the following operations.

The second video fusion processing module performs user authorization management on the second user, to configure the second user as a second ordinary user or a second VIP user, the second ordinary user is configured to have authorization to view video fusion images of a designated monitored area of the digital converter station, and the second VIP user is configured to have authorization to view video fusion images of all monitored areas of the digital converter station.

Then, the operation of in response to the monitoring retrieval request of the user at the local monitoring side, performing, by the second video fusion processing module, video fusion processing by using video fusion raw data in the data of the digital converter station, to obtain video fusion images to be retrieved by the user at the local monitoring side, specifically includes the following operations.

When the second user is the second ordinary user, in response to a monitoring retrieval request of the second ordinary user, the second video fusion processing module acquires video fusion raw data of a to-be-viewed area from video fusion raw data of the designated monitored area in the data of the digital converter station, and performs video fusion processing on the video fusion raw data of the to-be-viewed area by using computing resources of the second monitoring terminal, to obtain video fusion images to be retrieved by the second ordinary user.

Preferably, the video fusion processing module of the third monitoring terminal is used as a third video fusion processing module.

Then, the operation of in response to the monitoring retrieval request of the user at the local monitoring side, performing, by the second video fusion processing module, video fusion processing by using video fusion raw data in the data of the digital converter station, to obtain video fusion images to be retrieved by the user at the local monitoring side, further includes the following operations.

When the second user is the second VIP user, in response to a monitoring retrieval request of the second VIP user, the second video fusion processing module sends a second video fusion request to the third video fusion processing module, the second video fusion request includes ID of the to-be-viewed area.

The third video fusion processing module acquires video fusion raw data of the to-be-viewed area from video fusion raw data of all monitored areas in the data of the digital converter station according to the ID of the to-be-viewed area in the second video fusion request, and performs video fusion processing on the video fusion raw data of the to-be-viewed area by using computing resources of the third monitoring terminal, to obtain video fusion images to be retrieved by the second VIP user and send the video fusion images to the second video fusion processing module.

The second video fusion processing module receives and obtains the video fusion images to be retrieved by the second VIP user.

Preferably, a user at the third-level monitoring side is used as a third user, and the video fusion processing module of the third monitoring terminal is used as a third video fusion processing module. The method further includes the following operations.

The third video fusion processing module performs user authorization management on the third user, to configure the third user as a third VIP user, the third VIP user is configured to have authorization to view video fusion images of all monitored areas of the digital converter station.

Then, the operation of in response to the monitoring retrieval request of the user at the local monitoring side, performing, by the third video fusion processing module, video fusion processing by using video fusion raw data in the data of the digital converter station, to obtain video fusion images to be retrieved by the user at the local monitoring side, specifically includes the following operations.

When the third user is the third VIP user, in response to a monitoring retrieval request of the third VIP user, the third video fusion processing module acquires video fusion raw data of a to-be-viewed area from video fusion raw data of all monitored areas in the data of the digital converter station, and performs video fusion processing on the video fusion raw data of the to-be-viewed area by using computing resources of the third monitoring terminal, to obtain video fusion images to be retrieved by the third VIP user.

Preferably, the second monitoring terminal is used as a data sending end, and the first monitoring terminal is used as a data receiving end; or, the third monitoring terminal is used as a data sending end, and the second monitoring terminal is used as a data receiving end; the data sending end further includes a network detection module. The method further includes the following operations.

The network detection module periodically performs network bandwidth detection to detect an available network bandwidth and minimum delay time between the data sending end and a corresponding data receiving end, and records only the available network bandwidth and minimum delay time detected for the last time when each detection is completed, so that when video fusion service data needs to be transmitted to the corresponding data receiving end, an initial data transmission rate of the video fusion service data is determined according to a currently recorded available network bandwidth.

Preferably, the operation of periodically performing, by the network detection module, network bandwidth detection to detect the available network bandwidth and minimum delay time between the data sending end and the corresponding data receiving end, specifically includes the following operations.

Each time when the network detection module performs network bandwidth detection, the network detection module sequentially sends detection packets to the corresponding data receiving end in an incremental packet sending rate, and records a RTT value and a packet sending rate corresponding to the detection packet sent each time.

When the network detection module determines that the RTT value increases for the first time, the network detection module marks a time point when the RTT value increases as T1, marks a last time point when the RTT value is unchanged before T1 as T0, determines the minimum delay time according to a RTT value corresponding to T0, and determines the available network bandwidth between the data sending end and the corresponding data receiving end according to a last packet sending rate before T1.

Preferably, the operation of each time when the network detection module performs network bandwidth detection, sequentially sending, by the network detection module, detection packets to the corresponding data receiving end in the incremental packet sending rate, specifically includes the following operations.

Each time when the network detection module performs network bandwidth detection, the network detection module acquires an available bandwidth upper limit according to a maximum export bandwidth of a local data sending end and a bandwidth occupancy experience value of the local data sending end.

The network detection module sets a rate adjustment threshold according to the available bandwidth upper limit, and in a process of sequentially sending detection packets to the corresponding data receiving end in the incremental packet sending rate, when the packet sending rate is less than the rate adjustment threshold, the network detection module sequentially sends detection packets to the corresponding data receiving end in the incremental packet sending rate based on a first increase amplitude, and when the packet sending rate is not less than the rate adjustment threshold, the network detection module sequentially sends detection packets to the corresponding data receiving end in the incremental packet sending rate based on a second increase amplitude, the first increase amplitude is greater than the second increase amplitude.

Preferably, the method further includes the following operations. The data transmission adjustment and control module sequentially enters a first transmission stage, a second transmission stage and a third transmission stage of a data transmission process when the local monitoring terminal needs to transmit the video fusion service data to another monitoring terminal, until when data transmission is completed, the data transmission process ends.

In the first transmission stage, an available network bandwidth and minimum delay time currently recorded by a local network detection module are acquired, and the initial data transmission rate of the video fusion service data is determined according to the acquired available network bandwidth, to start to transmit the video fusion service data to another monitoring terminal according to the initial data transmission rate, until when it is determined that the preset rate adjustment condition is triggered, the second transmission stage is entered, the rate adjustment condition is that it is determined that a RTT value increases to a preset delay time threshold for the first time, or that a packet loss report is received for the first time.

In the second transmission stage, a current data transmission rate of the video fusion service data is adjusted according to the acquired available network bandwidth and minimum delay time, a delay time detected when the rate adjustment condition is triggered, and a target delay recovery time configured based on a data type of the video fusion service data and a user type of the user of the monitoring retrieval request, to continue to transmit the video fusion service data to another monitoring terminal in the adjusted data transmission rate, until when it is determined that the delay time detected when the rate adjustment condition is triggered is restored to the acquired minimum delay time, the third transmission stage is entered.

In the third transmission stage, the local network detection module is triggered to perform network bandwidth detection while continuing to transmit the video fusion service data to another monitoring terminal in the adjusted data transmission rate, to detect and record an available network bandwidth and minimum delay time between the local monitoring terminal and another monitoring terminal, acquire the available network bandwidth and minimum delay time currently recorded by the local network detection module, and determine the data transmission rate of the video fusion service data according to the acquired available network bandwidth, to continue to transmit the video fusion service data to another monitoring terminal according to the determined data transmission rate, until when it is determined that the rate adjustment condition is triggered, the second transmission stage is returned to.

Preferably, the target delay recovery time is obtained by the data transmission adjustment and control module querying a preset delay recovery time table according to the data type of the video fusion service data and the user type of the user of the monitoring retrieval request, the delay recovery time table includes at least one data type, a user type corresponding to each data type, and a delay recovery time configured corresponding to each user type, the data type includes the video fusion service data, the user type includes an ordinary user and a VIP user; the higher the priority of service data corresponding to each data type, the shorter the delay recovery time configured corresponding thereto, and in the user type corresponding to the same data type, the delay recovery time configured corresponding to the ordinary user is greater than the delay recovery time configured corresponding to the VIP user.

Preferably, the delay time threshold is set according to the currently recorded minimum delay time.

Preferably, a user at the first-level monitoring side is used as a first user, a user at the second-level monitoring side is used as a second user, a user at the third-level monitoring side is used as a third user, the video fusion processing module of the first monitoring terminal is used as a first video fusion processing module, the video fusion processing module of the second monitoring terminal is used as a second video fusion processing module, the video fusion processing module of the third monitoring terminal is used as a third video fusion processing module; the second monitoring terminal further includes a second network detection module, and the third monitoring terminal further includes a third network detection module. The method further includes the following operations.

The first video fusion processing module performs user authorization management on the first user, to configure the first user as a first ordinary user or a first VIP user.

The second video fusion processing module performs user authorization management on the second user, to configure the second user as a second ordinary user or a second VIP user.

The third video fusion processing module performs user authorization management on the third user, to configure the third user as a third VIP user.

The second network detection module periodically performs network bandwidth detection to detect an available network bandwidth between the second monitoring terminal and the first monitoring terminal, and the second network detection module sends a currently detected first available network bandwidth to the first video fusion processing module.

The third network detection module periodically performs network bandwidth detection to detect an available network bandwidth between the third monitoring terminal and the second monitoring terminal, and the third network detection module sends a currently detected second available network bandwidth to the first video fusion processing module.

The first video fusion processing module adjusts at least one of a number of first VIP users or a number of second VIP users according to the first available network bandwidth and the second available network bandwidth.

Each of the first ordinary user and the second ordinary user is configured to have authorization to view video fusion images of a designated monitored area of the digital converter station, and each of the first VIP user, the second VIP user and the third VIP user is configured to have authorization to view video fusion images of all monitored areas of the digital converter station.

Preferably, the operation of adjusting at least one of the number of first VIP users or the number of second VIP users according to the first available network bandwidth and the second available network bandwidth, specifically includes the following operations.

When only the number of first VIP users needs to be adjusted, and the number of second VIP users needs to maintain a basic number without change, a first remaining network bandwidth is acquired according to the first available network bandwidth, the second available network bandwidth, a network bandwidth occupied by the first ordinary user, and a network bandwidth occupied by a basic number of second VIP users, and the number of first VIP users is adjusted according to the first remaining network bandwidth.

When only the number of second VIP users needs to be adjusted, and the number of first VIP users needs to maintain a basic number without change, a second remaining network bandwidth is acquired according to the first available network bandwidth, the second available network bandwidth, the network bandwidth occupied by the first ordinary user, and a network bandwidth occupied by a basic number of first VIP users, and the number of second VIP users is adjusted according to the second remaining network bandwidth.

When the number of first VIP users and the number of second VIP users need to be adjusted simultaneously, a third remaining network bandwidth is acquired according to the first available network bandwidth, the second available network bandwidth, and the network bandwidth occupied by the first ordinary user, and the number of first VIP users and the number of second VIP users are adjusted according to the third remaining network bandwidth.

Preferably, the operation of adjusting the number of first VIP users according to the first remaining network bandwidth, specifically includes the following operations.

The first video fusion processing module determines whether the first remaining network bandwidth is greater than a preset first bandwidth threshold, and if yes, the first video fusion processing module configures at least M first users as first VIP users; if no, the first video fusion processing module releases the network bandwidth occupied by the first ordinary user, and configures at least M first users as first VIP users according to the first remaining network bandwidth and the network bandwidth occupied by the first ordinary user.

M represents a basic number of first VIP users required to be maintained, M≥1, and the first bandwidth threshold is set according to a network bandwidth occupied by the M first VIP users.

Preferably, the operation of adjusting the number of first VIP users according to the first remaining network bandwidth, specifically includes the following operations.

The first video fusion processing module determines whether the first remaining network bandwidth is greater than a network bandwidth occupied by one of the first VIP users, and if yes, the first video fusion processing module configures at least one of the first users as the first VIP user; if no, the first video fusion processing module configures all the first users as first ordinary users.

Preferably, the operation of adjusting the number of second VIP users according to the second remaining network bandwidth, specifically includes the following operations.

The first video fusion processing module determines whether the second remaining network bandwidth is greater than a preset second bandwidth threshold, and if yes, the first video fusion processing module sends a VIP user increase instruction to the second video fusion processing module; if no, the first video fusion processing module sends an ordinary user disabling instruction to the second video fusion processing module.

The second video fusion processing module configures at least N second users as second VIP users according to the VIP user increase instruction, or releases a network bandwidth occupied by the second ordinary user according to the ordinary user disabling instruction, and configures at least N second users as second VIP users according to the second remaining network bandwidth and the network bandwidth occupied by the second ordinary user.

N represents a basic number of second VIP users required to be maintained, N≥1, and the second bandwidth threshold is set according to a network bandwidth occupied by the N second VIP users.

Preferably, the operation of adjusting, by the first video fusion processing module, the number of second VIP users according to the second remaining network bandwidth, specifically includes the following operations.

The first video fusion processing module determines whether the second remaining network bandwidth is greater than a network bandwidth occupied by one of the second VIP users, and if yes, the first video fusion processing module sends a VIP user increase instruction to the second video fusion processing module; if no, the first video fusion processing module sends a VIP user decrease instruction to the second video fusion processing module.

The second video fusion processing module configures at least one second user as the second VIP user according to the VIP user increase instruction, or configures all second users as second ordinary users according to the VIP user decrease instruction.

Preferably, the operation of adjusting the number of first VIP users and the number of second VIP users according to the third remaining network bandwidth, specifically includes the following operations.

The first video fusion processing module determines whether the third remaining network bandwidth is greater than a preset third bandwidth threshold, and if yes, the first video fusion processing module configures at least M first users as first VIP users, and sends a VIP user increase instruction to the second video fusion processing module; if no, the first video fusion processing module releases the network bandwidth occupied by the first ordinary user, configures at least M first users as first VIP users according to the third remaining network bandwidth and the network bandwidth occupied by the first ordinary user, and sends an ordinary user disabling instruction to the second video fusion processing module.

The second video fusion processing module configures at least N second users as second VIP users according to the VIP user increase instruction, or releases a network bandwidth occupied by the second ordinary user according to the ordinary user disabling instruction, and configures at least N second users as second VIP users according to the third remaining network bandwidth and the network bandwidth occupied by the second ordinary user.

M represents a basic number of first VIP users required to be maintained, M≥1, N represents a basic number of second VIP users required to be maintained, N≥1, and the third bandwidth threshold is set according to a network bandwidth occupied by the M first VIP users and a network bandwidth occupied by the N second VIP users.

Preferably, after the number of first VIP users reaches M and the number of second VIP users reaches N, an increased number of the first VIP users is not less than an increased number of the second VIP users.

It should be noted that the monitoring method based on a digital converter station provided in the embodiments of the disclosure may implement all processing procedures in the monitoring system based on a digital converter station described in any one of the above embodiments. Specific monitoring processing solution and the technical effect achieved therefrom are the same as the monitoring processing solution and the technical effect achieved by the monitoring system based on a digital converter station described in the above embodiments respectively, and are not elaborated here.

In summary, the monitoring system and method based on a digital converter station provided in the embodiments of the disclosure have the following advantageous effects.

Each of the first communication module, the second communication module, and the third communication module may be implemented by at least one transceiver. Each of the first device status monitoring module, the second device status monitoring module and the third status monitoring module may be implemented by at least one processor. Each of the first device alarm management module, the second device alarm management module and the third device alarm management module may be implemented by at least one processor. Each of the first data transmission adjustment and control module, the second data transmission adjustment and control module and the third data transmission adjustment and control module may be implemented by at least one processor. Each of the first video fusion processing module, the second video fusion processing module and the third video fusion processing module may be implemented by at least one processor. Each of the fault recording management module, the data report management module, the digital station area management module, and the remote intelligent patrol module may be implemented by at least one processor. The network detection module may be implemented by at least one processor.

The above-mentioned processor may be a general purpose processor, a Digital Signal Processor (DSP), an Application Specific Integrated Circuit (ASIC), a Field Programmable Gate Array (FPGA) or other programmable logic devices, discrete gates or transistor logic devices, or discrete hardware components.

Each of the first human-machine interaction module, the second human-machine interaction module and the third human-machine interaction module may be implemented by any one or any combination of a display screen, a touch screen, a speech recognition device, a mouse device, a key board, facial recognition device, etc.

The data storage module may be implemented by a memory.

It is understood that the memory in embodiments of the present disclosure may be a volatile memory or a non-volatile memory, or may include both volatile and non-volatile memory. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM) which serves as an external cache. By way of illustration, but not limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It is to be noted that the memory of the system and method described herein is intended to include but not limited to these and any other suitable types of memory.

It is to be understood that the above-mentioned memory are illustration but not limitation. For example, the memory of embodiments of the present disclosure may also be static RAM (SRAM), dynamic RAM (DRAM), synchronous DRAM (SDRAM), double data rate SDRAM (DDR SDRAM), enhanced SDRAM (ESDRAM), synchlink DRAM (SLDRAM), and Direct Rambus RAM (DR RAM), etc. That is to say, the memory of embodiments of the present disclosure is intended to include but not limited to these and any other suitable types of memory.

(1) Functional modules such as the video fusion processing module, the device status monitoring module, the device alarm management module or the like are deployed at each of the first monitoring terminal, the second monitoring terminal and the third monitoring terminal respectively, so that each function of the monitoring system supports that the function is completed locally by the monitoring terminal at each level itself, and does not need to be completed by the station side completely, which greatly reduces occupation of resources of the station side.

(2) The video fusion processing module is deployed at each of the first monitoring terminal, the second monitoring terminal and the third monitoring terminal respectively, so that the first monitoring terminal, the second monitoring terminal and the third monitoring terminal may respond locally to the monitoring retrieval request of the user at the local monitoring side respectively, it is unnecessary for the station side to respond to the monitoring retrieval request of the user of the monitoring side at each level completely, the user may directly view video fusion images locally without retrieving the images from a remote end, which effectively relieves pressure of the station side responding to multi-user concurrent access, so that on the premise of limited network bandwidth and computing resources of the station side, network delay may be effectively reduced, real-time performance of displaying video images may be improved, and usage effect and user experience of the video fusion application may be improved. Therefore, there is consistent user experience at three different positions, i.e., the first-level monitoring side, the second-level monitoring side and the third-level monitoring side.

(3) The data transmission adjustment and control module is deployed at each of the first monitoring terminal, the second monitoring terminal and the third monitoring terminal respectively, so that during transmission of the service data among the first monitoring terminal, the second monitoring terminal and the third monitoring terminal, when the rate adjustment condition is triggered, the current data transmission rate of the service data may be adjusted according to the available network bandwidth and minimum delay time detected before the rate adjustment condition is triggered, the delay time detected when the rate adjustment condition is triggered, and the delay recovery time configured based on the data type of to-be-transmitted service data. Therefore, an appropriate data transmission rate may be configured for the service data before the service data is sent, which may effectively avoid the problem that network delay is difficult to be solved due to uncontrollability of the network delay during transmission after the service data is sent, and reduce difficulty of solving the network delay problem.

(4) When the rate adjustment condition is triggered, the data transmission adjustment and control module adjusts the current data transmission rate of the service data according to the available network bandwidth and minimum delay time detected before the rate adjustment condition is triggered, the delay time detected when the rate adjustment condition is triggered, and the delay recovery time configured based on the data type of to-be-transmitted service data. Therefore, an adjustment value of the data transmission rate may be accurately determined; furthermore, the available network bandwidth and minimum delay time detected before the rate adjustment condition is triggered, and the delay time detected when the rate adjustment condition is triggered, are parameter values complying with a real-time network status better, and the delay recovery time configured based on the data type of the service data is a parameter value complying with user requirements better. The adjustment value of the data transmission rate is determined in real time according to these parameters, so that the adjusted data transmission rate is more suitable for the current network status and user requirements, thereby improving accuracy of adjusting the data transmission rate, and improving adaptability of the rate adjustment solution.

(5) During transmission of different data types of service data, the rate adjustment solution provided in the embodiments of the disclosure may be used to adjust the data transmission rate of the service data in real time, and for each data type of service data, specific rate adjustment solution is only performed during transmission of the same data type of service data, rather than performing the same adjustment on data transmission rates of all data types of service data. Therefore, it does not affect data transmission processes of other data types of service data, and does not affect usage experience of other service functions, either.

(6) Service data may be correspondingly configured with different priorities (or importance levels) according to different data types. For example, the video fusion service data has a higher time requirement and is correspondingly configured with a higher priority, and other data types of service data have lower time requirements and are correspondingly configured with lower priorities. Different data types are configured with corresponding delay recovery times, so that the priority of the service data matches the delay recovery time, which may meet different delay recovery requirements of service data with different priorities; the available network bandwidth is configured to be used by service data with a higher priority, thereby achieving optimal configuration of network resources, and improving flexibility of the rate adjustment solution, too.

(7) The rate adjustment solution provided in the embodiments of the disclosure may achieve accurate adjustment of the data transmission rate without relying on intermediate devices, and the rate adjustment solution is simple, easy to be deployed and implemented, occupies few resources, and has high practicability.

The above descriptions are only preferred implementations of the disclosure. It should be pointed out that several improvements and variants may also be made by those of ordinary skill in the art without departing from the technical principle of the disclosure, and these improvements and variants should also be considered as the scope of protection of the disclosure.

The invention claimed is:

1. A monitoring system based on a digital converter station, comprising a first monitoring terminal deployed at a first-level monitoring side, a second monitoring terminal deployed at a second-level monitoring side, and a third monitoring terminal deployed at a third-level monitoring side,
wherein monitored objects of the monitoring system comprise the digital converter station deployed at the third-level monitoring side; each of the first monitoring terminal, the second monitoring terminal and the third monitoring terminal comprises at least a communication module, a human-machine interaction module, a device status monitoring module, a device alarm management module, a video fusion processing module, and a data transmission adjustment and control module; the third monitoring terminal further comprises a data storage module configured to store data of the digital converter station,
the communication module is configured to implement communication among the first monitoring terminal, the second monitoring terminal and the third monitoring terminal; the device status monitoring module is configured to monitor and manage ledger information, operation information and monitoring data of all devices of the digital converter station; the device alarm management module is configured to manage alarm information of all devices of the digital converter station; the human-machine interaction module is configured to receive a monitoring retrieval request of a user at a local monitoring side,
each video fusion processing module is configured to: in response to the monitoring retrieval request of the user at the local monitoring side, perform video fusion processing by using video fusion raw data in the data of the digital converter station, to obtain video fusion images to be retrieved by the user at the local monitoring side,
each data transmission adjustment and control module is configured to: in a process of transmitting service data from a local monitoring terminal to another monitoring terminal, when a preset rate adjustment condition of the service data is triggered, adjust a current data transmission rate of the service data according to an available network bandwidth and minimum delay time detected before the rate adjustment condition is triggered, a delay time detected when the rate adjustment condition is triggered, and a delay recovery time configured based on a data type of the service data, to continue to transmit the service data to another monitoring terminal in the adjusted data transmission rate.

2. The monitoring system based on a digital converter station of claim 1, wherein the data transmission adjustment and control module configured to: in the process of transmitting the service data from the local monitoring terminal to another monitoring terminal, when the preset rate adjustment condition of the service data is triggered, adjust the current data transmission rate of the service data according to the available network bandwidth and minimum delay time detected before the rate adjustment condition is triggered, the delay time detected when the rate adjustment condition is triggered, and the delay recovery time configured based on the data type of the service data, to continue to transmit the service data to another monitoring terminal in the adjusted data transmission rate, specifically comprises that:
in the process of transmitting the service data from the local monitoring terminal to another monitoring terminal, when the preset rate adjustment condition of the service data is triggered, the data transmission adjustment and control module is configured to acquire an available network bandwidth $S0$ and minimum delay time $RTT0$ detected before the rate adjustment condition is triggered, a delay time $RTT2$ detected when the rate adjustment condition is triggered, and a delay recovery time $t$ configured based on the data type of the service data,
the data transmission adjustment and control module is configured to calculate a current available network bandwidth estimation value $S2$ according to a formula $S2=RTT0/RTT2*S0$,
the data transmission adjustment and control module is configured to calculate a service data volume $n$ entering a buffer according to a formula $n=(RTT2-RTT0)*S0$,
the data transmission adjustment and control module is configured to calculate a rate adjustment target value $S2'$ of the service data according to a formula $S2'=S2-n/t$,
the data transmission adjustment and control module is configured to adjust the current data transmission rate of the service data according to the rate adjustment target value $S2'$ to obtain an adjusted data transmission rate $S0'$ which meets $S0' \leq S2'$, to continue to transmit the service data to another monitoring terminal in the adjusted data transmission rate S0'.

3. The monitoring system based on a digital converter station of claim 2, wherein the delay recovery time is obtained by the data transmission adjustment and control module querying a preset delay recovery time table according to the data type of the service data, wherein the delay recovery time table comprises at least one data type and a delay recovery time configured corresponding to each data type, and the higher the priority of service data corresponding to each data type, the shorter the delay recovery time configured corresponding to the data type.

4. The monitoring system based on a digital converter station of claim 1, wherein the third monitoring terminal further comprises a fault recording management module, a data report management module, a digital station area management module, and a remote intelligent patrol module,
the fault recording management module is configured to manage a fault recording file of the digital converter station, and perform online parsing according to the fault recording file,
the data report management module is configured to perform statistics on the service data of the digital converter station, present historical data, statistical data and analysis data in different report forms according to operation and maintenance requirements of the digital converter station, and implement a report task formulation function, an automatic report generation function, a report exporting function and a report printing function,
the digital station area management module is configured to monitor and manage security, fire protection and power environment of the digital converter station with a station area of the digital converter station as a main body,
the remote intelligent patrol module is configured to control a monitoring device to perform joint patrol operations of indoor and outdoor devices, and analyze patrol data to form a patrol result and patrol report.

5. The monitoring system based on a digital converter station of claim 1, wherein the digital converter station is provided with a unified common component, the common component comprises a service component and a data component, and the service component and the data component are configured to provide a service function interface and basic data service based on a unified specification to each application system of the digital converter station, and formulate a unified data interaction protocol and data interaction format, to provide a unified data service interface to the third monitoring terminal,
wherein the digital converter station is provided with a unified basic application, and the basic application is built by using a unified basic software and hardware facility, a unified data model, a unified data service specification and a unified application development specification.

6. The monitoring system based on a digital converter station of claim 5, wherein the basic application comprises a station-wide video management and control application, a station-wide three-dimensional (3D) presentation application, a device status overview application, a device alarm overview application, a fault recording management application, an intelligent report management application, a digital station area management application, and a remote intelligent patrol application,
wherein the station-wide video management and control application and the station-wide 3D presentation application are configured to provide services to the video fusion processing module, the device status overview application is configured to provide services to the device status monitoring module, the device alarm overview application is configured to provide services to the device alarm management module, the fault recording management application is configured to provide services to the fault recording management module, the intelligent report management application is configured to provide services to the data report management module, the digital station area management application is configured to provide services to the digital station area management module, and the remote intelligent patrol application is configured to provide services to the remote intelligent patrol module.

7. The monitoring system based on a digital converter station of claim 1, wherein a user at the first-level monitoring side is used as a first user, and the video fusion processing module of the first monitoring terminal is used as a first video fusion processing module,
the first video fusion processing module is further configured to perform user authorization management on the first user, to configure the first user as a first ordinary user or a first Very Important Person (VIP) user, wherein the first ordinary user is configured to have authorization to view video fusion images of a designated monitored area of the digital converter station, and the first VIP user is configured to have authorization to view video fusion images of all monitored areas of the digital converter station,
then, in response to the monitoring retrieval request of the user at the local monitoring side, the first video fusion processing module performing video fusion processing by using video fusion raw data in the data of the digital converter station, to obtain video fusion images to be retrieved by the user at the local monitoring side, specifically comprises that:
when the first user is the first ordinary user, in response to a monitoring retrieval request of the first ordinary user, the first video fusion processing module acquires video fusion raw data of a to-be-viewed area from video fusion raw data of the designated monitored area in the data of the digital converter station, and performs video fusion processing on the video fusion raw data of the to-be-viewed area by using computing resources of the first monitoring terminal, to obtain video fusion images to be retrieved by the first ordinary user,
wherein the video fusion processing module of the third monitoring terminal is used as a third video fusion processing module,
then, in response to the monitoring retrieval request of the user at the local monitoring side, the first video fusion processing module performing video fusion processing by using video fusion raw data in the data of the digital converter station, to obtain video fusion images to be retrieved by the user at the local monitoring side, further comprises that:
when the first user is the first VIP user, in response to a monitoring retrieval request of the first VIP user, the first video fusion processing module sends a first video fusion request to the third video fusion processing module, the first video fusion request comprises an identifier (ID) of the to-be-viewed area,
the third video fusion processing module acquires video fusion raw data of the to-be-viewed area from video fusion raw data of all monitored areas in the data of the digital converter station according to the ID of the to-be-viewed area in the first video fusion request, and performs video fusion processing on the video fusion raw data of the to-be-viewed area by using computing resources of the third monitoring terminal, to obtain video fusion images to be retrieved by the first VIP user and sent the video fusion images to the first video fusion processing module, the first video fusion processing module receives and obtains the video fusion images to be retrieved by the first VIP user.

8. The monitoring system based on a digital converter station of claim 1, wherein a user at the second-level monitoring side is used as a second user, and the video fusion processing module of the second monitoring terminal is used as a second video fusion processing module, the second video fusion processing module is further configured to perform user authorization management on the second user, to configure the second user as a second ordinary user or a second Very Important Person (VIP) user, wherein the second ordinary user is configured to have authorization to view video fusion images of a designated monitored area of the digital converter station, and the second VIP user is configured to have authorization to view video fusion images of all monitored areas of the digital converter station, then, in response to the monitoring retrieval request of the user at the local monitoring side, the second video fusion processing module performing the video fusion processing by using the video fusion raw data in the data of the digital converter station, to obtain the video fusion images to be retrieved by the user at the local monitoring side, specifically comprises that:

when the second user is the second ordinary user, in response to a monitoring retrieval request of the second ordinary user, the second video fusion processing module acquires video fusion raw data of a to-be-viewed area from the video fusion raw data of the designated monitored area in the data of the digital converter station, and performs video fusion processing on the video fusion raw data of the to-be-viewed area by using computing resources of the second monitoring terminal, to obtain video fusion images to be retrieved by the second ordinary user, wherein the video fusion processing module of the third monitoring terminal is used as a third video fusion processing module, then, in response to the monitoring retrieval request of the user at the local monitoring side, the second video fusion processing module performing the video fusion processing by using the video fusion raw data in the data of the digital converter station, to obtain the video fusion images to be retrieved by the user at the local monitoring side, further comprises that:

when the second user is the second VIP user, in response to a monitoring retrieval request of the second VIP user, the second video fusion processing module sends a second video fusion request to the third video fusion processing module, the second video fusion request comprises an identifier (ID) of the to-be-viewed area, the third video fusion processing module acquires video fusion raw data of the to-be-viewed area from video fusion raw data of all monitored areas in the data of the digital converter station according to the ID of the to-be-viewed area in the second video fusion request, and performs video fusion processing on the video fusion raw data of the to-be-viewed area by using computing resources of the third monitoring terminal, to obtain video fusion images to be retrieved by the second VIP user and send the video fusion images to the second video fusion processing module, the second video fusion processing module receives and obtains the video fusion images to be retrieved by the second VIP user.

9. The monitoring system based on a digital converter station of claim 1, wherein a user at the third-level monitoring side is used as a third user, and the video fusion processing module of the third monitoring terminal is used as a third video fusion processing module, the third video fusion processing module is further configured to perform user authorization management on the third user, to configure the third user as a third Very Important Person (VIP) user, wherein the third VIP user is configured to have authorization to view video fusion images of all monitored areas of the digital converter station, then, in response to the monitoring retrieval request of the user at the local monitoring side, the third video fusion processing module performing video fusion processing by using video fusion raw data in the data of the digital converter station, to obtain video fusion images to be retrieved by the user at the local monitoring side, specifically comprises that:

when the third user is the third VIP user, in response to a monitoring retrieval request of the third VIP user, the third video fusion processing module acquires video fusion raw data of a to-be-viewed area from video fusion raw data of all monitored areas in the data of the digital converter station, and performs video fusion processing on the video fusion raw data of the to-be-viewed area by using computing resources of the third monitoring terminal, to obtain video fusion images to be retrieved by the third VIP user.

10. The monitoring system based on a digital converter station of claim 1, wherein the second monitoring terminal is used as a data sending end and the first monitoring terminal is used as a data receiving end; or the third monitoring terminal is used as a data sending end and the second monitoring terminal is used as a data receiving end, then, the data sending end further comprises a network detection module, the network detection module is configured to periodically perform network bandwidth detection to detect an available network bandwidth and minimum delay time between the data sending end and a corresponding data receiving end, and record only the available network bandwidth and minimum delay time detected for a last time when each detection is completed, so that when video fusion service data needs to be transmitted to the corresponding data receiving end, an initial data transmission rate of the video fusion service data is determined according to a currently recorded available network bandwidth, wherein the network detection module periodically performing network bandwidth detection to detect the available network bandwidth and minimum delay time between the data sending end and the corresponding data receiving end, specifically comprises that:

each time when the network detection module performs network bandwidth detection, the network detection module sequentially sends detection packets to the corresponding data receiving end in an incremental packet sending rate, and records a Round-Trip Time (RTT) value and a packet sending rate corresponding to the detection packet sent each time, when the network detection module determines that the RTT value increases for the first time, the network detection module marks a time point when the RTT value increases as T1, marks a last time point when the RTT value is unchanged before T1 as T0, determines the minimum delay time according to a RTT value corresponding to T0, and determines the available network bandwidth between the data sending end and the corresponding data receiving end according to a last packet sending rate before T1.

11. The monitoring system based on a digital converter station of claim 10, wherein each time when the network detection module performs the network bandwidth detection, the network detection module sequentially sending the detection packets to the corresponding data receiving end in the incremental packet sending rate, specifically comprises that:

each time when the network detection module performs network bandwidth detection, the network detection module acquires an available bandwidth upper limit according to a maximum export bandwidth of a local data sending end and a bandwidth occupancy experience value of the local data sending end, the network detection module sets a rate adjustment threshold according to the available bandwidth upper limit, and in a process of sequentially sending detection packets to the corresponding data receiving end in the incremental packet sending rate, when the packet sending rate is less than the rate adjustment threshold, the network detection module sequentially sends detection packets to the corresponding data receiving end in the incremental packet sending rate based on a first increase amplitude, and when the packet sending rate is not less than the rate adjustment threshold, the network detection module sequentially sends detection packets to the corresponding data receiving end in the incremental packet sending rate based on a second increase amplitude, wherein the first increase amplitude is greater than the second increase amplitude.

12. The monitoring system based on a digital converter station of claim 10, wherein the data transmission adjustment and control module is further configured to: when the local monitoring terminal needs to transmit the video fusion service data to another monitoring terminal, sequentially enter a first transmission stage, a second transmission stage and a third transmission stage of a data transmission process until data transmission is completed, then the data transmission process ends, wherein in the first transmission stage, the data transmission adjustment and control module is configured to acquire an available network bandwidth and minimum delay time currently recorded by a local network detection module, and determine an initial data transmission rate of the video fusion service data according to the acquired available network bandwidth, to start to transmit the video fusion service data to another monitoring terminal in the initial data transmission rate, until it is determined that a preset rate adjustment condition is triggered, enter the second transmission stage, wherein the rate adjustment condition is that it is determined that a Round-Trip Time (RTT) value increases to a preset delay time threshold for the first time, or that a packet loss report is received for the first time, in the second transmission stage, the data transmission adjustment and control module is configured to adjust a current data transmission rate of the video fusion service data according to the acquired available network bandwidth and minimum delay time, a delay time detected when the rate adjustment condition is triggered, and a target delay recovery time configured based on a data type of the video fusion service data and a user type of the user of the monitoring retrieval request, to continue to transmit the video fusion service data to another monitoring terminal in the adjusted data transmission rate, until it is determined that a delay time detected when a rate adjustment condition is triggered is restored to the acquired minimum delay time, then enter the third transmission stage, in the third transmission stage, the data transmission adjustment and control module is configured to trigger the local network detection module to perform network bandwidth detection while continuing to transmit the video fusion service data to another monitoring terminal in the adjusted data transmission rate, to detect and record an available network bandwidth and minimum delay time between the local monitoring terminal and another monitoring terminal, acquire the available network bandwidth and minimum delay time currently recorded by the local network detection module, and determine the data transmission rate of the video fusion service data according to the acquired available network bandwidth, to continue to transmit the video fusion service data to another monitoring terminal according to the determined data transmission rate, until it is determined that the rate adjustment condition is triggered, return to the second transmission stage.

13. The monitoring system based on a digital converter station of claim 12, wherein the target delay recovery time is obtained by the data transmission adjustment and control module querying a preset delay recovery time table according to the data type of the video fusion service data and the user type of the user of the monitoring retrieval request, wherein the delay recovery time table comprises at least one data type, a user type corresponding to each data type, and a delay recovery time configured corresponding to each user type, the data type comprises the video fusion service data, the user type comprises an ordinary user and a Very Important Person (VIP) user; the higher the priority of service data corresponding to each data type, the shorter the delay recovery time configured corresponding to the data type, and in the user type corresponding to a same data type, the delay recovery time configured corresponding to the ordinary user is greater than the delay recovery time configured corresponding to the VIP user.

14. A monitoring method based on a digital converter station, applicable to the monitoring system based on a digital converter station of claim 1, the monitoring system comprising a first monitoring terminal deployed at a first-level monitoring side, a second monitoring terminal deployed at a second-level monitoring side, and a third monitoring terminal deployed at a third-level monitoring side, monitored objects of the monitoring system comprising the digital converter station deployed at the third-level monitoring side; each of the first monitoring terminal, the second monitoring terminal and the third monitoring terminal comprising at least a communication module, a human-machine interaction module, a device status monitoring module, a device alarm management module, a video fusion processing module, and a data transmission adjustment and control module; the third monitoring terminal further comprising a data storage module configured to store data of the digital converter station, the method comprising:
implementing, by the communication module, communication among the first monitoring terminal, the second monitoring terminal and the third monitoring terminal;
monitoring and managing, by the device status monitoring module, ledger information, operation information and monitoring data of all devices of the digital converter station; managing, by the device alarm management module, alarm information of all devices of the digital converter station; receiving, by the human-machine interaction module, a monitoring retrieval request of a user at a local monitoring side;
in response to the monitoring retrieval request of the user at the local monitoring side, performing, by each video fusion processing module, video fusion processing by using video fusion raw data in the data of the digital converter station, to obtain video fusion images to be retrieved by the user at the local monitoring side; and
in a process of transmitting service data from a local monitoring terminal to another monitoring terminal, when a preset rate adjustment condition of the service data is triggered, adjusting, by each data transmission adjustment and control module, a current data transmission rate of the service data according to an available network bandwidth and minimum delay time detected before the rate adjustment condition is triggered, a delay time detected when the rate adjustment condition is triggered, and a delay recovery time configured based on a data type of the service data, to continue to transmit the service data to another monitoring terminal in the adjusted data transmission rate.

15. The monitoring method based on a digital converter station of claim 14, wherein in the process of transmitting the service data from the local monitoring terminal to another monitoring terminal, when the preset rate adjustment condition of the service data is triggered, adjusting, by the data transmission adjustment and control module, the current data transmission rate of the service data according to the available network bandwidth and minimum delay time detected before the rate adjustment condition is triggered, the delay time detected when the rate adjustment condition is triggered, and the delay recovery time configured based on the data type of the service data, to continue to transmit the service data to another monitoring terminal in the adjusted data transmission rate, specifically comprises:
in the process of transmitting the service data from the local monitoring terminal to another monitoring terminal, when the preset rate adjustment condition of the service data is triggered, acquiring, by the data transmission adjustment and control module, an available network bandwidth S0 and minimum delay time RTT0 detected before the rate adjustment condition is triggered, a delay time RTT2 detected when the rate adjustment condition is triggered, and a delay recovery time t configured based on the data type of the service data;
calculating, by the data transmission adjustment and control module, a current available network bandwidth estimation value S2 according to a formula $S2=RTT0/RTT2*S0$;
calculating, by the data transmission adjustment and control module, a service data volume n entering a buffer according to a formula $n=(RTT2-RTT0)*S0$;
calculating, by the data transmission adjustment and control module, a rate adjustment target value S2' of the service data according to a formula $S2'=S2-n/t$; and
adjusting, by the data transmission adjustment and control module, the current data transmission rate of the service data according to the rate adjustment target value S2' to obtain an adjusted data transmission rate S0' which meets $S0'\leq S2'$, to continue to transmit the service data to another monitoring terminal in the adjusted data transmission rate S0'.

16. The monitoring method based on a digital converter station of claim 15, wherein the delay recovery time is obtained by the data transmission adjustment and control module querying a preset delay recovery time table according to the data type of the service data, wherein the delay recovery time table comprises at least one data type and a delay recovery time configured corresponding to each data type, and the higher the priority of service data corresponding to each data type, the shorter the delay recovery time configured corresponding to the data type.

17. The monitoring method based on a digital converter station of claim 14, wherein a user at the first-level monitoring side is used as a first user, and the video fusion processing module of the first monitoring terminal is used as a first video fusion processing module,
the method further comprises:
performing, by the first video fusion processing module, user authorization management on the first user, to configure the first user as a first ordinary user or a first Very Important Person (VIP) user, wherein the first ordinary user is configured to have authorization to view video fusion images of a designated monitored area of the digital converter station, and the first VIP user is configured to have authorization to view video fusion images of all monitored areas of the digital converter station,
then, in response to the monitoring retrieval request of the user at the local monitoring side, performing, by the first video fusion processing module, video fusion processing by using video fusion raw data in the data of the digital converter station, to obtain video fusion images to be retrieved by the user at the local monitoring side, specifically comprises:
when the first user is the first ordinary user, in response to a monitoring retrieval request of the first ordinary user, acquiring, by the first video fusion processing module, video fusion raw data of a to-be-viewed area from video fusion raw data of the designated monitored area in the data of the digital converter station, and performing, by the first video fusion processing module, video fusion processing on the video fusion raw data of the to-be-viewed area by using computing resources of the first monitoring terminal, to obtain video fusion images to be retrieved by the first ordinary user.

18. The monitoring method based on a digital converter station of claim 17, wherein the video fusion processing module of the third monitoring terminal is used as a third video fusion processing module,
then, in response to the monitoring retrieval request of the user at the local monitoring side, performing, by the first video fusion processing module, video fusion processing by using video fusion raw data in the data of the digital converter station, to obtain video fusion images to be retrieved by the user at the local monitoring side, further comprises:
when the first user is the first VIP user, in response to a monitoring retrieval request of the first VIP user, sending, by the first video fusion processing module, a first video fusion request to the third video fusion processing module, the first video fusion request comprising an identifier (ID) of the to-be-viewed area;

acquiring, by the third video fusion processing module, video fusion raw data of the to-be-viewed area from video fusion raw data of all monitored areas in the data of the digital converter station according to the ID of the to-be-viewed area in the first video fusion request, and performing, by the third video fusion processing module, video fusion processing on the video fusion raw data of the to-be-viewed area by using computing resources of the third monitoring terminal, to obtain video fusion images to be retrieved by the first VIP user and send the video fusion images to the first video fusion processing module; and receiving and obtaining, by the first video fusion processing module, the video fusion images to be retrieved by the first VIP user.

19. The monitoring method based on a digital converter station of claim 14, wherein a user at the first-level monitoring side is used as a first user, a user at the second-level monitoring side is used as a second user, a user at the third-level monitoring side is used as a third user, the video fusion processing module of the first monitoring terminal is used as a first video fusion processing module, the video fusion processing module of the second monitoring terminal is used as a second video fusion processing module, the video fusion processing module of the third monitoring terminal is used as a third video fusion processing module; the second monitoring terminal further comprises a second network detection module, and the third monitoring terminal further comprises a third network detection module, the method further comprises:

performing, by the first video fusion processing module, user authorization management on the first user, to configure the first user as a first ordinary user or a first Very Important Person (VIP) user;

performing, by the second video fusion processing module, user authorization management on the second user, to configure the second user as a second ordinary user or a second VIP user;

performing, by the third video fusion processing module, user authorization management on the third user, to configure the third user as a third VIP user;

periodically performing, by the second network detection module, network bandwidth detection to detect an available network bandwidth between the second monitoring terminal and the first monitoring terminal, and sending, by the second network detection module, a currently detected first available network bandwidth to the first video fusion processing module;

periodically performing, by the third network detection module, network bandwidth detection to detect an available network bandwidth between the third monitoring terminal and the second monitoring terminal, and sending, by the third network detection module, a currently detected second available network bandwidth to the first video fusion processing module; and adjusting, by the first video fusion processing module, at least one of a number of first VIP users or a number of second VIP users according to the first available network bandwidth and the second available network bandwidth, wherein each of the first ordinary user and the second ordinary user is configured to have authorization to view video fusion images of a designated monitored area of the digital converter station, and each of the first VIP user, the second VIP user and the third VIP user is configured to have authorization to view video fusion images of all monitored areas of the digital converter station.

20. The monitoring method based on a digital converter station of claim 19, wherein adjusting at least one of the number of first VIP users or the number of second VIP users according to the first available network bandwidth and the second available network bandwidth, specifically comprises:

when only the number of first VIP users needs to be adjusted, and the number of second VIP users needs to maintain a basic number without change, acquiring a first remaining network bandwidth according to the first available network bandwidth, the second available network bandwidth, a network bandwidth occupied by the first ordinary user, and a network bandwidth occupied by a basic number of second VIP users, and adjusting the number of first VIP users according to the first remaining network bandwidth;

when only the number of second VIP users needs to be adjusted, and the number of first VIP users needs to maintain a basic number without change, acquiring a second remaining network bandwidth according to the first available network bandwidth, the second available network bandwidth, the network bandwidth occupied by the first ordinary user, and a network bandwidth occupied by a basic number of first VIP users, and adjusting the number of second VIP users according to the second remaining network bandwidth; and when the number of first VIP users and the number of second VIP users need to be adjusted simultaneously, acquiring a third remaining network bandwidth according to the first available network bandwidth, the second available network bandwidth, and the network bandwidth occupied by the first ordinary user, and adjusting the number of first VIP users and the number of second VIP users according to the third remaining network bandwidth.

* * * * *